(12) United States Patent
Sumio et al.

(10) Patent No.: US 10,013,147 B2
(45) Date of Patent: Jul. 3, 2018

(54) IMAGE DISPLAY APPARATUS

(71) Applicant: CANON KABUSHIKI KAISHA, Tokyo (JP)

(72) Inventors: Hiroshi Sumio, Tokyo (JP); Yoichi Kashibuchi, Kawasaki (JP); Motoki Ikeda, Tokyo (JP); Masahito Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 14/465,158

(22) Filed: Aug. 21, 2014

(65) Prior Publication Data

US 2015/0067484 A1 Mar. 5, 2015

(30) Foreign Application Priority Data

Aug. 28, 2013 (JP) ................................ 2013-177185

(51) Int. Cl.
| | | |
|---|---|---|
| *G06F 3/048* | (2013.01) | |
| *G06F 3/0483* | (2013.01) | |
| *G06F 3/0488* | (2013.01) | |
| *G06F 3/0485* | (2013.01) | |
| *G06F 17/21* | (2006.01) | |

(52) U.S. Cl.
CPC .......... *G06F 3/0483* (2013.01); *G06F 3/0485* (2013.01); *G06F 3/0488* (2013.01); *G06F 3/04883* (2013.01); *G06F 17/212* (2013.01); *G06F 2203/04806* (2013.01)

(58) Field of Classification Search
CPC ......... G06F 17/30905; G06F 17/30887; G06F 17/30899; G06F 17/212; G06F 3/0483; G06F 3/0488; G06F 3/0485; G06F 3/04883; G06F 2203/04806; G06K 9/00442
See application file for complete search history.

(56) References Cited

U.S. PATENT DOCUMENTS

| | | |
|---|---|---|
| 4,958,104 A | 9/1990 | Suzuki et al. |
| 5,691,608 A | 11/1997 | Yamamoto et al. |

(Continued)

FOREIGN PATENT DOCUMENTS

| | | | | |
|---|---|---|---|---|
| EP | 2348392 A1 * | 7/2011 | ........... | G06F 3/0482 |
| JP | 2003319174 A | 11/2003 | | |

(Continued)

OTHER PUBLICATIONS

May 23, 2017, Japanese Official Action (with English translation) in Japanese Patent Appln. No. 2013-177185.

*Primary Examiner* — Wilson W Tsui

(74) *Attorney, Agent, or Firm* — Fitzpatrick, Cella, Harper & Scinto

(57) ABSTRACT

Provided is a display apparatus that displays a first page and a second page. The display apparatus includes a determining unit configured to determine whether or not the layout of the first page is similar to the layout of the second page by comparing an object included in the first page with an object included in the second page which is different from the first page; and a display unit configured to display the first page on a screen based on a display area having been set by a user, wherein, if the determining unit determines that the layout of the first page is similar to the layout of the second page, the display unit displays the second page on the screen based on the set display area.

10 Claims, 44 Drawing Sheets

(56) References Cited

U.S. PATENT DOCUMENTS

| | | | |
|---|---|---|---|
| 5,745,101 A | 4/1998 | Yamamoto et al. | |
| 5,818,434 A | 10/1998 | Yamamoto et al. | |
| 6,735,335 B1* | 5/2004 | Liu | G06K 9/00442 382/175 |
| 6,938,101 B2* | 8/2005 | Hayes | G06F 1/1626 348/E5.103 |
| 7,487,447 B1* | 2/2009 | Jerger | G06F 3/0481 715/252 |
| 9,183,258 B1* | 11/2015 | Taylor | G06F 17/30867 |
| 2005/0050454 A1* | 3/2005 | Jennery | G06F 17/30905 715/235 |
| 2005/0071864 A1* | 3/2005 | Denoue | H04N 21/40 725/9 |
| 2005/0193053 A1* | 9/2005 | Kendall | G06F 17/30905 709/200 |
| 2005/0195221 A1* | 9/2005 | Berger | G06F 3/0481 345/660 |
| 2007/0130525 A1* | 6/2007 | Murphy | G06F 17/30905 715/747 |
| 2007/0204222 A1* | 8/2007 | Rogan | G06F 17/30899 715/210 |
| 2008/0077880 A1 | 3/2008 | Oygard | |
| 2010/0125808 A1* | 5/2010 | Lim | G06F 3/048 715/800 |
| 2014/0019262 A1* | 1/2014 | Reitsma | G06Q 30/02 705/14.71 |
| 2014/0173532 A1 | 6/2014 | Ikeda et al. | |
| 2014/0372871 A1* | 12/2014 | Song | G06F 17/30893 715/234 |

FOREIGN PATENT DOCUMENTS

| | | |
|---|---|---|
| JP | 4094512 B2 | 6/2008 |
| JP | 2010504588 A | 2/2010 |

* cited by examiner

FIG. 8

Block information

| | Attribute | X-Coordinate | Y-Coordinate | Width W | Height H | OCR Information | Color |
|---|---|---|---|---|---|---|---|
| Block 1 | 1 | X1 | Y1 | W1 | H1 | Present | 1 |
| Block 2 | 3 | X2 | Y2 | W2 | H2 | Present | 2 |
| Block 3 | 2 | X3 | Y3 | W3 | H3 | Absent | 1 |
| Block 4 | 1 | X4 | Y4 | W4 | H4 | Present | 2 |
| Block 5 | 3 | X5 | Y5 | W5 | H5 | Present | 1 |
| Block 6 | 2 | X6 | Y6 | W6 | H6 | Absent | 2 |

* Attribute 1: Character, 2: Photograph, 3: Graphic
* Color 1: Color, 2: Monochrome Input file information

| Total number of blocks | N (=6) |
|---|---|

FIG. 18A

```
<?xml version="1.0?">
<svg:svg xmlns:svg="http://www.w3.org/2000/svg" xmlns:xlink="http://www.w3.org/1999/xlink" xmlns:rcd
="http://www.ddd.com/ns/rcd" width="606" height="862" viewBox="0 0 2361 3388">

<svg:image  x="0"  y="0" width="1240" height="1760"
xlink:href="data:image/jpeg;base64,/9j/2wCEAB8VFxsXEx8bGRsjIR8kLk0yLioqLI5DRzhNb2J1c21ibGp7irGWe4OnhGpsmtGcp7a8
xsjGd5TZ6NfA5rHCxr4BISMjLiguWjlyWr5/bH++vr6+vr6+vr6+vr6+vr6+vr6+vr6+vr6+
・・・
FFABRQB//ZAAA=">
</svg:image>                                                                                    ⎯1801

<svg:svg x="188" y="284" width="896" height="148"  rcd:gType="StringText">
  <svg:text fill="#020202" x="144" font-size="150">
    <svg:tspan y="144" x="0 149 299 449 609 750">ddd taro</svg:tspan>
  </svg:text>
</svg:svg>                                                                                      ⎯1802
```

FIG. 18B

```
<svg:svg x="188" y="284" width="896" height="148" rcd:gType=" vectorText">
 <svg:g fill="#020202">
  <path d="   M123,3,779h1.2c2.4,0 10.7,3.1 10.7,7.4v12h1.4q1.4,0 3.8,-1q2.4,-1 8.6,-4h1c3.5,0 8,2.8 8,5
v2q-14,2 -20,2v3q0.3 2,6.6v2.4h2q2,0 6.9,-1.5q5,-1.5 12.1,-4.5h0.5c3.3,0 9.5,3.3 9.5,5
c0.0,8 -23.6,6 -27.6h-1v3q7.22 7.23c0,0.8 -3.2,4 -4,4c-3.1,0 -4.9,-3.4 6.8,-12.3c-1.4,-7 -2,-9.4 -3,-11.7
q-0.2,-0.4 -0.2,-0.7v-2.4h-2q-2,0 -7.5,2.3q-5,5.2.2 -13.5,7c-3.2,0 -9.5,-6.7 -9.5,-10v-2h3
q3.1,2.4 4.1,3.2q0.9,0.8 1.9,0.8c4,0 21,-5.7 21,-7q-2,-5 -2,-9v-1h-3q-3,0 -6.1,1.3q-3.2,1.3 -8.9,3.7
h-0.5c-3.4,0 -9.5,-5.1 -9.5,-8c0,-1 1.3,-3 2,-3q3,3 5,3h4q10,-2 14,-2v-2.5c0,-3.8 -3.8,-10.5 -6,-10.5
h-3v-1.5c0,-0.3 3,-3.5 3.3 -3.5z" />

.....

</svg:g>
</svg:svg>
```
1803

```
<svg:svg x="193" y="631" width="311" height="205" rcd:gType=" vectorLineArt">
 <svg:path fill="none" stroke="#000000" stroke-width="1.0" stroke-linecap=" square"
  d="M1724,2367c-5.5,0 -15.2,12.3 -27,34c-8,2,15 -15,17.2 -79.1,24.5c-37.4,4.3 -63.9,10.1 -63.9,14q0,0.3 0.2 0,4c2,2,1.6
2.5,2.1 3.6,4.5
   c1.3,3.3 1.9,3.6 6.2,3,6h2q,0 3.5,2c0.3,0 1.5,-1.2 1.5,-1.5c0,-0.3 3.1,-1.5 4,-1.5q2,0 2.5,0.5q0.5,0.5 7.5,5.5
h12c5.7,0 13,6.7 13,12c0,10.5 -16.3,23 -30,23q-4,0 -6.6,-1.5q-2.7,-1.5 -12.4,-10.5q-7,4 -9.5,4c-2,0 -12.3,-6.6 -12.3,-10
v-11h-3.2c-5.4,0 -20,27.7 -20,38c0,2.8 3.6,5 8,5h140c4.9,0 12,-4.2 12,-7q0,-1 -3,-6
v-3.5c0,-22.1 30,5 -49,5 55,-49.5q2.3,0 41,1.6q5,0.2 13.5,2.4q3.5,0 8.5,-2c23,2,0 54,27.9 54,49q0,4 -0.5,4.4
q-0.5,0.3 -3.5,5.1c0,1.6 6.4,4.5 10.4,5h3.5c36,0 68.5,-5.7 68.5,-12c0,-31.1 -17.8,-49.1 -64,-64.5q-25.1,-8.4 -30.4,-12.5
q-6.1,-4.8 -16.1,-24c-6.5,-12.5 -15.6,-21 -22.5,-21h-66v0z" />

..

</svg:svg>
```
1804

FIG. 21A

| Event name | Touch press event |
|---|---|
| Transmitted information | Press coordinate values |
| | Latest number of coordinates |

FIG. 21B

| Event name | Swipe event |
|---|---|
| Transmitted information | Event generation coordinate values |
| | Moving distance |

FIG. 21C

| Event name | Pinch-in event |
|---|---|
| Transmitted information | Pinch-in center coordinate values |
| | Pinch-in reduction rate |

FIG. 21D

| Event name | Pinch-out event |
|---|---|
| Transmitted information | Pinch-out center coordinate values |
| | Pinch-out enlargement rate |

FIG. 21E

| Event name | 2-point swipe event |
|---|---|
| Transmitted information | Event generation coordinate values |
| | Moving distance |

FIG. 21F

| Event name | Rotate event |
|---|---|
| Transmitted information | Rotation center coordinate values |
| | Rotational angle |

FIG. 21G

| Event name | Flick event |
|---|---|
| Transmitted information | Latest coordinate values |
| | Released speed |

FIG. 21H

| Event name | Touch release event |
|---|---|
| Transmitted information | Released coordinate values |
| | Latest number of coordinates |

FIG. 21I

| Event name | Double-tap event |
|---|---|
| Transmitted information | Latest coordinate values |

FIG. 21J

| Event name | Single-tap event |
|---|---|
| Transmitted information | Latest coordinate values |

FIG. 21K

| Event name | Long-tap event |
|---|---|
| Transmitted information | Latest coordinate values |

FIG. 21L

| Event name | Touch-and-hold event |
|---|---|
| Transmitted information | Latest coordinate values |

FIG. 21M

| Event name | Triple-tap event |
|---|---|
| Transmitted information | Latest coordinate values |

FIG. 21N

| Event name | 4-point swipe event |
|---|---|
| Transmitted information | Event generation coordinate values |
| | Moving distance |

FIG. 33A
FIG. 33B
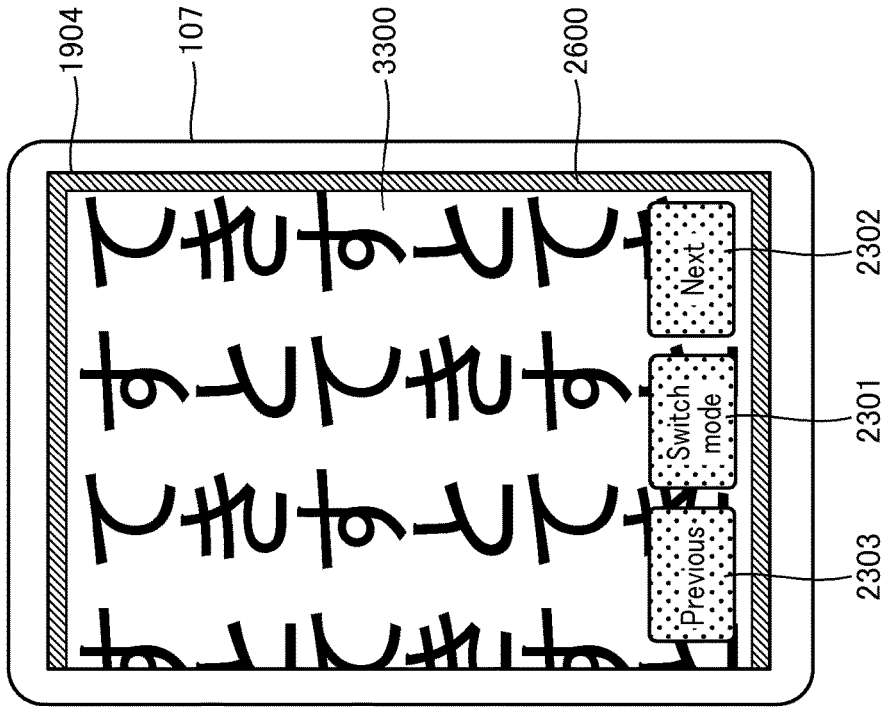
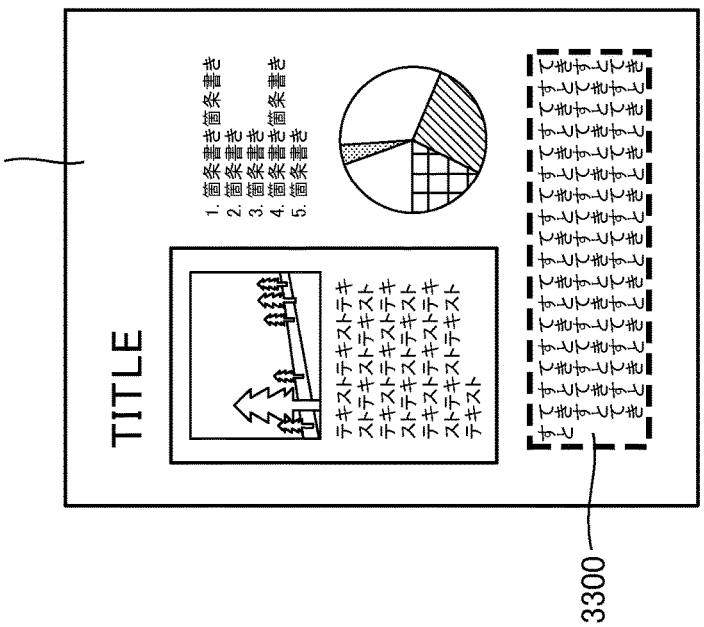

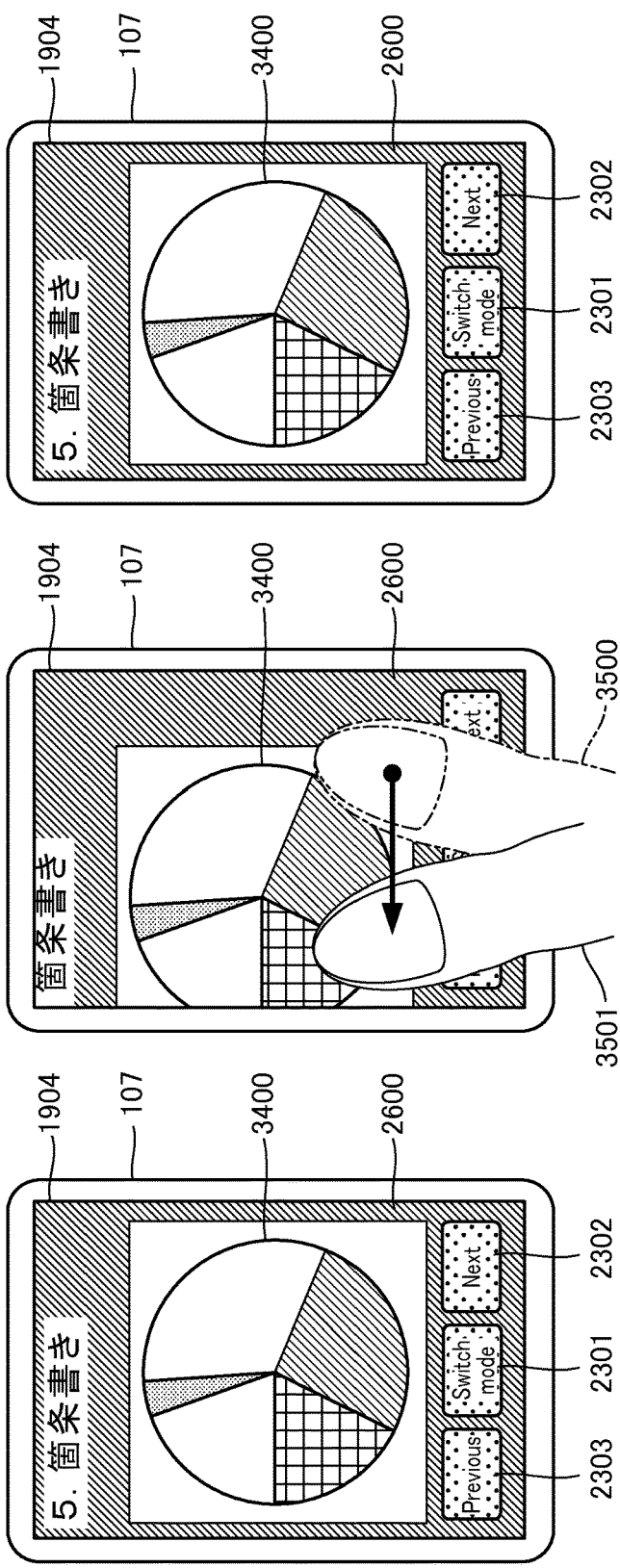

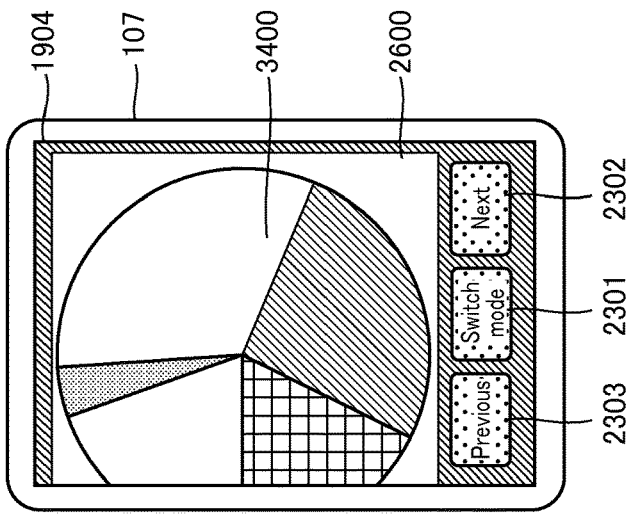
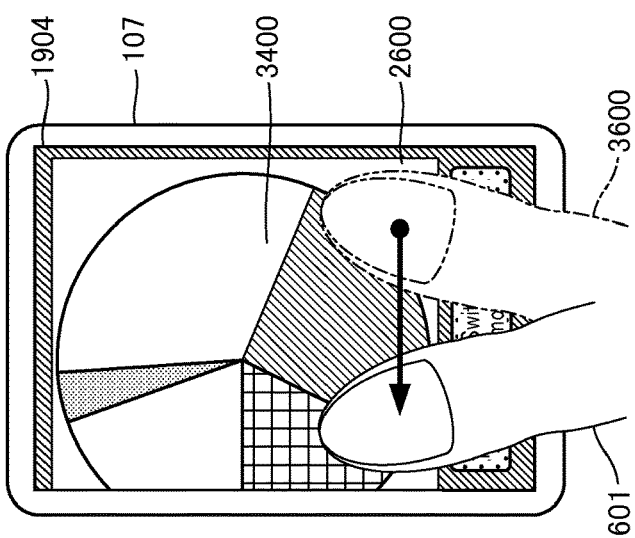
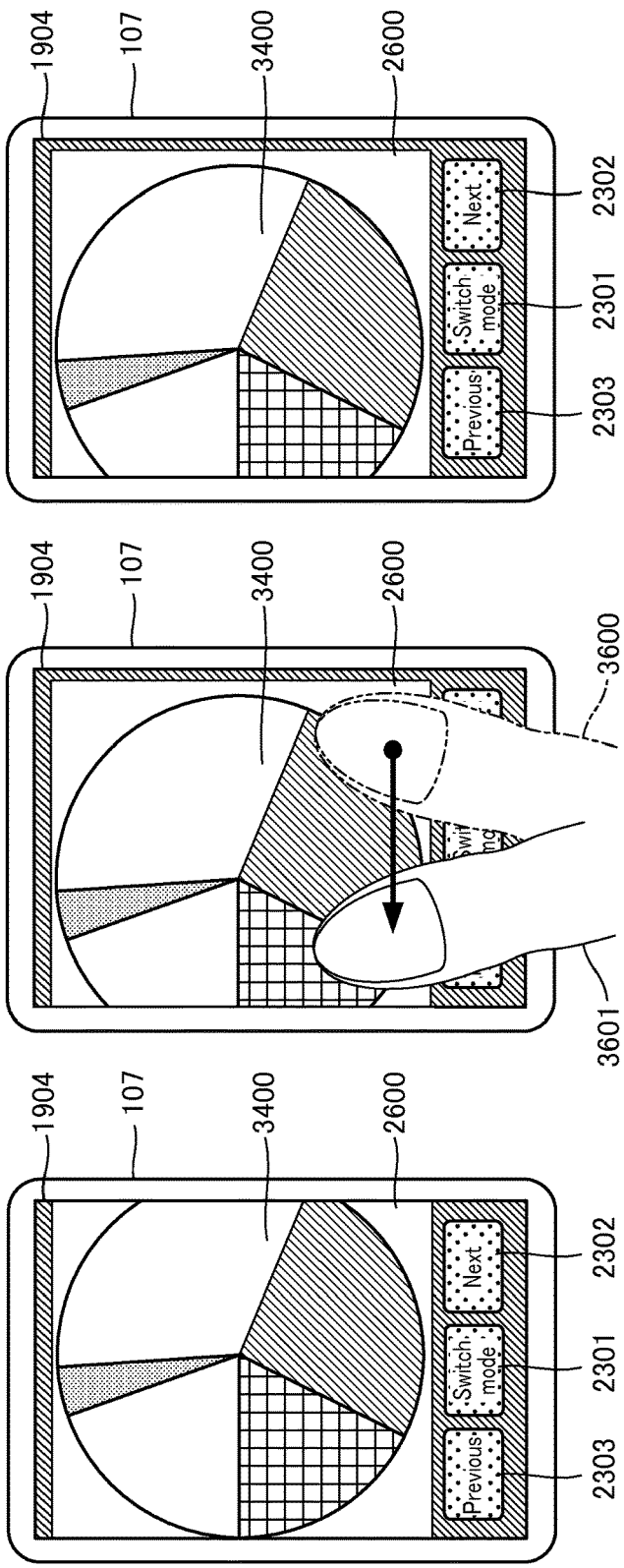

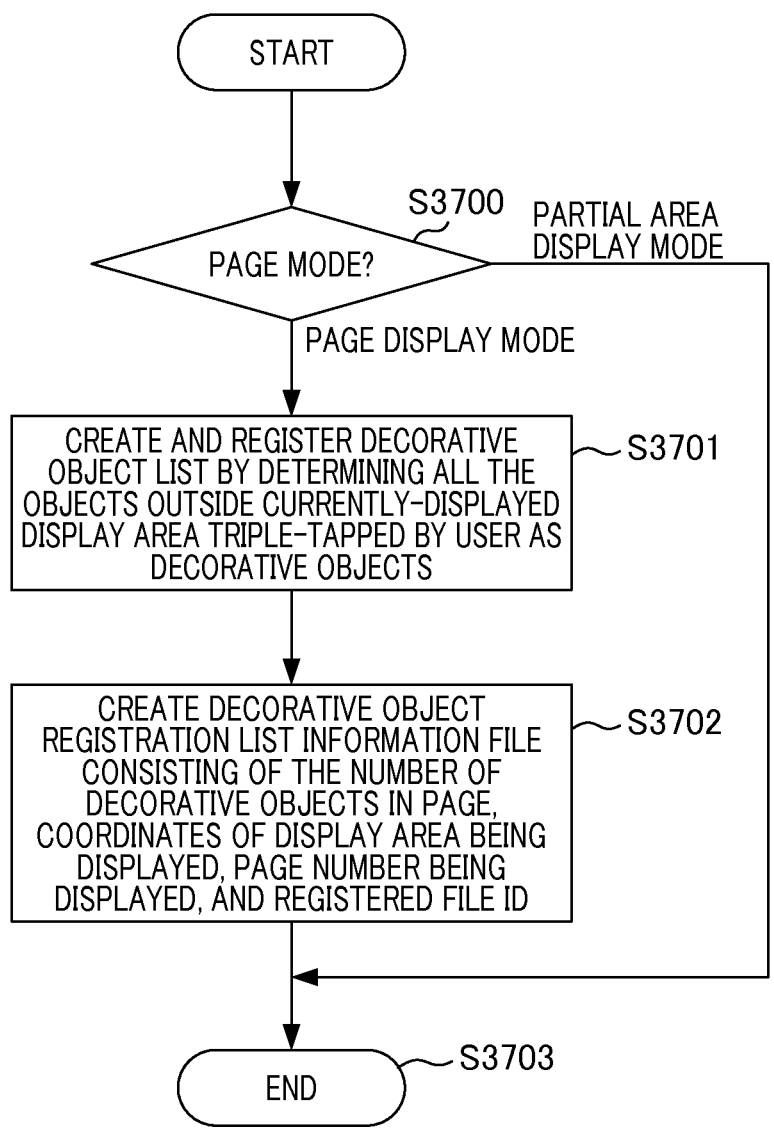

FIG. 39A

Decorative object registration list

| | Attribute | X-Coordinate | Y-Coordinate | Width W | Height H | OCR Information | Color |
|---|---|---|---|---|---|---|---|
| Block 1 | 1 | X1 | Y1 | W1 | H1 | Present | 1 |
| Block 2 | 3 | X2 | Y2 | W2 | H2 | Present | 2 |
| Block 3 | 2 | X3 | Y3 | W3 | H3 | Absent | 1 |
| Block 4 | 1 | X4 | Y4 | W4 | H4 | Present | 2 |
| Block 5 | 3 | X5 | Y5 | W5 | H5 | Present | 1 |
| Block 6 | 2 | X6 | Y6 | W6 | H6 | Absent | 2 |

* Attribute 1: Character, 2: Photograph, 3: Graphic
* Color 1: Color, 2: Monochrome

FIG. 39B

Decorative object registration list information

| The number of decorative objects in page | NB |
|---|---|
| Display area | X, Y, XX, YY |
| Page number | P |
| Registered file ID | ID |

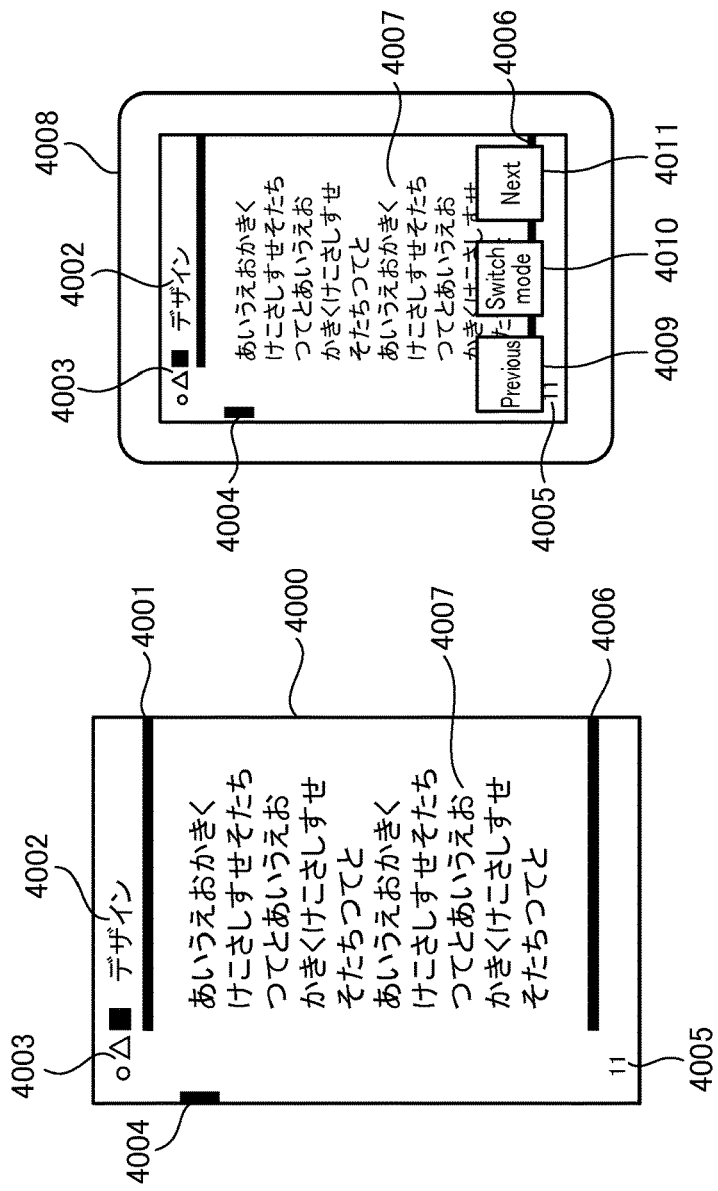
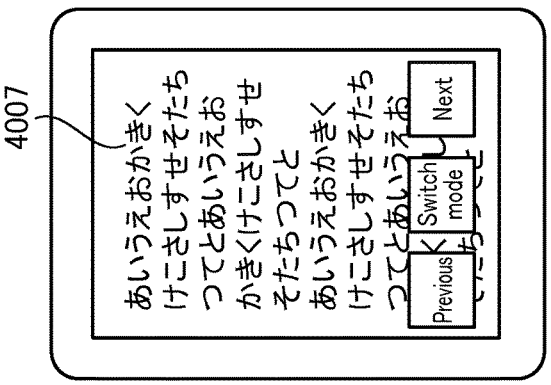
FIG. 40A  FIG. 40B  FIG. 40C

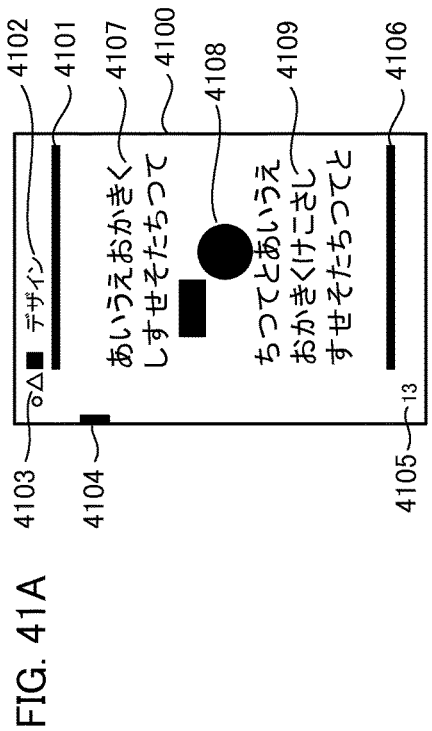
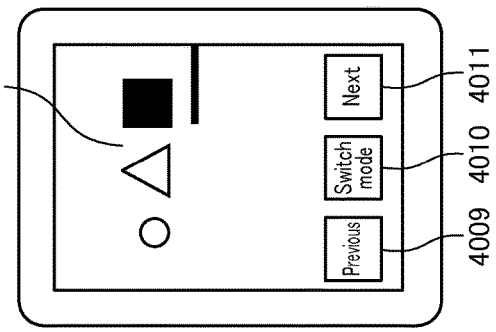
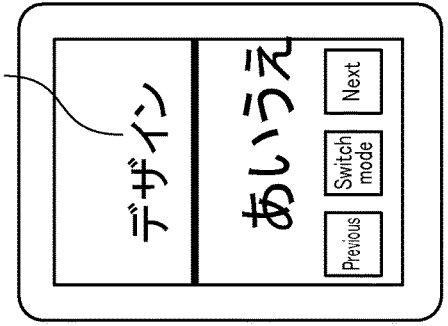
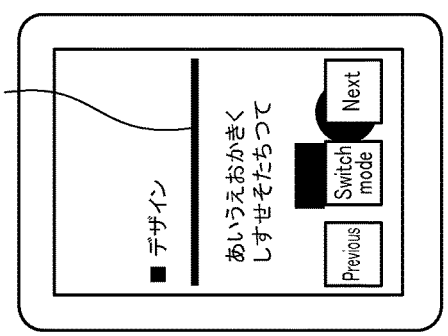
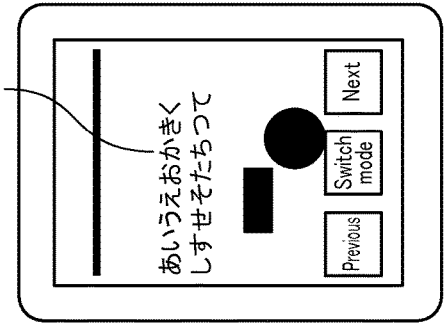

IMAGE DISPLAY APPARATUS

BACKGROUND OF THE INVENTION

Field of the Invention

The present invention relates to image display apparatus.

Description of the Related Art

There has been proposed a method for displaying a document which is digitalized by using an information processing apparatus such as a mobile terminal or a tablet as image data. However, the entire image data (page image) for a page is displayed on such an apparatus provided with a small display screen, resulting in deterioration in visibility. Accordingly, for example, there has been proposed a display method for analyzing a layout of a page image upon enlargement thereof, recognizing a character object contained in the page image, and displaying the character object wrapped on a character-by-character basis according to the display area on a display screen. Japanese Patent No. 4094512 discloses a display apparatus that displays either a reduced image reduced to enable the entire sentence to be displayed on a display area or a wrapped image obtained by wrapping the character object on a character-by-character basis by the pressing of a button displayed on the display area by a user. The display apparatus also simultaneously displays a reduced image and a wrapped image on a display area without performing display image switching.

According to the method, even when the character object is wrapped and displayed as a result of enlargement of the character object, characters in the character object can be read if a display image is scrolled only in one direction (i.e., vertical direction or horizontal direction). Furthermore, characters contained in the character object can be read while viewing the entire document from above by switching two display images or by simultaneously displaying two display images on a display area through an explicit user's instruction. Japanese Patent No. 4094512 also discloses a method for sequentially displaying each area in a document image on a screen with a 1:1 magnification by two-dimensionally scrolling the screen in accordance with the reading order of the document image by a one-dimensional operation (an operation via a right arrow key).

Furthermore, Japanese Patent Laid-Open No. 2010-504588 discloses a method for enlargedly displaying an area of interest on a page while being superimposed on page information by selecting an object present within the area of interest by a user upon displaying page information of which the page layout structure is defined. In this manner, a user can easily view a partial area of interest in a page with increased visibility.

However, the following phenomenon arises when the user specifies an area of interest which is an area desired to be displayed by scrolling in any direction through a swipe operation and by an enlargement/reduction operation through a pinch-out/pinch-in operation so as to read the specified page displayed on a screen. Specifically, there may exist a logo for a company, a design element, and the like, which do not change between pages, in any page, and it is often the case that these are in-page layout elements (hereinafter referred to as "decorative objects") which are of no interest to the user and are the portions which the user does not want to read. In order to view a content that the user wants to read with a desired size readily readable for the user, the user himself needs to manually adjust the size and position of an image displayed on a screen each time the page is switched.

As disclosed in Japanese Patent No. 4094512, the following phenomenon arises when the screen is two-dimensionally scrolled in accordance with the reading order of the document image by a one-dimensional operation (an operation via a right arrow key). Specifically, when the areas in the document image are read in sequence via a key operation, the layout element which does not change between pages or is unnecessary to be read is also inevitably displayed on the screen. Thus, the user needs to read the layout element which is unnecessary to be read each time the page is switched.

Furthermore, when it is desired that the original page image is enlargedly displayed on an image display apparatus due to poor visibility caused by small characters or the like, the entire image may undesirably displayed small in size because the entire image is displayed with a decorative object included therein. The entire image is displayed small in size more than necessity each time the page is switched, so that the user undesirably needs to enlarge the image to a convenient size for the user and then adjust the position of the enlarged image for each page so as to read document.

SUMMARY OF THE INVENTION

The present invention provides, for example, a display apparatus that is capable of automatically specifying a display area of a page depending on a user preference.

According to an aspect of the present invention, a display apparatus that displays a first page and a second page is provided that includes a determining unit configured to determine whether or not the layout of the first page is similar to the layout of the second page by comparing an object included in the first page with an object included in the second page which is different from the first page; and a display unit configured to display the first page on a screen based on a display area having been set by a user, wherein, if the determining unit determines that the layout of the first page is similar to the layout of the second page, the display unit displays the second page on the screen based on the set display area.

According to the present invention, a display apparatus that is capable of automatically specifying a display area of a page depending on a user preference may be provided.

Further features of the present invention will become apparent from the following description of exemplary embodiments with reference to the attached drawings.

BRIEF DESCRIPTION OF THE DRAWINGS

FIG. 8 illustrates block information and input file information on each attribute when object segmentation is performed.

FIGS. 18A and 18B illustrate examples of the Scalable Vector Graphics (SVG) format.

FIGS. 21A, 21B, 21C, 21D, 21E, 21F, 21G, 21H, 21I, 21J, 21K, 21L, 21M, and 21N are diagrams illustrating names of gesture events and information to be transmitted when each event occurs.

FIGS. 33A and 33B illustrate examples of screen display of the touch UI of the mobile information terminal.

FIGS. 35A to 35C illustrate examples of screen display of the touch UI of the mobile information terminal.

FIGS. 36A to 36C illustrate examples of screen display of the touch UI of the mobile information terminal.

FIG. 37 is a flowchart for registering a decorative object list.

FIGS. 39A and 39B illustrate a registration list for registering decorative objects and information about the registration list, respectively.

FIGS. 40A to 40C illustrate examples of screen display of the touch UI of the mobile information terminal.

FIGS. 41A to 41E illustrate examples of screen display of the touch UI of the mobile information terminal.

DESCRIPTION OF THE EMBODIMENTS

Hereinafter, preferred embodiments of the present invention will be described with reference to the drawings.

First Embodiment

Figure 1:
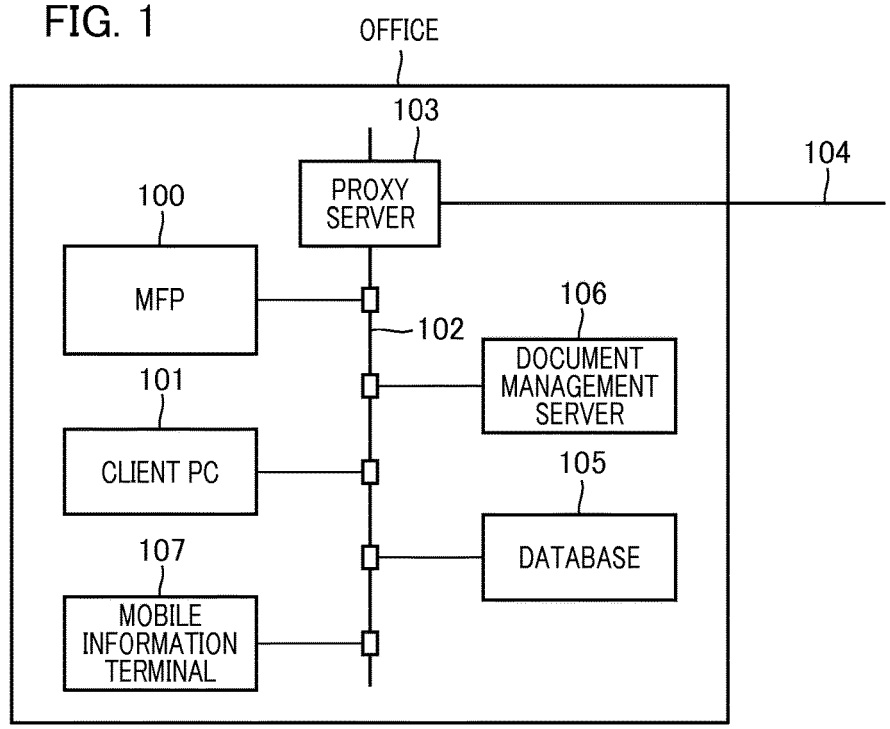
FIG. 1 is a block diagram illustrating an image processing system according to the present invention.

FIG. 1 is a block diagram illustrating a configuration of an image processing system to which the present invention is applied. As shown in FIG. 1, the image processing system is constituted by an MFP (image display apparatus) 100, a client PC 101, a proxy server 103, a document management server 106, and a database 105 for the document management server 106. The MFP 100 is a multi-function peripheral that realizes a plurality of types of functions (copy function, print function, transmission function, and the like). The client PC 101 or the mobile terminal 107 transmits, for example, print data to the MFP 100 to cause the MFP 100 to output a printed material based on the print data. The aforementioned devices are wiredly or wirelessly connected to a LAN 102. The LAN (Local Area Network) 102 is also connected to a network 104 via the proxy server 103. The configuration shown in FIG. 1 is to be considered as an example. A plurality of offices having a similar configuration may be connected to the network 104.

Each of the client PC 101 and the proxy server 103 includes standard building components installed in a general-purpose computer. For example, each of the client PC 101 and the proxy server 103 includes a CPU, a RAM, a ROM, a hard disk, a network I/F, a display, a keyboard, a mouse, and the like, where CPU is an abbreviation for Central Processing Unit, RAM is an abbreviation for Random Access Memory, and ROM is an abbreviation for Read Only Memory. The network 104 is typically implemented by any of the Internet, a LAN, a WAN, a telephone line, a leased digital line, an asynchronous transfer mode (ATM) or a frame relay line, a communication satellite line, a cable television line, and a wireless line for data broadcasting, and the like, where WAN is an abbreviation for Wide Area Network. It goes without saying that the network 104 may be a communication network implemented with a combination of these networks as long as data transmission and reception are possible.

Figure 2:
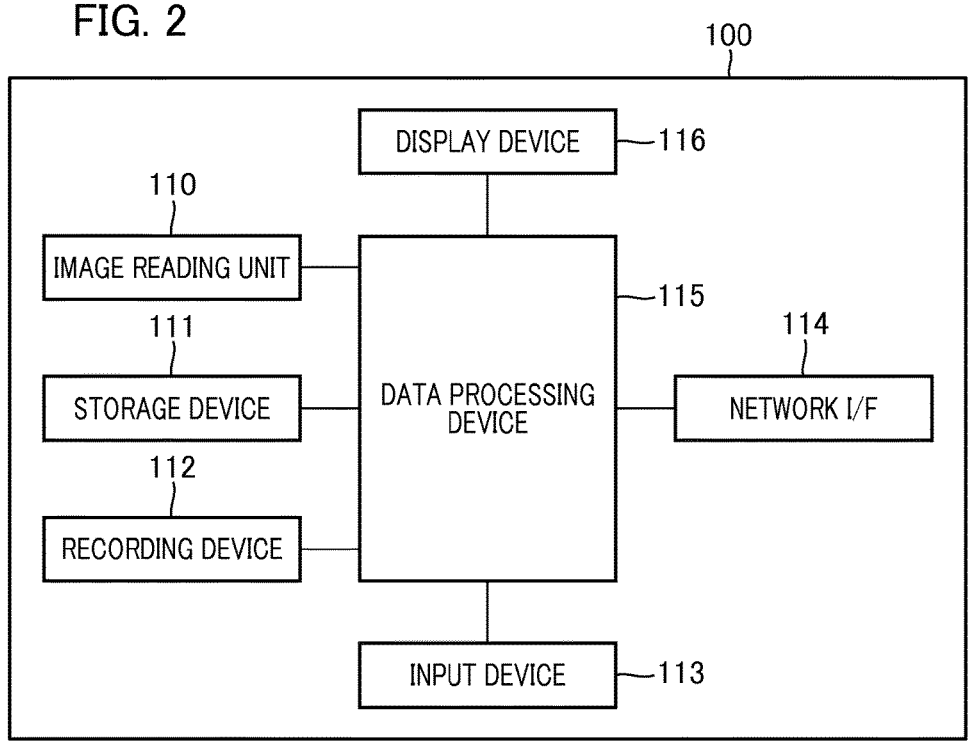
FIG. 2 is a block diagram illustrating a functional configuration of a multifunction peripheral (MFP) shown in FIG. 1.

FIG. 2 is a block diagram illustrating a functional configuration of the MFP 100 shown in FIG. 1. As shown in FIG. 2, the MFP 100 is constituted by an image reading unit 110, a storage device (hereinafter also referred to as "BOX")

111, a recording device 112, a data processing device 115, an input device 113, a display device 116, and a network I/F 114.

The image reading unit 110 has an Auto Document Feeder (hereinafter referred to as "ADF") (not shown), and irradiates images of a bundle of sheets or one sheet with light and then forms a reflected image on a solid-state image sensing element via a lens. The solid-state image sensing element generates an image reading signal having a predetermined resolution (e.g., 600 dots per inch (dpi)) and a predetermined luminance level (e.g., 8 bits), and then generates image data including raster data from the image reading signal. The data processing device 115 converts the bitmap image data generated by the image reading unit 110 into a recording signal by scan image processing to be described below.

The recording device 112 forms an image (outputs a print product) using the recording signal converted by the data processing device 115. When copying a plurality of sheets, the recording device 112 once stores recording signals for one page in the BOX 111, and then sequentially outputs the recording signals to the recording device 112 to thereby form a recording image on recording paper. The BOX 111 has a function capable of storing data generated by rendering the data from the image reading unit 110 and the PDL data output from the local PC 102 via the driver. The MFP 100 is operated via a key operation unit (input device 113) provided for the MFP 100 and may display the state of operation input by using the display device 116.

When PDL data is transmitted from the local PC 101 (or another general-purpose PC (not shown)) via the driver, the network I/F 114 receives PDL data via the LAN 102 and the network I/F 114. Then, the recording device 112 records an image based on the received PDL data. Specifically, the PDL data output from the local PC 101 via the driver is input from the LAN 102 to the data processing device 115 via the network I/F 114. Then, after the data processing device 115 interprets and processes the language to convert the PDL data into a recordable recording signal, the MFP 100 can record the recording signal as a recording image on recording paper.

Figure 3:
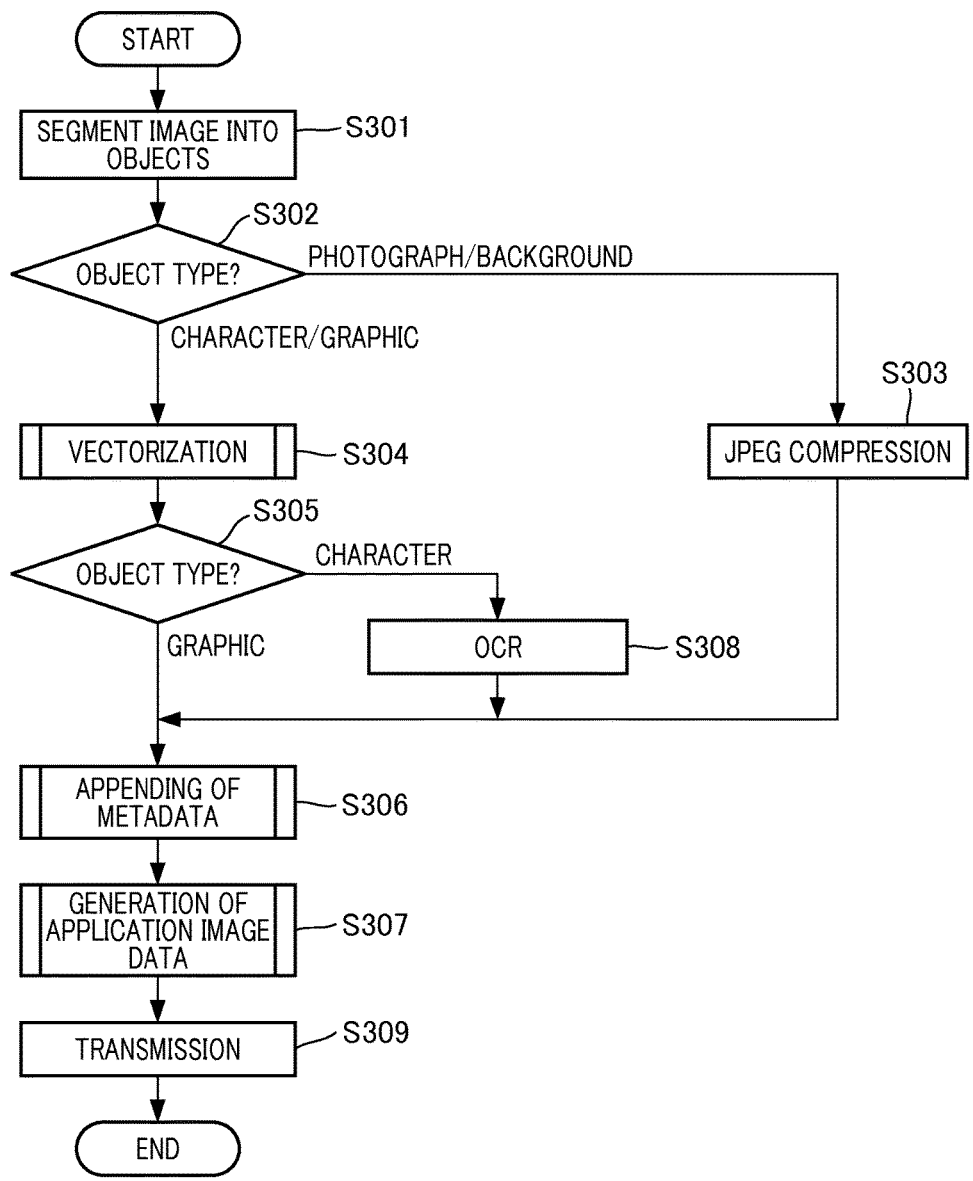
FIG. 3 is a flowchart illustrating application image data generation processing.

Next, a description will be given of an application image data generation flow with reference to FIG. 3. In the flow, the MFP 100 generates data in a predetermined format (hereinafter referred to as "application image data") to be displayed on the mobile terminal 107 from bitmap image data. The bitmap image data is acquired by the image reading unit 110 of the MFP 100. Or, the data processing device 115 within the MFP 100 performs rendering of the document created by application software on the local PC 102 to thereby generate bitmap image data.

Firstly, in step S301, the data processing device 115 performs object segmentation processing to the bitmap image data to segment it into a plurality of objects having respective attributes. In the present embodiment, object attribute types after object segmentation include character, photograph, graphic (rendering, line rendering, table, and line), and background. In step S302, the data processing device 115 determines the object type (character, photograph, graphic, or background) for each segmented object. When an object is determined to be a photograph or background, the processing proceeds to step S303, and the data processing device 115 performs JPEG compression to a bitmap image of the object.

On the other hand, when the object is determined to be a character or a graphic, the processing proceeds to step S304, and the data processing device 115 performs vectorization processing to the object to convert it into path data (vector data). Next, in step S305, the data processing device 115 determines whether or not the object is a character or a graphic. When the object is determined to be a character, in step S308, the data processing device 115 performs optical character recognition (OCR) processing to the object to acquire character-coded data (character code data resulting from the OCR processing).

The data processing device 115 groups the data of each object (JPEG data and vector data) obtained in steps S303 and S304 and the character-coded data obtained in step S308 into one file. Next, in step S306, the data processing device 115 appends optimum metadata to each object. In step S307, the data processing device 115 generates application image data displayable on the mobile terminal 107 based on each object appended with metadata. Finally, in step S309, the data processing device 115 transmits the generated application image data to the mobile terminal 107 via the network I/F.

Figure 4:
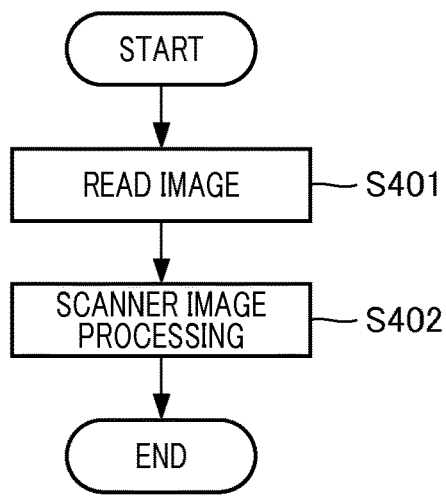
FIG. 4 is a process flow for converting data from a scanner into bitmap data.

Next, a description will be given of bitmap image data (document image data) creation with reference to FIGS. 4 and 5. FIG. 4 is a flowchart for creating bitmap image data using the image reading unit 110 of the MFP 100. When the MFP 100 is used, the image reading unit 110 reads an image in step S401 shown in FIG. 4. The read image is already bitmap image data. In step S402, scanner image processing depending on the image reading unit 110 is performed for the bitmap image data. The term "scanner image processing" in this context refers to, for example, color processing or filter processing.

Figure 5:
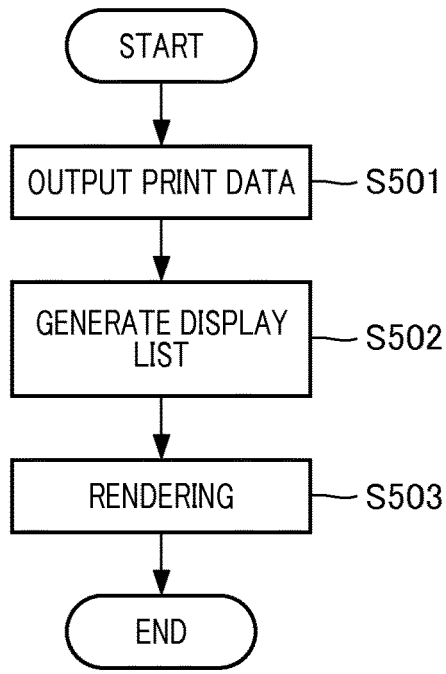
FIG. 5 is a process flow for converting data from a personal computer (PC) into bitmap data.

FIG. 5 is a flowchart for creating bitmap image data by application software on the PC 102. In step S501, the data created by using the application software on the PC 102 is converted into print data via a printer driver provided in the PC 102 and then is transmitted to the MFP 100. The term "print data" in this context means PDL and refers to a page description language such as LIPS (Trademark), Postscript (Trademark), or the like. Next, in step S502, the data processing device 115 of the MFP 100 functions as an interpreter and generates a display list. In step S503, the data processing device 115 performs rendering of the display list to thereby generate bitmap image data.

Figure 6:
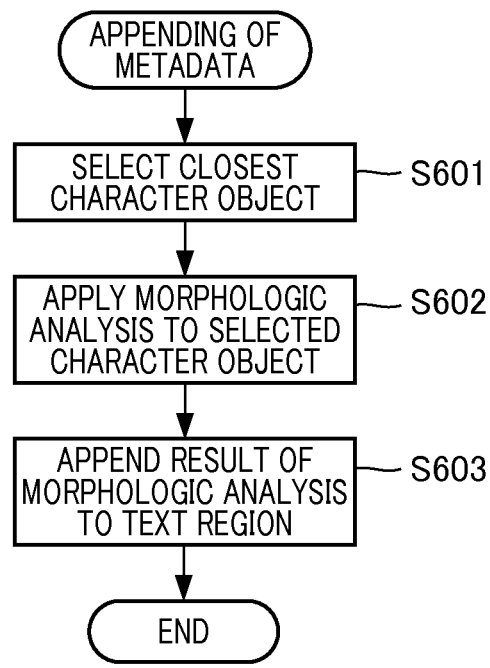
FIG. 6 is a process flow for appending meta information.

A description will be given in detail of processing for appending metadata in step S308 shown in FIG. 3 with reference to the flowchart shown in FIG. 6. Firstly, in step S601, the data processing device 115 selects a closest character object existing around each of segmented objects formed in step S301. Next, in step S602, the data processing device 115 performs morphologic analysis to the selected character object. Next, in step S603, the data processing device 115 appends a word extracted as a result of the morphologic analysis in step S602 to each object as metadata. Metadata can be created not only through the morphologic analysis but also through image feature quantity extraction, syntax analysis, and the like. Furthermore, the data processing device 115 may also create metadata by the following processing. In other words, the data processing device 115 performs similar image search in documents already stored in the BOX 111 incorporated in the MFP 100, documents already stored in the database 105 of the image processing system, and objects contained in these documents. Then, the data processing device 115 performs association with objects of similar images having high similarity.

Figure 7A:
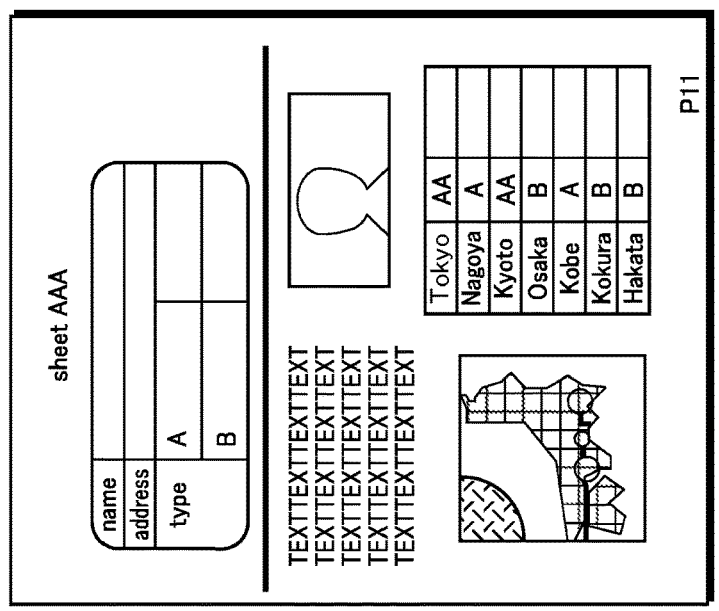
FIGS. 7A and 7B illustrate examples of object segmentation.
Figure 7B:
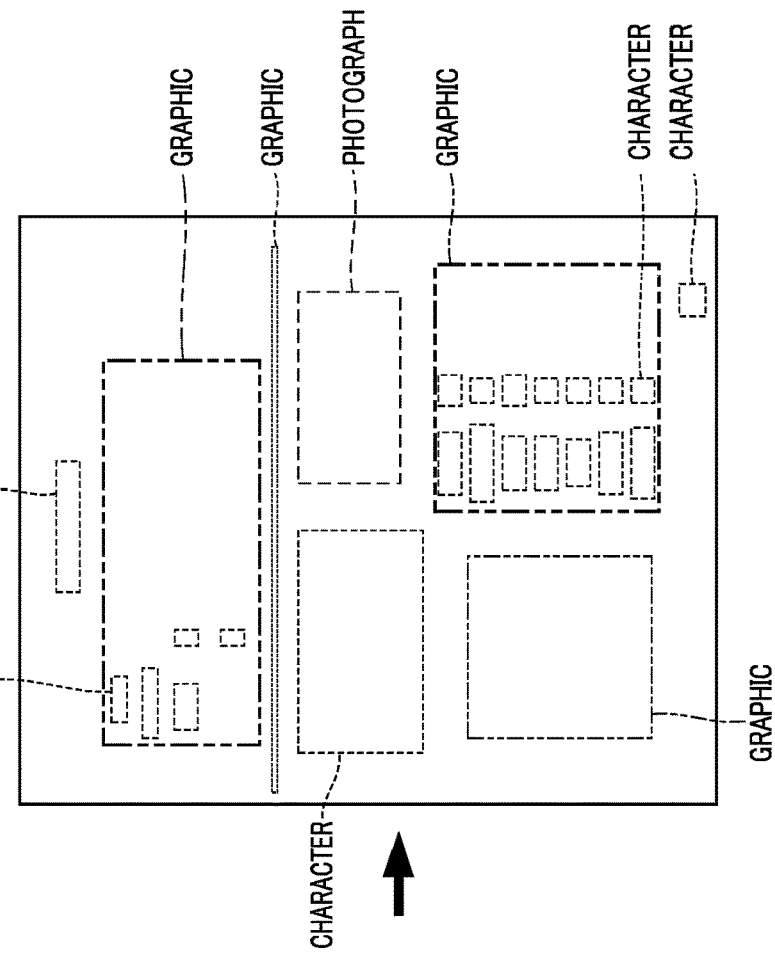

Next, a detailed description will be given of the object segmentation performed in step S301 with reference to FIGS. 7A, 7B, and 8. FIG. 7A illustrates an example of the input bitmap image data. FIG. 7B illustrates an exemplary result of object segmentation processing for segmenting the bitmap image data into a plurality of objects. FIG. 8 illustrates block information and input file information for each object when the object segmentation processing is performed.

In step S301, the data processing device 115 performs object segmentation processing to an input image shown in FIG. 7A to segment the object into rectangular blocks having respective attributes. The segmented rectangular blocks are shown in FIG. 7B. As described above, rectangular block attributes include character, photograph, graphic (rendering, line rendering, table, line), and color (color, monochrome).

With an exemplary method for object segmentation processing, processing is performed in the following way. Firstly, the data processing device 115 performs monochrome binarization to the image data stored in the RAM (not shown) in the MFP 100 to extract a pixel cluster surrounded by black pixel contours. Furthermore, the data processing device 115 evaluates the size of the black pixel cluster extracted in this way and performs contour tracking to a white pixel cluster in the black pixel cluster having a size of a predetermined value or larger. Then, the data processing device 115 evaluates the size of the white pixel cluster and performs contour tracking to a black pixel cluster in the white pixel cluster. In this way, as long as an inner pixel cluster has a size of the predetermined value or larger, the data processing device 115 recursively performs inner pixel cluster extraction and contour tracking. The size of a pixel cluster is evaluated, for example, in terms of the area of the pixel cluster. The data processing device 115 generates a rectangular block which circumscribes the pixel cluster acquired in this way and determines the attribute based on the size and shape of the generated rectangular block.

For example, a rectangular block whose aspect ratio is nearly 1 and size falls within a predetermined range is determined as a character-equivalent block which can be a character area rectangular block. When character-equivalent blocks in close vicinity are regularly arrayed, the data processing device 115 generates a new rectangular block by grouping these character-equivalent blocks, and recognizes the new rectangular block as a character area rectangular block. A black pixel cluster containing a flat pixel cluster or a regularly aligned rectangular white pixel cluster having a size of a predetermined value or larger is considered as a graphic area rectangular block. A pixel cluster having an irregular shape is considered as a photographic area rectangular block.

Next, for each of the rectangular blocks generated in this way, the data processing device 115 generates block information such as attributes and input file information as shown in FIG. 8. In FIG. 8, the block information includes the attribute, position coordinates X and Y, width W, height H, OCR information, and color information for each block. The attribute is represented by a numerical value of 1, 2, and 3 indicating a character area rectangular block, a photographic area rectangular block, and a graphic area rectangular block, respectively. The coordinates X and Y represent the X- and Y-coordinates of the starting point (the coordinates of the top left corner) of each rectangular block in the input image. The width W is the width in the X-coordinate direction of the rectangular block, and the height H is the height in the Y-coordinate direction thereof. The OCR information indicates the presence or absence of pointer information to character-coded data generated by the OCR processing in step S306. Color information is represented by a numerical value 1 or 2, respectively indicating color and monochrome.

The input file information further includes a total number of blocks (N) which indicates the number of rectangular blocks.

The block information for each rectangular block is utilized for vectorization in a specific area. The block information enables identifying a relative positional relationship when combining a specific area and other areas and combining a vectorized area and a bitmap area without impairing the layout of the input image.

Figure 9:
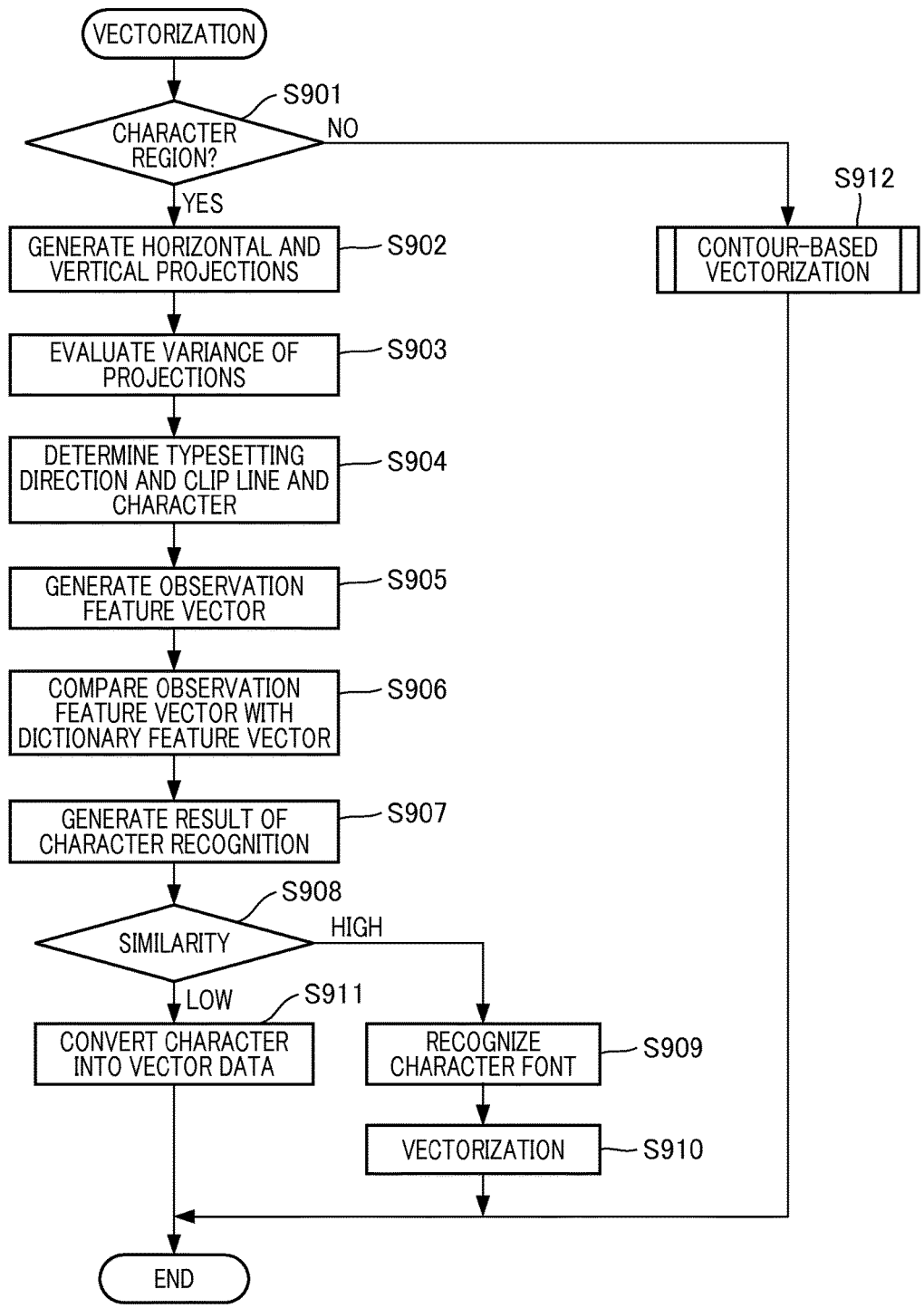
FIG. 9 is a flowchart illustrating vectorization processing.

Next, a detailed description will be given of the vectorization processing in step S304 shown in FIG. 3 with reference to the flowchart shown in FIG. 9. In step S901, the data processing device 115 determines whether or not the specific area is a character area rectangular block. When the specific area is determined to be a character area rectangular block, the processing proceeds to step S902 and subsequent steps. On the other hand, when the specific area is determined not to be a character area rectangular block, the processing proceeds to step S912.

In steps S902 to S907, the data processing device 115 performs character recognition processing by using a pattern matching method or the like to thereby obtain a corresponding character code. For example, in step S902, the data processing device 115 obtains the horizontal and vertical projections with respect to the pixel values in the specific area in order to determine horizontal/vertical writing direction for the specific area (determination of typesetting direction). Next, in step S903, the data processing device 115 evaluates variance of the projections acquired in step S902. When variance of the horizontal projection is large, the data processing device 115 determines that the typesetting direction is horizontal. When variance of the vertical projection is large, the data processing device 115 determines that the typesetting direction is vertical. In step S904, based on the result of the evaluation in step S903, the data processing device 115 determines the typesetting direction, clips a line, and then clips characters to thereby obtain a character image. Specifically, the data processing device 115 decomposes the character image into character strings and characters. In the case of a horizontal writing character area, the data processing device 115 clips a line based on the horizontal projection and clips characters based on the vertical projection for the clipped line. In the case of a vertical writing character area, the data processing device 115 performs processing in reverse way (i.e., the data processing device 115 clips a line based on the vertical projection and clips characters based on the horizontal projection for the clipped line). When clipping a line and characters, the character size can also be detected.

Next, in step S905, for each character clipped in step S904, the data processing device 115 generates an observation feature vector by converting the feature acquired from the character image into a numerical sequence having several tens dimensions. There are various known techniques for extracting a feature vector. For example, a certain technique segments a character in a mesh pattern, counts the number of character lines in each mesh as a line element in each direction, and creates mesh several-dimensional vector as a feature vector.

In step S906, the data processing device 115 compares the observation feature vector acquired in step S905 with the dictionary feature vector acquired in advance for each font type to thereby calculate the distance between the observation feature vector and the dictionary feature vector. In step S907, the data processing device 115 evaluates the distance calculated in step S906 and considers the font type having the shortest distance as a recognition result. Next, in step S908, the data processing device 115 determines whether or not the shortest distance acquired in the distance evaluation in step S907 is greater than a predetermined value, i.e., determines the similarity. When the shortest distance is determined to be equal to or greater than the predetermined value (low similarity), the character may possibly be erroneously recognized as others having a similar shape in the dictionary feature vector. Accordingly, when the shortest distance is determined to be equal to or greater than the predetermined value (low similarity), the data processing device 115 does not adopt the recognition result in step S907, and the processing proceeds to step S911. When the shortest distance is determined to be smaller than the predetermined value (high similarity), the data processing device 115 adopts the recognition result in step S907, and the processing proceeds to step 909.

In step S909, the data processing device 115 recognizes the type of character font. A plurality of sets of dictionary feature vectors for the number of font types used in character recognition are prepared in correspondence with character shape types, i.e., font types. At the time of pattern matching, the font type is output together with the character code to enable character font recognition. Next, in step S910, the data processing device 115 converts each character into vector data by using the character code and font information obtained by character recognition and font recognition and outline data prepared for each character in advance. When the input image is a color image, the data processing device 115 extracts the color of each character from the color image and then records the color together with the vector data.

On the other hand, in step S911, the data processing device 115 outlines the character by handling it in a similar way to graphics. Specifically, for characters which are highly likely to be erroneously recognized, the data processing device 115 generates outline vector data apparently conforming to the bitmap data. When the specific area is not a character area rectangular block (that is, when the specific area is a graphic area rectangular block), in step S912, the data processing device 115 executes the vectorization processing based on the contour of the image. The above-described processing enables converting image information belonging to the character and graphic area rectangular blocks into vector data.

Figure 10:
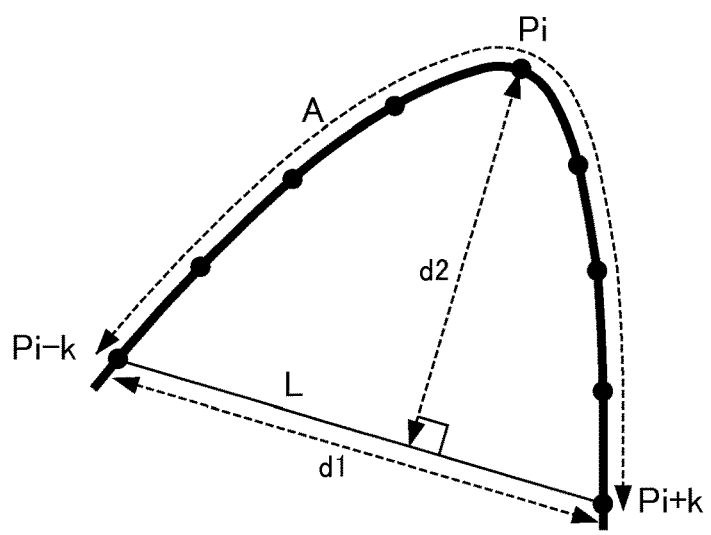
FIG. 10 is a diagram illustrating corner extraction processing in the vectorization processing.
Figure 11:
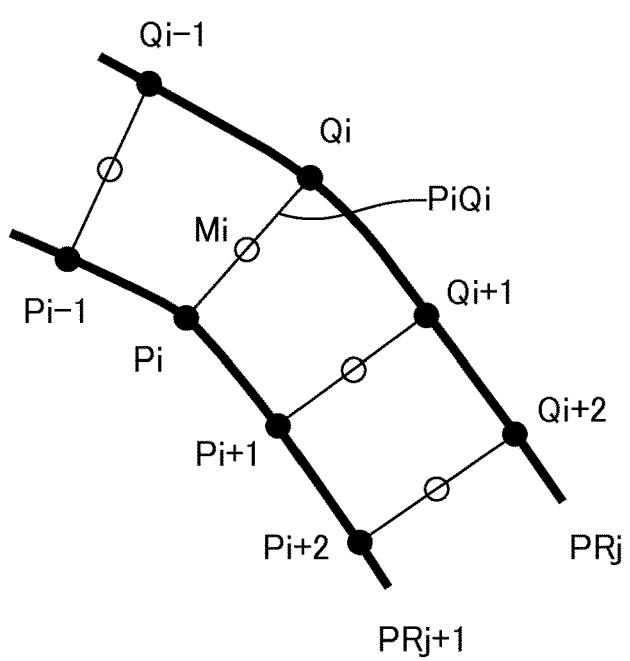
FIG. 11 is a diagram illustrating contour lines grouping processing in the vectorization processing.
Figure 12:
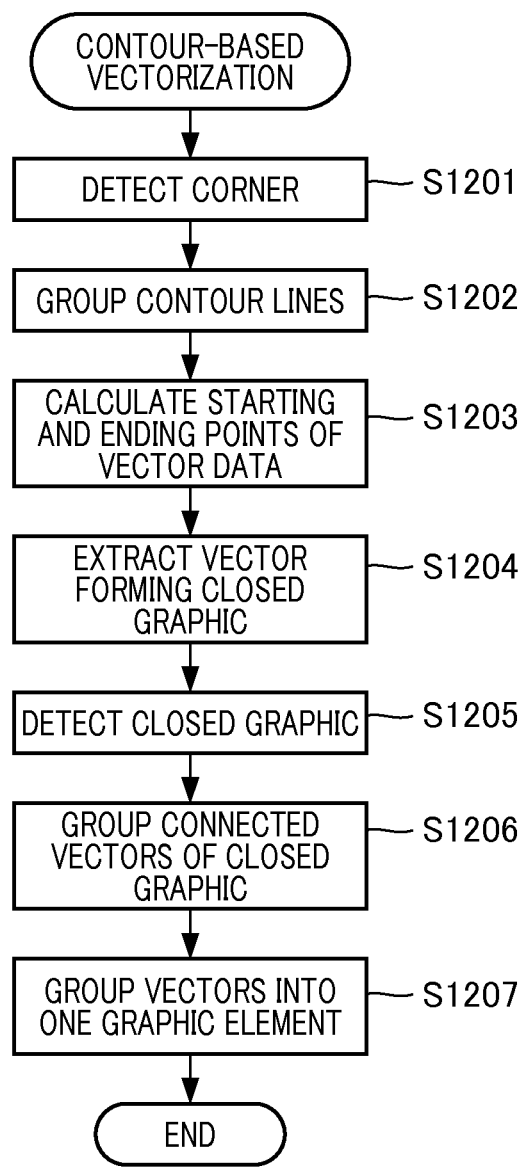
FIG. 12 is a flowchart illustrating contour-based vectorization processing.

A detailed description will be given of the vectorization processing performed to the graphic area rectangular block in step S912 with reference to FIGS. 10, 11, and 12. The data processing device 115 performs the vectorization processing to the graphic area rectangular block based on the contours of the black pixel clusters extracted in the relevant area. FIG. 10 is a diagram illustrating corner extraction processing in the vectorization processing. FIG. 11 is a diagram illustrating contour lines grouping processing in the vectorization processing. FIG. 12 is a flowchart illustrating in detail the vectorization processing for the graphic area.

Firstly, in step S1201 shown in FIG. 12, the data processing device 115 detects a "corner" which segments a curve into a plurality of sections (pixel lines) in order to represent a line rendering or the like as a combination of straight lines and/or curves. A corner refers to a point at which the curvature is maximized. As shown in FIG. 10, the data processing device 115 determines whether or not a pixel Pi on a curve is a corner in the following way. Specifically, pixels Pi−k and Pi+k which are separated from the pixel Pi as a starting point by a predetermined number of pixels (k pixels) in two directions, respectively, along the curve are connected with a line segment L. Let d1 be the distance between the pixels Pi−k and Pi+k, d2 be the distance between the line segment L and the pixel Pi, and A be the length of the arc of the curve between the pixels Pi−k and Pi+k. When the distance d2 is maximized or when a ratio (d1/A) is equal to or less than a threshold value, the data processing device 115 determines the pixel Pi as a corner. The data processing device 115 approximates the pixel lines segmented by the corner to a straight line or a curve. The approximation to a straight line is made by using the least squares method and the approximation to a curve is made by using the cubic spline function. The pixel of the corner segmenting the pixel lines serves as a starting or ending point of the approximation straight line or approximation curve.

Furthermore, the data processing device 115 determines whether or not an inner contour of a white pixel cluster exists in the vectorized contour. When an inner contour is determined to exist, the data processing device 115 vectorizes the inner contour. Similarly, as long as an inner contour exists, the data processing device 115 recursively vectorizes an inner contour of an inverted pixel. As described above, the use of the contour segmentation line approximation enables vectorizing the contour of a graphic having any shape. When the original document is colored, the data processing device 115 extracts colors of graphics from the color image and records the colors together with the vector data.

In step S1202, when the contour lines acquired in step S1201 are in close vicinity, the data processing device 115 groups these contour lines to form a line having a thickness. As shown in FIG. 11, when an outer contour PRj is in close vicinity of an inner contour PRj+1 or another outer contour in a certain target section, the data processing device 115 can group two or more contour lines and represent them as a line having a thickness. For example, the data processing device 115 calculates a distance PiQi from each pixel Pi on a contour PRj+1 to a pixel Qi which is arranged at the shortest distance on a contour PRj. With a small variance in the distance PQi, the data processing device 115 may approximate the target section by using a straight line or curve extending along a point sequence of a midpoint Mi between pixels Pi and Qi. The thickness of the approximation straight line and approximation curve is considered to be, for example, the average of the distance PiQi. Considering tabular ruled lines (lines and a set of lines) as a set of lines having a thickness enables efficient vector expression.

In step S1203, the data processing device 115 calculates starting and ending points of each piece of vector data. In step S1204, the data processing device 115 detects graphic elements by using the starting point information and the ending point information acquired in step S1203. A graphic element refers to a closed graphic formed of sectioned lines. To detect a graphic element, the data processing device 115 connects vectors at the pixel of the common corner which serves as starting and ending points. Specifically, this processing is based on a principle that each of vectors forming a closed shape has connecting vectors at both ends.

In step S1205, the data processing device 115 removes unnecessary vectors not connecting with both ends based on the vector data to thereby extract only vectors forming the closed graphic. In step S1206, starting with one end point (starting or ending point) of any one vector, the data processing device 115 sequentially search for each of the vectors forming the closed graphic in a fixed direction, for example, in the clockwise direction. Specifically, at the other end point of the relevant vector, the data processing device 115 searches for an end point of other vector, and considers the closest end point within a predetermined distance as an end point of a connection vector. When the data processing device 115 completes search for all of the vectors forming the closed graphic and returns to the starting point, the data processing device 115 groups all of the traced vectors as a closed graphic forming a graphic element. The data processing device 115 also groups all of the vectors forming the closed graphic existing in the closed graphic. The data processing device 115 further repeats similar processing starting with the starting point of a vector which has not yet been grouped.

In step S1207, out of unnecessary vectors removed in step S1205, the data processing device 115 detects a vector having an end point close to any vector grouped as a closed graphic in step S1206, and groups the detected vector as a graphic element. This enables grouping other graphic elements exiting in the graphic elements or sectioned lines to form a graphic object. Further, when other graphic elements or sectioned lines do not exist in the graphic element, the data processing device 115 considers the graphic element as a graphic object. The above-described processing enables converting the graphic area rectangular block into a vectorized object.

Figure 13:
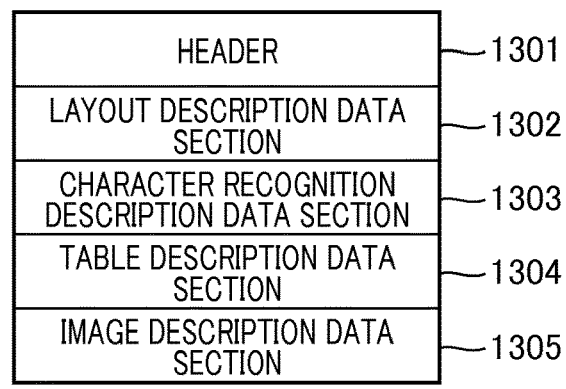
FIG. 13 is a map illustrating data as a result of vectorization processing.
Figure 14:
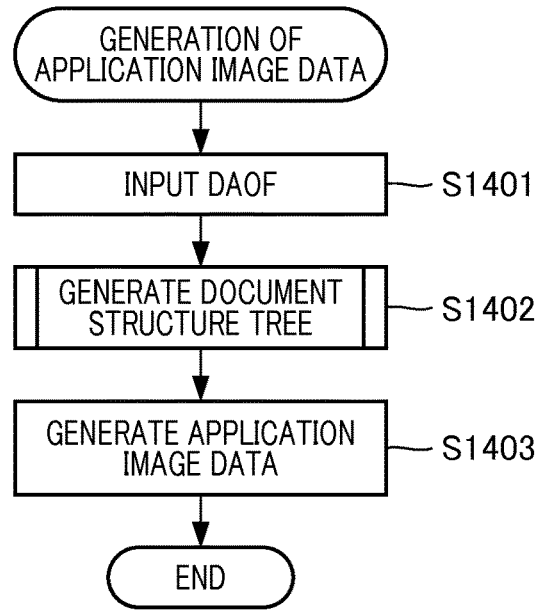
FIG. 14 is a flowchart illustrating application image data generation processing.

Next, a detailed description will be given of processing for generating application image data in step S306 with reference to FIGS. 13 to 14. FIG. 13 is the map of a data configuration resulting from the vectorization processing according to the present embodiment. FIG. 14 is a flowchart illustrating the application image data generation processing in detail.

Firstly, in step S1401, the data processing device 115 acquires intermediate data generated by the vectorization processing in step S304. In the present embodiment, the MFP 100 stores the intermediate data in a format, i.e., in a so-called document analysis output format (hereinafter referred to as "DAOF") in the storage device 111. As shown in FIG. 13, the DAOF data includes a header 1301, a layout description data section 1302, a character recognition description data section 1303, a table description data section 1304, and an image description data section 1305.

The header 1301 stores information about an input image to be processed. The layout description data section 1302 stores information about the attribute of a rectangular block in the input image, such as character, graphic (line rendering, drawing, table, and line), photograph, and the like, and positional information of the rectangular block with recognized attribute. The character recognition description data section 1303 stores a result of character recognition obtained through character recognition out of the character area rectangular blocks. The table description data section 1304 stores a detailed table structure of a graphic area rectangular block having the table attribute. In the specific area where the vectorization processing is instructed, the image description data section 1305 stores the internal structure of a block acquired through the vectorization processing and data set indicating the image shape, character code, and the like. On the other hand, in rectangular blocks other than the specific area not subjected to the vectorization processing, the image description data section 1305 stores bitmap image data itself segmented into objects.

Next, in step S1402, the data processing device 115 generates a document structure tree to be described below. In step S1403, the data processing device 115 acquires actual data in the DAOF based on the generated document structure tree to thereby generate application image data to be described below.

Figure 15:
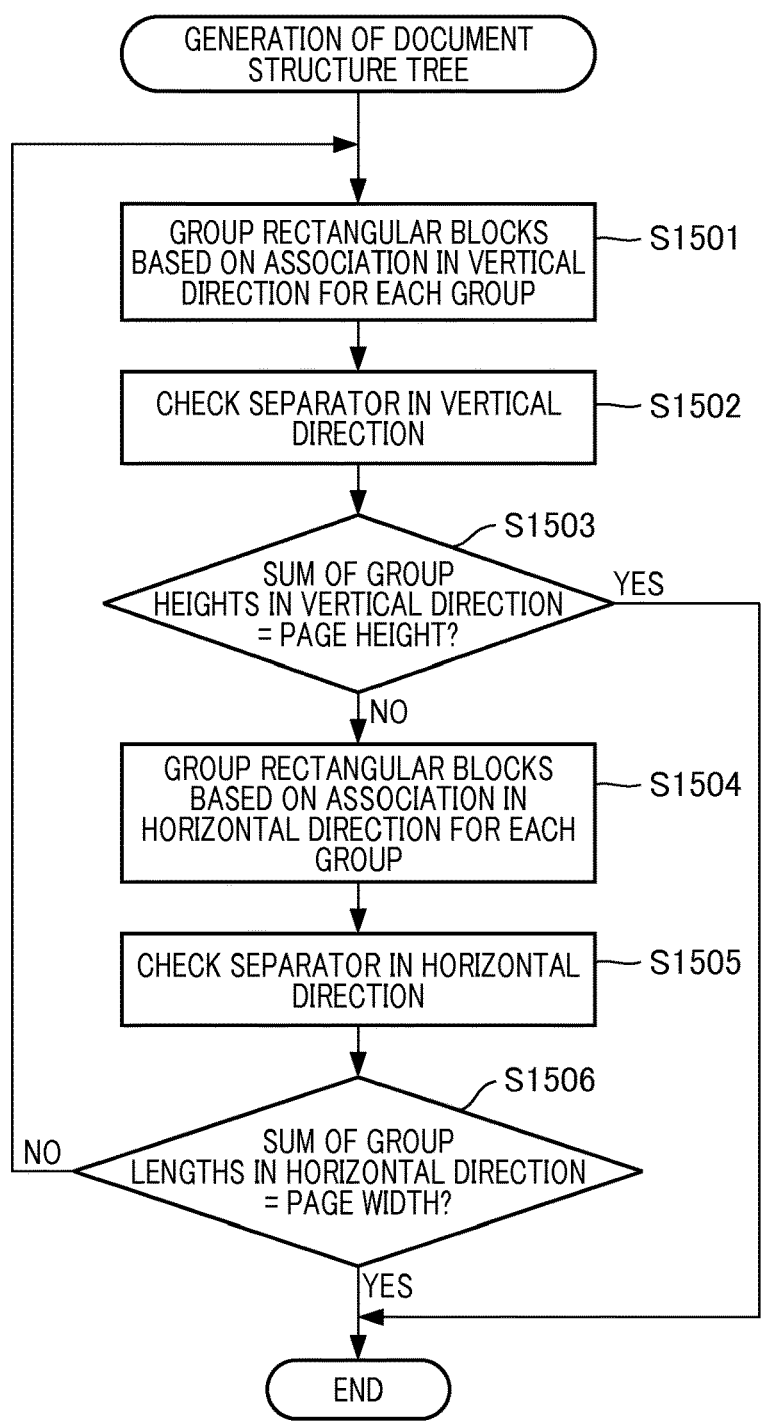
FIG. 15 is a flowchart illustrating document structure tree generation processing.
Figure 16:
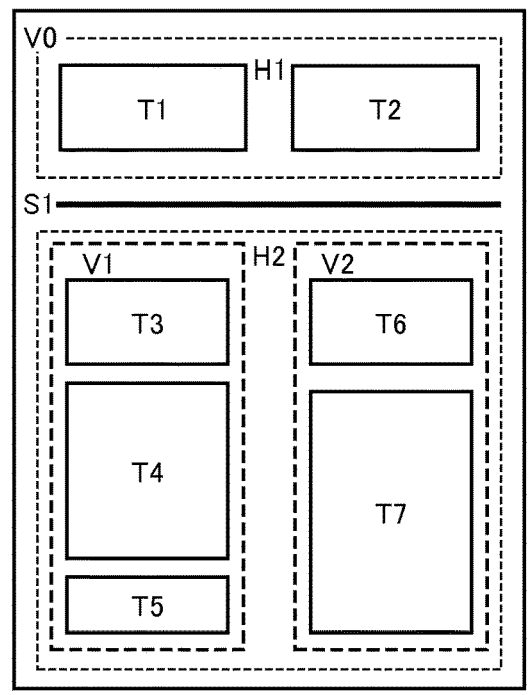
FIG. 16 is a diagram illustrating a document subjected to the document structure tree generation processing.
Figure 17:
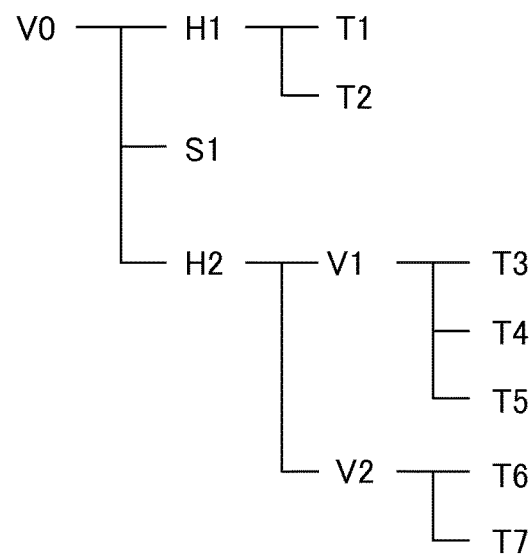
FIG. 17 is a diagram illustrating a document structure tree generated by the processing shown in FIG. 16.

Next, a description will be given of processing for generating a document structure tree in step S1402 with reference to FIGS. 15, 16, and 17. FIG. 15 is a flowchart illustrating the document structure tree generation processing. FIG. 16 is a diagram illustrating an exemplary document subjected to the document structure tree generation processing. FIG. 17 is a diagram illustrating a document structure tree generated by the document structure tree generation processing.

As a basic rule for overall control in the document structure tree generation processing shown in FIG. 15, the flow of processing shifts from a micro block (single rectangular block) to a macro block (set of rectangular blocks). Hereinafter, the term "rectangular block" means both the micro block and the macro block.

Firstly, in step S1501, the data processing device 115 re-groups rectangular blocks based on the association in the vertical direction on a rectangular block basis. Although the processing shown in FIG. 15 may be repetitively executed, the data processing device 115 makes determination on a micro block basis immediately after start of the grouping processing. The association is defined by such features as a short distance and almost the same block width (block height in the case of horizontal direction). The data processing device 115 extracts information such as the distance, width, and height with reference to the DAOF.

For example, referring to a document shown in FIG. 16, rectangular blocks T1 and T2 are horizontally arranged at the top. A horizontal-direction separator S1 exists under the rectangular blocks T1 and T2. Rectangular blocks T3, T4, T5, T6, and T7 exist under the horizontal-direction separator S1. The rectangular blocks T3, T4, and T5 are vertically arranged on the left half of the area under the horizontal-direction separator S1. The rectangular blocks T6 and T7 are vertically arranged on the right half of the area under the horizontal-direction separator S1. When the data processing device 115 executes the grouping processing based on the association in the vertical direction in step S1501, the rectangular blocks T3, T4, and T5 are grouped into a group (rectangular block) V1, and the rectangular blocks T6 and T7 are grouped into another group (rectangular block) V2. The groups V1 and V2 belong to the same hierarchical level.

Next, in step S1502, the data processing device 115 checks the presence or absence of a vertical-direction separator. A separator is an object having the line attribute in the DAOF, and has a function of explicitly segmenting a block. When a separator is detected, the data processing device 115 segments the area of the input image into right and left parts by using the separator as a boundary in the target hierarchical level. No vertical-direction separator exists in the exemplary document shown in FIG. 16.

Next, in step S1503, the data processing device 115 determines whether or not the sum of group heights in the vertical direction is equal to the height of the input image. Specifically, when the data processing device 115 performs horizontal-direction grouping while moving the target area in the vertical direction (e.g., from the top downward) and completes the processing for the entire input image, the data processing device 115 determines whether or not the processing ends using the fact that the sum of group heights is equal to the height of the input image. When grouping is determined to be completed, the data processing device 115 ends the processing, whereas when grouping is determined not to be completed, the processing proceeds to step S1504.

Next, in step S1504, the data processing device 115 executes the grouping processing based on the association in the horizontal direction. Thus, for example, the rectangular blocks T1 and T2 shown in FIG. 16 are grouped into a group (rectangular block) H1, and the rectangular blocks V1 and V2 are grouped into a group (rectangular block) H2. The groups H1 and H2 belong to the same hierarchical level. Also in this case, the data processing device 115 makes determination on a micro block basis immediately after start of the grouping processing.

Next, in step S1505, the data processing device 115 checks the presence or absence of a horizontal-direction separator. When a horizontal-direction separator is detected, the data processing device 115 vertically segments the area of the input image by using the separator as a boundary in the target hierarchical level. As shown in FIG. 16, the horizontal-direction separator S1 exists. The data processing device 115 registers a result of the above-described processing as a document structure tree shown in FIG. 17.

As shown in FIG. 17, input 1-page bitmap image data V0 has the groups H1 and H2 and the separator S1 in the highest hierarchical level. The rectangular blocks T1 and T2 in the second hierarchical level belong to the group H1. The groups V1 and V2 in the second hierarchical level belong to the group H2. The rectangular blocks T3, T4, and T5 in the third hierarchical level belong to the group V1. The rectangular blocks T6 and T7 in the third hierarchical level belong to the group V2. In the present embodiment, V0 indicates a page, and other elements in the hierarchies under the page V0 are all objects.

Finally, in step S1506, the data processing device 115 determines whether or not the sum of group lengths in the horizontal direction is equal to the width of the input image to thereby determine whether or not horizontal-direction grouping is completed. When the sum of group lengths in the horizontal direction is determined to be equal to the page width, the document structure tree generation processing ends. When the sum of group lengths in the horizontal direction is determined not to be equal to the page width, the processing returns to step S1501, and the data processing device 115 repeats the above-described processing again from association check in the vertical direction in the higher hierarchical level.

FIGS. 18A and 18B illustrate exemplary formats of application image data. In the present embodiment, a description will be given by using the Scalable Vector Graphics (hereinafter referred to as "SVG") format as the format of the application image data.

In FIGS. 18A and 18B, notations for objects are enclosed by frames 1801, 1802, 1803, and 1804 for description. Each object has area information indicating an area of the object, and a rendering element acquired from actual data in the DAOF. Further, each object may have only the area information and no rendering element (e.g., H1, H2, V1, and V2 shown in FIG. 17). Reference numeral 1801 denotes a photograph attribute. The photograph attribute indicates area information about an area of a photographic object and bitmap information as a rendering element. Reference numeral 1802 denotes a character attribute. Reference numeral 1803 denotes the content denoted by reference numeral 1802 as a vectorized object. Reference numeral 1804 denotes a graphic object such as a line rendering. Upon processing a document having a plurality of pages, the aforementioned operation is repeated for each page, so that processing can be performed for the entire document having a plurality of pages.

Although, in the present embodiment, the application image data is described in the SVG format, the format is not limited thereto and may be any image format which enables describing and maintaining the meaning and structure of the document.

Figure 19:
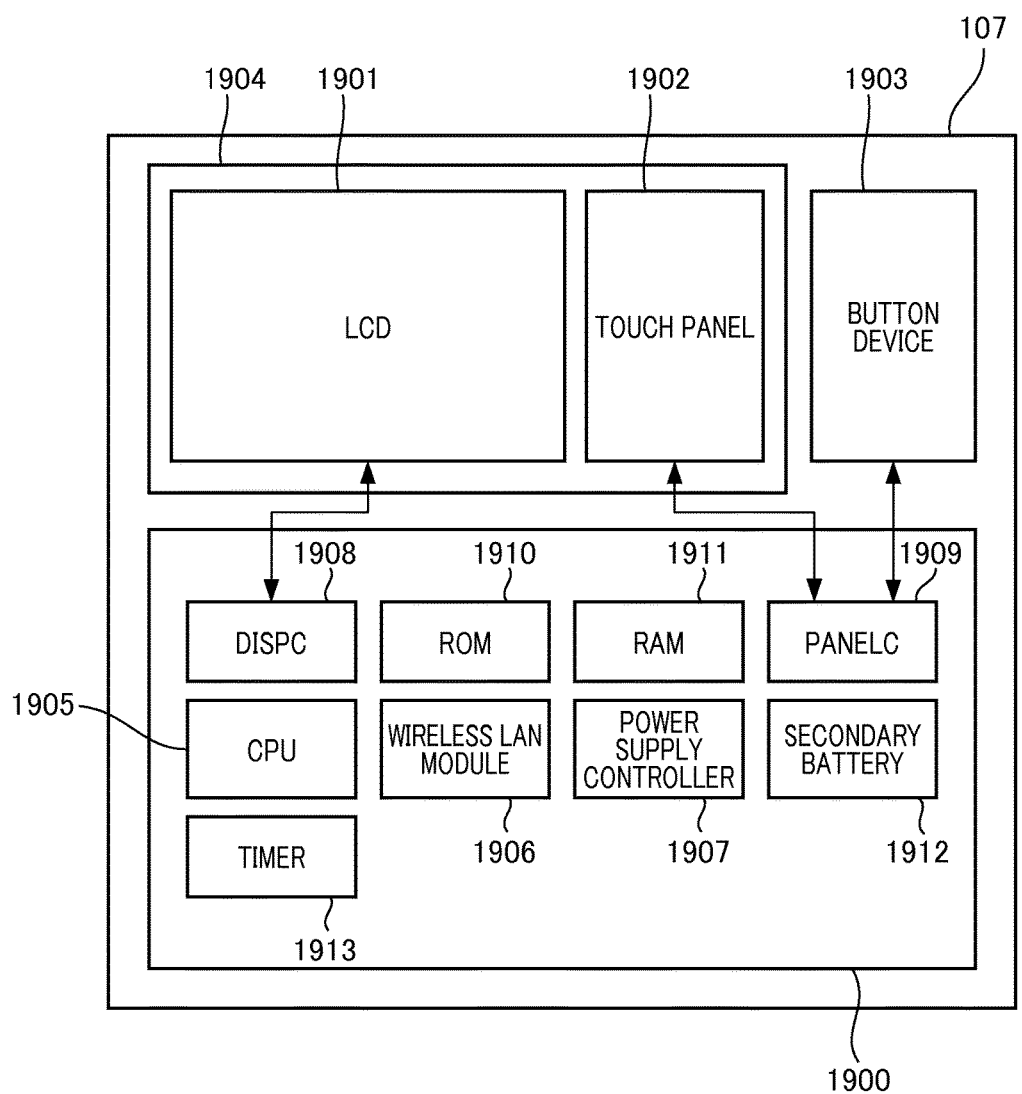
FIG. 19 is a block diagram illustrating a configuration of a mobile terminal.

FIG. 19 is a block diagram illustrating an exemplary hardware configuration of the mobile terminal 107 according to the present embodiment. The mobile terminal 107 is constituted by a main board 1900, a liquid crystal display (LCD) 1901, a touch panel 1902, and a button device 1903. The LCD 1901 and the touch panel 1902 are collectively referred to as a touch UI 1904.

The main board 1900 mainly includes a central processing unit (CPU) 1905, a wireless LAN module 1906, a power supply controller 1907, a display controller (DISPC) 1908, a panel controller (PANELC) 1909, a read-only memory (ROM) 1910, a random access memory (RAM) 1911, a secondary battery 1912, and a timer 1913. The modules 1905 to 1913 are connected with each other via a bus (not illustrated).

The CPU 1905 is a processor that controls each device connected to the bus and expands and executes a software module 2000 (to be described below with reference to FIG. 20) stored in the ROM 1910 on the RAM 1911. The RAM 1911 functions as a main memory and a work area for the CPU 1905, an area for video image to be displayed on the LCD 1901, and a storage area of the application image data transmitted from the MFP 100.

The display controller (DISPC) 1908 switches video image output expanded on the RAM 1911 at high speed and outputs a synchronizing signal to the LCD 1901 in response to a request from the CPU 1905. As a result, the video image in the RAM 1911 is output to the LCD 1901 in synchronization with the synchronizing signal of the DISPC 1908, and a relevant image is displayed on the LCD 1901.

The panel controller (PANELC) 1909 controls the touch panel 1902 and the button device 1903 in response to a request from the CPU 1905. With this control, a position pressed on the touch panel 1902 by the finger or a pointing device (stylus pen) or the key code of a key pressed on the button device 1903 is notified to the CPU 1905. Information about the pressed position includes a coordinate value (hereinafter referred to as "x-coordinate") indicating the absolute position on the touch panel 1902 in the horizontal direction and a coordinate value (hereinafter referred to as "y-coordinate") indicating the absolute position thereon in the vertical direction. The touch panel 1902 is capable of detecting positions of a plurality of pressed points and notifying information about the pressed positions for the number of pressed points to the CPU 1905.

The power supply controller 1907 is connected with an external power supply (not shown) to receive the power supplied therefrom. The power supply controller 1907 supplies the power to the entire mobile terminal 107 while charging the secondary battery 1912 connected to the power supply controller 1907. When no power is supplied from the external power supply, the secondary battery 1912 supplies the power to the entire mobile terminal 107.

The wireless LAN module 1906 establishes wireless communication with wireless LAN modules on wireless access points (not shown) connected to the LAN 102 to serve as an intermediate for communication with the devices shown in FIG. 1 such as the mobile terminal 107, the MFP 100, and the like under the control of the CPU 1905. An example of the wireless LAN module 1906 is IEEE802.11b.

Figure 20:
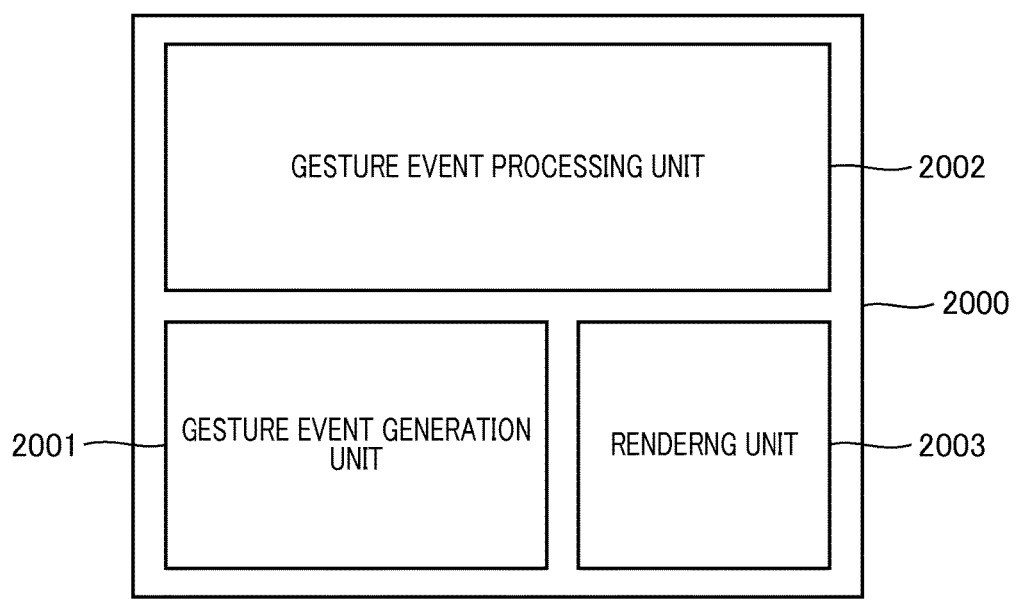
FIG. 20 is a block diagram illustrating a software module configuration of the mobile terminal.

The timer 1913 generates a timer interrupt to a gesture event generation unit 2001 shown in FIG. 20 under the control of the CPU 1905. The gesture event generation unit 2001 will be described below. In the mobile terminal 107, a geomagnetic sensor and an acceleration sensor (none of which are shown) are connected to a bus. The timer 1913 detects the inclination of the mobile terminal 107 under the control of the CPU 1905. When the inclination of the mobile terminal 107 is equal to or greater than a predetermined value, the timer 1913 changes the orientation of the mobile terminal 107, and sends an instruction for performing rendering on the LCD 1901 to a rendering unit 2003. When the timer 1913 changes the orientation of the mobile terminal 107, the CPU 1905 switches the width and height of the LCD 1901 to thereby perform the subsequent processing.

FIG. 20 is a block diagram illustrating a configuration of the software module 2000 executed by the CPU 1905 of the mobile terminal 107. A description will be given of modules constituting the software module 2000. As shown in FIG. 20, the software module 2000 includes a gesture event generation unit 2001, a gesture event processing unit 2002, and a rendering unit 2003.

The gesture event generation unit 2001 generates various gesture events to be described below in response to a user's touch input (on-screen operation). The gesture event generation unit 2001 transmits a generated gesture event to the gesture event processing unit 2002. Upon reception of the gesture event generated by the gesture event generation unit 2001, the gesture event processing unit 2002 executes processing based on the received gesture event and the document structure described in the application image data. The rendering unit 2003 draws and displays the application image data transmitted from the MFP 100 based on a result of execution by the gesture event processing unit 2002 on the LCD 1901. A method for displaying the application image data will be described below.

FIGS. 21A, 21B, 21C, 21D, 21E, 21F, 21G, 21H, 21I, 21J, 21K, 21L, 21M, and 21N illustrate names of gesture events generated by the gesture event generation unit 2001 and information about each event to be transmitted from the gesture event generation unit 2001 to the gesture event processing unit 2200.

FIG. 21A illustrates a touch press event. When this event occurs, the latest coordinate values of the touch coordinates and the number of touch coordinates are transmitted to the gesture event processing unit 2200. The touch coordinates refer to coordinates for one point on the touch panel 1902 on which the user's finger touches and has a pair of coordinate values represented by X- and Y-coordinates. The number of touch coordinates indicates the number of touch coordinates on the touch panel 1902 on which the user's finger touches. The touch coordinates are updated when the user's finger touches the touch panel 1902, when the finger moves thereon, when the finger separates therefrom, and when an interrupt from the timer 1913 occurs.

FIG. 21B illustrates a swipe event. When this event occurs, coordinate values of the latest touch coordinates, and a moving distance calculated based on a difference between the latest and last coordinate values are transmitted to the gesture event processing unit 2200. Here, a swipe refers to a motion of moving the fingertip in any one direction (similar to a sliding motion) while keeping in contact with the touch panel 1902.

FIG. 21C illustrates a pinch-in event. When this event occurs, center coordinate values of the latest touch coordinates of two points and a pinch-in reduction rate calculated based on a reduced distance of a straight line connecting the touch coordinates of the two points are transmitted to the gesture event processing unit 2200. Here, a pinch-in refers to a motion of bringing the two fingertips mutually close (similar to a nipping motion) while keeping in contact with the touch panel 1902.

FIG. 21D illustrates a pinch-out event. When this event occurs, center coordinate values of the latest touch coordinates of two points and a pinch-out enlargement rate calculated based on an enlarged distance of a straight line connecting the touch coordinates of the two points are transmitted to the gesture event processing unit 2200. Here, a pinch-out refers to a motion of bringing the two fingertips mutually apart (similar to a spreading motion) while keeping in contact with the touch panel 1902.

FIG. 21E illustrates a two-point swipe event. When this event occurs, coordinate values of the latest touch coordinates of two points and a moving distance calculated based on a difference between the latest and last coordinate values of the touch coordinates of the two points are transmitted to the gesture event processing unit 2200. The two-point swipe event occurs when touch coordinates of the two points move in the same direction.

FIG. 21F illustrates a rotate event. When this event occurs, rotation center coordinate values calculated based on the latest touch coordinates of two points and a rotational angle calculated based on the latest and last coordinate values of the touch coordinates of the two points are transmitted to the gesture event processing unit 2200. Here, a rotate refers to a motion of rotating the two fingertips with respect to the touch panel 1902 while keeping in contact therewith.

FIG. 21G illustrates a flick event. When this event occurs, coordinate values of the latest touch coordinates and a moving speed of the finger calculated based on the latest and last coordinate values are transmitted to the gesture event processing unit 2200. Here, a flick refers to a motion of separating from the touch panel 1902 (similar to a bouncing motion) during the swipe operation.

FIG. 21H illustrates a touch release event. When this event occurs, coordinate values of the latest touch coordinates when the user's finger separates from the touch panel 1902, and the number of coordinates are transmitted to the gesture event processing unit 2200.

FIG. 21I illustrates a double-tap event. When this event occurs, coordinate values of the latest touch coordinates are transmitted to the gesture event processing unit 2200. Here, the double-tap refers to an event in which a single-tap event to be described below occurs two times within a predetermined time duration.

FIG. 21J illustrates the single-tap event. When this event occurs, coordinate values of the latest touch coordinates are transmitted to the gesture event processing unit 2200. Here, the single-tap refers to an event in which the above-described touch press event occurs and subsequently the touch release event occurs within a predetermined time duration.

FIG. 21K illustrates a long-tap event. When this event occurs, coordinate values of the latest touch coordinates are transmitted to the gesture event processing unit 2200. Here, a long-tap refers to an event in which the above-described touch press event occurs and, after a predetermined time duration has elapsed, the touch release event occurs.

FIG. 21L illustrates a touch-and-hold event. When this event occurs, coordinate values of the latest touch coordinates are transmitted to the gesture event processing unit 2200. Here, a touch-and-hold refers to an event in which, once the user's finger touches the touch panel 1902, a predetermined time duration has elapsed keeping the user's finger in contact therewith without moving.

FIG. 21M illustrates a triple-tap event. When this event occurs, coordinate values of the latest touch coordinates are transmitted to the gesture event processing unit 2200. Here, the triple-tap refers to an event in which the single-tap event described above occurs three times within a predetermined time duration.

FIG. 21N illustrates a 4-point swipe event. When this event occurs, event generation coordinate values and information about the moving distance of the swipe operation are transmitted to the gesture event processing unit 2200. Here, the 4-point swipe refers to a motion of moving the four fingertips in any one direction (similar to a sliding motion) while keeping in contact with the touch panel 1902.

Although, in the above-described examples, the user uses this finger for touch input, a stylus pen may be used for touch input.

Figure 22:
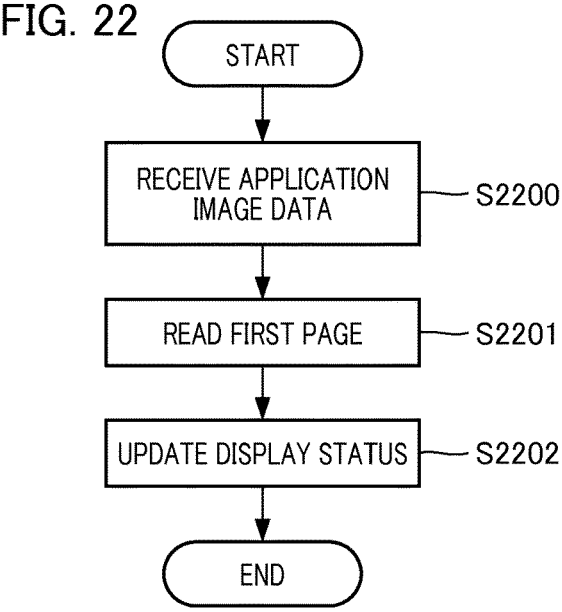
FIG. 22 is a flowchart illustrating processing executed when the mobile terminal receives the application image data.
Figure 23:
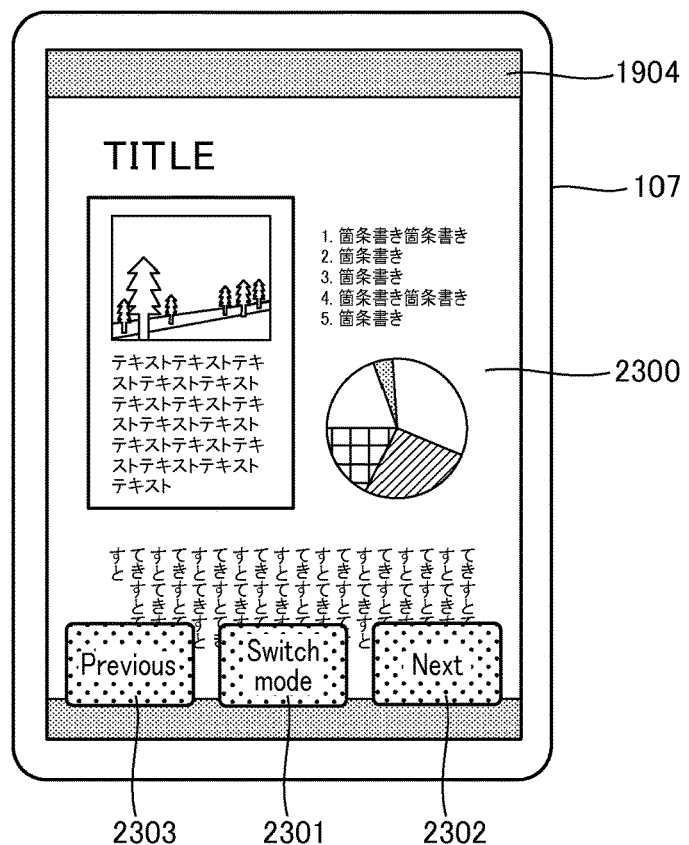
FIG. 23 illustrates an exemplary screen display of a touch user interface (UI) of the mobile terminal.

Next, a description will be given of processing performed by the mobile terminal 107 upon reception of the application image data according to the present embodiment with reference to FIGS. 22 and 23. FIG. 22 is a flowchart illustrating processing executed by the mobile terminal 107 upon reception of the application image data. FIG. 23 illustrates an example of screen display of the touch UI 1904 of the mobile terminal 107.

Firstly, in step S2200, the mobile terminal 107 receives the application image data from the MFP 100 via the wireless LAN module 1906, and stores the received application image data in the RAM 1911. Next, in step S2201, the rendering unit 2003 analyzes the syntax of the application image data stored in the RAM 1911, and reads the first page and objects contained therein.

Next, in step S2202, the rendering unit 2003 renders all of objects (background, character, photograph, and graphic) contained in the read first page according to the starting point coordinates, width, and height of each object to update the display status of the touch UI 1904. In this case, as shown in a page 2300 in FIG. 23, the mobile terminal 107 controls the display magnification for the first page according to the width of the touch UI 1904. When the height of the page (when reduced to the display magnification is smaller than the height of the touch UI 1904, the mobile terminal 107 controls the starting point of the page 2300 in the coordinates on the touch UI 1904 so that the page is adapted to be displayed at the center of the touch UI 1904. On the other hand, when the height of the page 2300 (when reduced to the display magnification) is larger than the height of the touch UI 1904, the mobile terminal 107 controls the starting point of the page 2300 in the coordinates on the touch UI 1904 so that the starting point is aligned with the starting point of the touch UI 1904 (e.g., the top left corner of the screen). In the present embodiment, a display control method in which the entire page is displayed on the touch UI 1904 in this way is referred to as "page display mode".

As shown in the character attribute 1802 in FIG. 18A, the character object contained in the application image data of the present embodiment has vector data and the character code data 1803. When there is a character object in a page, the rendering unit 2003 renders the page 2300 only by using vector data, whereas the rendering unit 2003 renders a character-wrapped image to be described below by using character code data.

Figure 24:
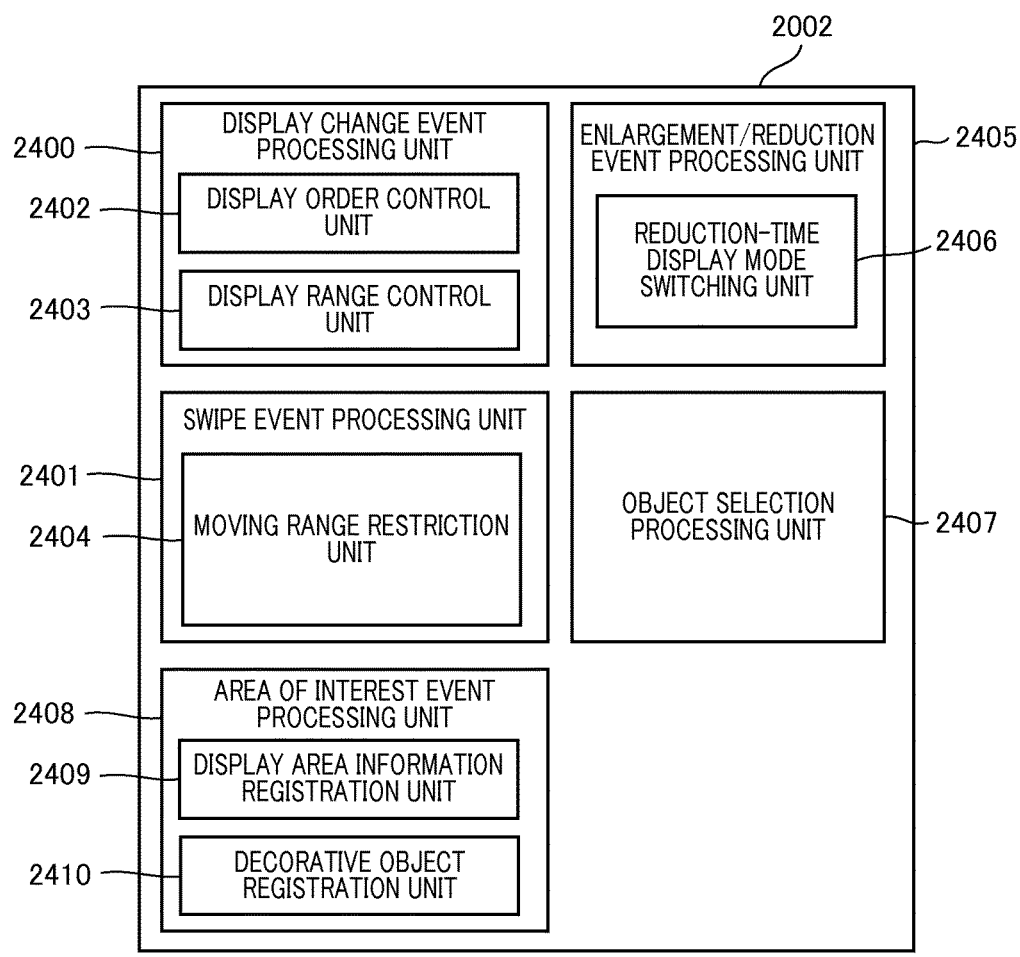
FIG. 24 is a block diagram illustrating a software module configuration related to operation control of the application image data.

Next, a description will be given of software modules related to operation control of the application image data of the mobile terminal 107 with reference to FIGS. 23 and 24. FIG. 24 is a block diagram illustrating a software module configuration in the gesture event processing unit 2002 related to operation control of the application image data. The gesture event processing unit 2002 includes a display change event processing unit 2400, a swipe event processing unit 2401, an enlargement/reduction event processing unit 2405, an object selection processing unit 2407, and an area of interest event processing unit 2408.

The gesture event processing unit 2002 receives any one of gesture events shown in FIGS. 21A to 21N from the gesture event generation unit 2001. The display change event processing unit 2400 processes the single-tap event (FIG. 21J) out of the gesture events received by the gesture event processing unit 2002. Upon reception of the single-tap event, the display change event processing unit 2400 determines whether or not coordinate values of the touch coordinates of the single-tap event correspond to any one of a "CHANGE MODE" button 2301, a "NEXT" button 2302, and a "PREVIOUS" button 2303 shown in FIG. 23. When touch coordinates of the single-tap event correspond to the "CHANGE MODE" button 2301, the display change event processing unit 2400 performs "mode switch processing" to be described below. When touch coordinates of the single-tap event correspond to the "NEXT" button 2302, the display change event processing unit 2400 performs "NEXT selection processing" ("NEXT" button selection processing) to be described below. When touch coordinates of the single-tap event correspond to the "PREVIOUS" button 2303, the display change event processing unit 2400 performs "PREVIOUS selection processing" ("PREVIOUS" button selection processing) to be described below. The "NEXT selection processing" and the "PREVIOUS selection processing" are performed by a display order control unit 2402 and a display range control unit 2403 provided in the display change event processing unit 2400.

The swipe event processing unit 2401 processes the swipe event shown in FIG. 21B. Upon reception of the swipe event, the gesture event processing unit 2002 moves the starting point of the page 2300 in the coordinates on the touch UI 1904 according to the moving distance included in swipe event information. Then, the gesture event processing unit 2002 updates the display status of the touch UI 1904. A moving range restriction unit 2404 provided in the swipe event processing unit 2401 performs moving range restriction processing to be described below with reference to FIG. 30 to thereby restrict the moving range of a partial area displayed on the touch UI 1904.

The enlargement/reduction event processing unit 2405 processes the pinch-in event shown in FIG. 21C and the pinch-out event shown in FIG. 21D. Upon reception of the pinch-in event or the pinch-out event, the gesture event processing unit 2002 changes the display magnification of the page 2300 according to the reduction rate or the enlargement rate of the two events. The enlargement/reduction event processing unit 2405 updates the display status of the touch UI 1904 by using the changed display magnification. A reduction-time display mode switching unit 2406 provided in the enlargement/reduction event processing unit 2405 performs reduction-time display mode switch processing to be described below with reference to the flowchart shown in FIG. 31.

The object selection processing unit 2407 processes the double-tap event shown in FIG. 21I. Upon reception of the double-tap event, the gesture event processing unit 2002 performs object selection processing to be described below with reference to FIG. 32 by using coordinate values of the touch coordinates of the double-tap event. The object selection processing is controlled by the object selection processing unit 2407 so that the processing is operated only in the page display mode.

The area of interest event processing unit 2408 processes the touch-and-hold event shown in FIG. 21L. When the touch UI 1904 is touched and held, the gesture event processing unit 2002 receives the touch-and-hold event from the gesture event generation unit 2001. At this time, the area of interest event processing unit 2408 determines an object present within an area excluding the display area of the displayed page by using coordinate values of the touch coordinates of the touch-and-hold event, and registers information about the relevant object as a decorative object in a decorative object registration unit 2410. The decorative object registration processing performed upon registration of a decorative object is controlled by the object selection event processing unit 2407 so that the processing is operated only in the page display mode. The details of the decorative object registration processing will be described below.

The area of interest event processing unit 2408 processes the 4-point swipe event shown in FIG. 21N. When the 4-point swipe is performed on the touch UI 1904, the gesture event processing unit 2002 receives the 4-point swipe event from the gesture event generation unit 2001. Upon reception of the 4-point swipe event, the area of interest event processing unit 2408 performs processing for switching the display mode to an area of interest display mode. The processing will be described below. Here, the area of interest display mode is a mode for displaying an object other than the decorative object. Note that the area of interest display mode is reset upon reading of a new document. The area of interest display mode is held as mode information of the mobile information terminal 107.

Figure 25:
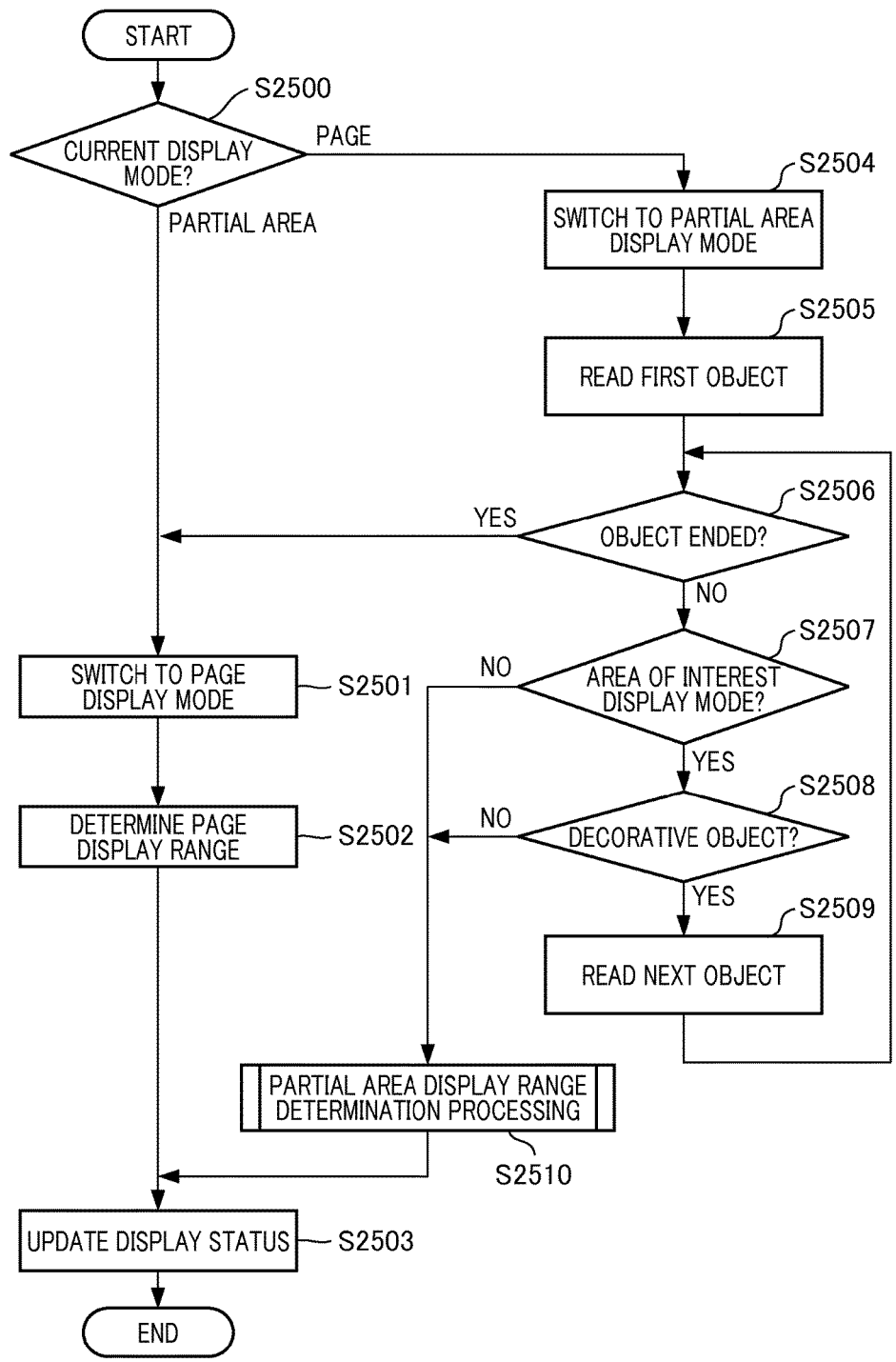
FIG. 25 is a flowchart illustrating mode switch processing.
Figure 26A:
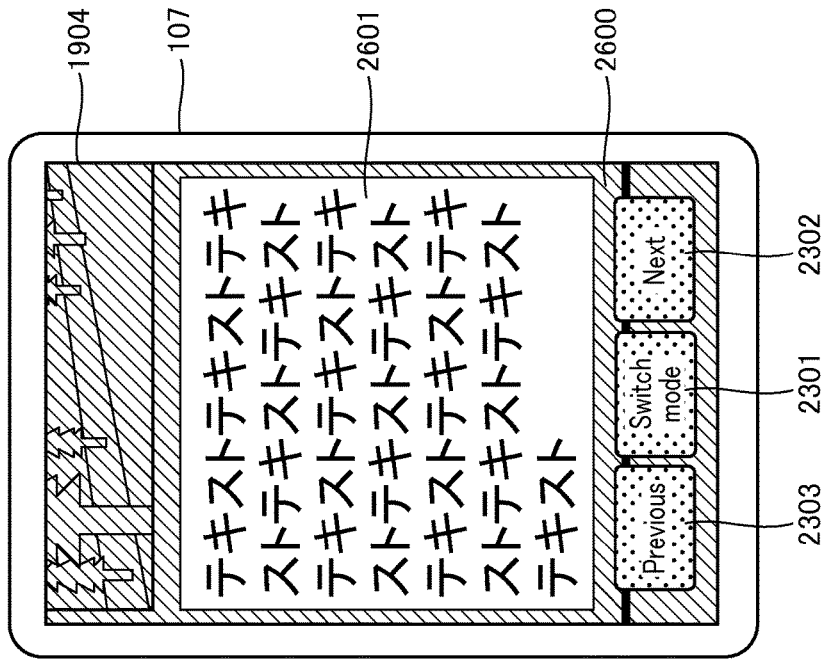
FIGS. 26A and 26B illustrate examples of screen display of the touch UI of the mobile terminal.
Figure 26B:
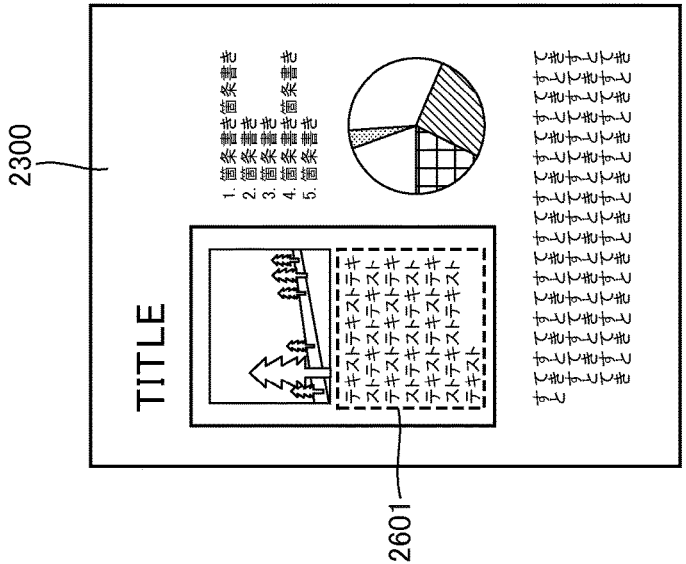

Next, a description will be given of the mode switch processing performed by the display change event processing unit 2400 with reference to FIGS. 23, 25, 26A, and 26B. FIG. 25 is a flowchart illustrating the mode switch processing. The mode switch processing is executed when the "CHANGE MODE" button 2301 which is the display mode switching item shown in FIG. 23 or FIG. 26B is tapped by the user. FIGS. 26A and 26B illustrate examples of screen display of the touch UI 1904 of the mobile terminal 107.

Firstly, in step S2500, the display change event processing unit 2400 acquires the display mode set in the mobile terminal 107 when the display change event processing unit 2400 determines that the "CHANGE MODE" button is tapped by the user. Here, the display mode refers to a method used by the mobile terminal 107 to display the application image data on the touch UI 1904. In the present embodiment, the mobile terminal 107 has the following three display modes as an example. The first display mode is the page display mode suitable for displaying the entire page as shown in FIG. 23. The second display mode is the partial area display mode suitable for enlarging and displaying a partial area (i.e., each object in the page image) in the page as shown in FIGS. 26A and 26B. Specifically, the partial area display mode is the first display mode for enlarging and displaying each object in the page image. As described above, the page display mode is set immediately after the mobile terminal 107 receives the application image data. As shown in FIGS. 26A and 26B, the partial area display mode is a display mode in which the display magnification and the starting point of the page 2300 are controlled so that each object in the page 2300 is enlarged and displayed.

A display event processing unit may switch the display mode in step S2500 when the character object 2601 shown in FIGS. 26A and 26B is single-tapped by the user. Alternatively, the display event processing unit may display the screen shown in FIG. 26A when the "CHANGE MODE" button 2301 shown in FIG. 23 is pressed by the user to thereby cause the user to select an object to be enlarged. When the character object 2601 is selected by the user as an object to be enlarged and displayed, the image shown in FIG. 26B is displayed.

A broken line surrounding the object 2601 shown in FIG. 26A is drawn to help facilitate understanding of the description, and does not actually exist on the page 2300. In the present embodiment, as shown in FIG. 26B, a semi-transparent mask 2600 is transparent for the area of the object 2601 to be enlarged and displayed and semi-transparent gray shown by hatching for the areas other than the object 2601. The semi-transparent mask 2600 is displayed by superimposing it onto the page 2300. By displaying the semi-transparent mask 2600 and the object 2601 with contrast as described above, only the target object is made easily viewable. In other words, superimposing such a semi-transparent mask enables highlighting the target object and dimly displaying objects other than the target object, allowing the user to easily identify the area of the object to be displayed.

When the display mode set when the "CHANGE MODE" button 2301 is tapped is the partial area display mode or the wrapped-display mode, the display change event processing unit 2400 executes processing in step S2501, whereas when the display mode at that time is the page display mode, the display change event processing unit 2400 executes processing in step S2504.

In step S2501, the display change event processing unit 2400 sets not to display the semi-transparent mask 2600 shown in FIGS. 26A and 26B (semi-transparent mask OFF), and switches the display mode to the page display mode for displaying the entire page image. In step S2502, the display change event processing unit 2400 controls the display magnification of the page 2300 according to the width of the touch UI 1904 and controls the starting point of the page 2300 to thereby perform processing (display range determination processing) for determining the page display range. A detail of display range determination processing performed in step S2502 will be described below. In step S2503, the display change event processing unit 2400 updates the display status of the touch UI 1904 based on the determined page display range.

When the display mode set when the "CHANGE MODE" button 2301 is tapped is the page display mode, in step S2504, the display change event processing unit 2400 switches the display mode to the partial area display mode. Then, the display change event processing unit 2400 sets to display the semi-transparent mask 2600 (semi-transparent mask ON).

Next, in step S2505, the display change event processing unit 2400 reads the first object in the page 2300, and acquires the starting point, width, and height of the first object. Here, the first object refers to an object which is read first in the document structure tree of the application image data.

Next, in step S2506, the display change event processing unit 2400 determines whether or not the object is completed. When the object is determined to be completed, the processing proceeds to step S2501. When the object is determined not to be completed, in step S2507, the display change event processing unit 2400 determines whether or not the display mode is the area of interest display mode.

When the display mode is determined to be the area of interest display mode, the processing proceeds to step S2508. In step S2508, it is determined whether or not the read object is equivalent to the decorative object in the flow shown in FIG. 44 to be described below. When the read object is determined to be equivalent to the decorative object, the read object is not displayed but the next object is read in step S2509. Then, the processing returns to step S2506 and the processing is executed again.

On the other hand, when the display mode is determined not to be the area of interest display mode in step S2507 and the read object is determined not to be equivalent to the decorative object in step S2508, the partial area display range determination processing is executed in step S2510. In step S2510, the display range control unit 2403 in the display change event processing unit 2400 performs partial area display range determination processing to be described below. In step S2503, the display range control unit 2403 updates the display status of the touch UI 1904 based on the determined display range. In the partial area display range determination processing in step S2510, the display change event processing unit 2400 controls the display magnification and the starting point of the page according to the attribute of the object read in step S2505 or step S2509 to thereby determine a display range of the partial area to be displayed on the touch UI 1904. The partial area display range determination processing will be described in detail below. In this case, a semi-transparent (gray) mask is applied to areas other than the partial area of the object to be displayed, allowing the user to easily identify the object to be displayed.

Figure 27:
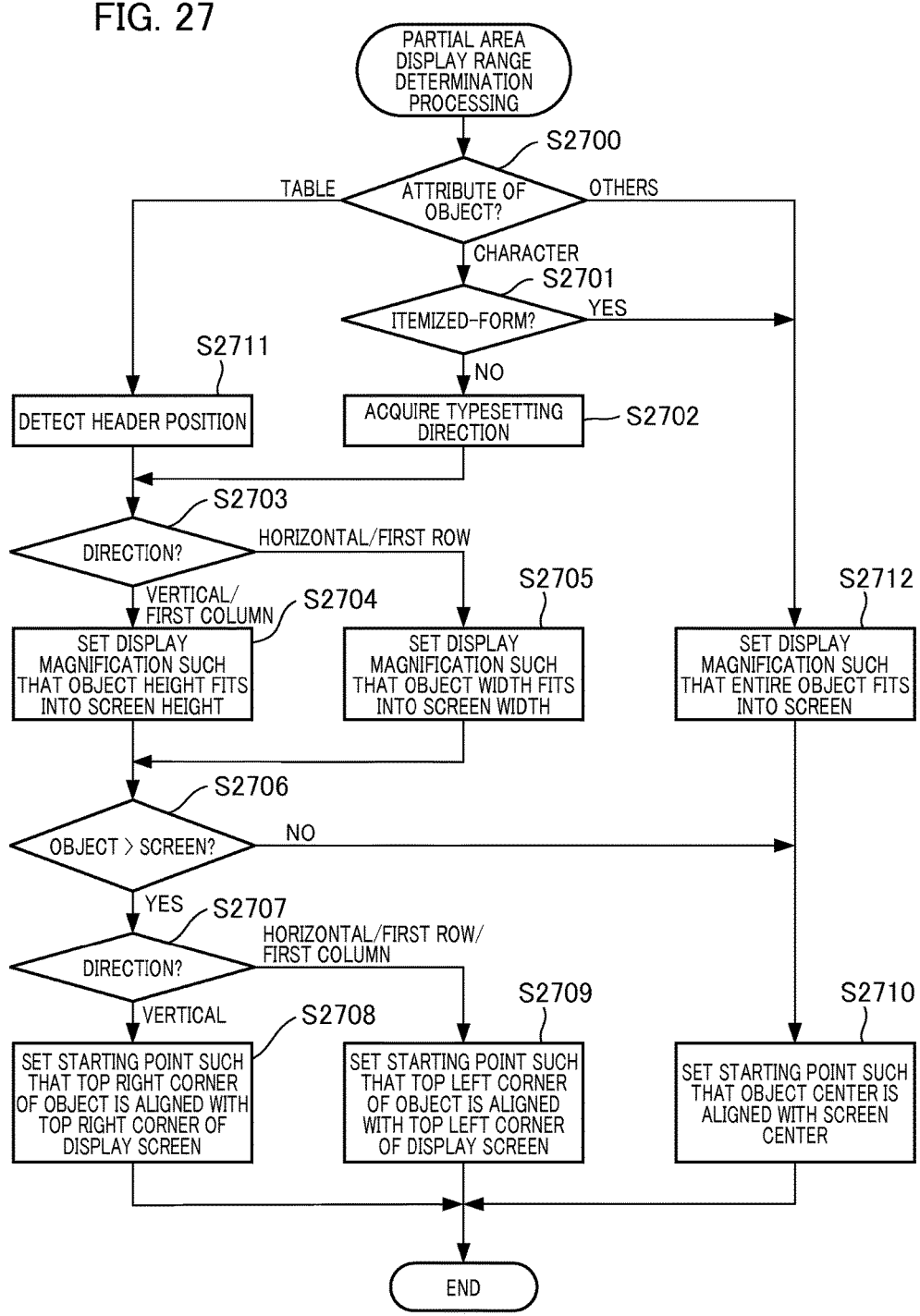
FIG. 27 is a flowchart illustrating partial area display range determination processing.

Next, a detailed description will be given of the partial area display range determination processing performed by the display range control unit 2403 in step S2510 shown in FIG. 25 with reference to the flowchart shown in FIG. 27. In step S2700, the display range control unit 2403 determines the attribute of the read object. When the attribute is determined to be character, the processing proceeds to step S2701. When the attribute is determined to be table, the processing proceeds to step S2711. On the other hand, when the attribute is determined to be others, the processing proceeds to step S2712.

In step S2701, the display range control unit 2403 determines whether or not the object to be displayed having the character attribute is in itemized form. An object in itemized form refers to an object having a point or numeral as a line head character for each character string or line. The line head character can be acquired from the result of the OCR processing. When the object is determined not to be in itemized form but to be an ordinary character string, the processing proceeds to step S2702. On the other hand, when the object is determined to be in itemized form, the processing proceeds to step S2712.

In step S2702, the display range control unit 2403 acquires the typesetting direction of characters in the object. The typesetting direction of the object has been acquired in the vectorization processing in step S504. In step S2703, the display range control unit 2403 determines the typesetting direction of characters. When the typesetting direction is vertical, the processing proceeds to step S2704. On the other hand, when the typesetting direction is horizontal, the processing proceeds to step S2705. When the typesetting direction of characters is vertical, in step S2704, the display range control unit 2403 sets the display magnification of the page such that the height of the relevant object fits into the height of the screen of the touch UI 1904. When the typesetting direction of characters is horizontal, in step S2705, the display range control unit 2403 sets the display magnification of the page such that the width of the relevant object fits into the width of the screen of the touch UI 1904.

Next, in step S2706, the display range control unit 2403 determines whether or not the entire object which has been reduced/enlarged to the display magnification set in step S2704 or S2705 can be displayed on the touch UI 1904. When the entire object is determined to be larger than the touch UI 1904 and the entire object cannot be displayed thereon, the processing proceeds to step S2707. On the other hand, when the entire object is determined to be smaller than the touch UI 1904 and the entire object can be displayed thereon, the processing proceeds to step S2710.

In step S2707, the display range control unit 2403 determines the typesetting direction of characters in the relevant object. When the typesetting direction of characters is determined to be vertical, the processing proceeds to step S2708. On the other hand, when the typesetting direction of characters is determined to be horizontal, the processing proceeds to step S2709.

In step S2708, the display range control unit 2403 sets the starting point position of the page 2300 such that the top right corner of the relevant object is aligned with the top right corner of the touch UI 1904 since the entire object displays the vertical character area which cannot be displayed on the touch UI 1904. Specifically, the display range control unit 2403 sets the display position such that the first line for vertical writing is displayed.

In step S2709, the display range control unit 2403 sets the starting point of the page 2300 such that the top left corner of the relevant object is aligned with the top left corner of the touch UI 1904 since the entire object displays the horizontal writing character area which cannot be displayed on the touch UI 1904. Specifically, the display range control unit 2403 sets the display position such that the first line for horizontal writing is displayed.

In step S2710, since the entire object fits into the screen of the touch UI 1904, the display range control unit 2403 sets the starting point of the page 2300 such that the center of the relevant object is aligned with the center of the touch UI 1904.

When the attribute of the object is determined to be table in step S2700, in step S2711, the display range control unit 2403 detects a header position of the table. The header position can be determined, for example, based on whether or not the font type of the character of the first line (top line) and the first line (leftmost line) is bold, the thickness of the approximation curve of the vector data at the time of vectorization, the thickness of the table ruled line, the background color of each cell in the table, and the like. When the header position of the table detected in step S2711 is determined to be the first line, the processing proceeds to step S2705 from step S2703. When the header position of the table is determined to be the first line, the processing proceeds to step S2704 from step S2703. Since the table header commonly exists at the top row or leftmost line in step S2707, the processing proceeds to step S2709. In step S2709, the display range control unit 2403 sets the starting point of the page such that the top left corner of the object is aligned with the top left corner of the touch UI. Thus, the display position is set such that the table header is displayed. Specifically, the display range control unit 2403 functions as a setting unit in the aforementioned processing. When the attribute of the object is character or table, the display range control unit 2403 sets the display magnification and the display position of the first object such that the range of characters in the typesetting direction fits into the screen.

When the attribute of the object is determined to be others (attributes other than character and table) in step S2700 or when the object is determined to be in itemized form in step S2701, the display range control unit 2403 performs the following processing in step S2712. Specifically, the display range control unit 2403 sets the display magnification of the page such that the entire relevant object fits into the touch UI 1904. In step S2710, the display range control unit 2403 sets the starting point of the page 2300 such that the center of the object is aligned with the center of the touch UI 1904.

Figure 28:
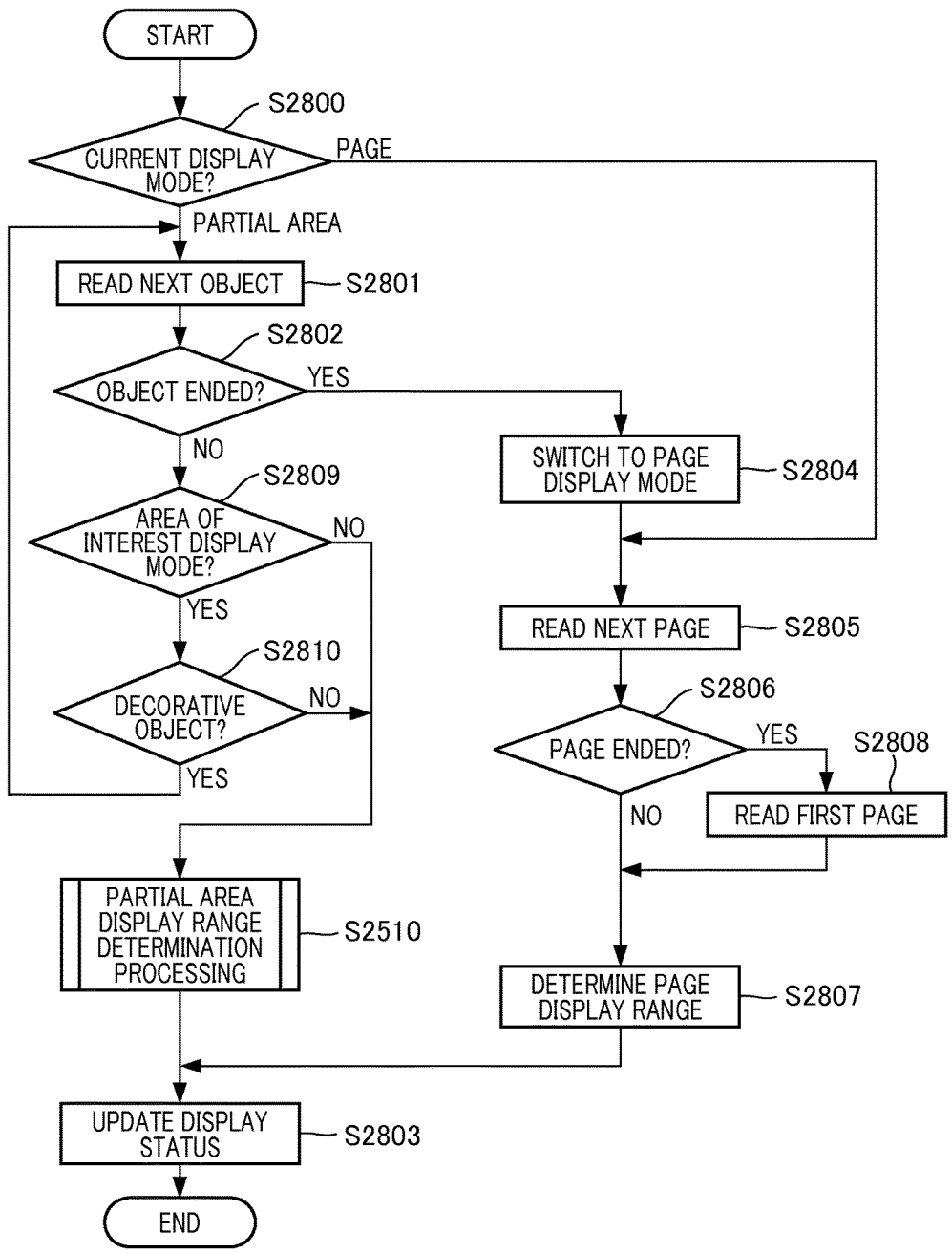
FIG. 28 is a flowchart illustrating NEXT selection processing.

A description will be given of the "NEXT" selection processing ("NEXT" button selection processing)" executed when the "NEXT" button 2302 is tapped (instructed) by the user with reference to the flowchart shown in FIG. 28.

In step S2800, the display change event processing unit 2400 acquires the display mode set in the mobile terminal 107 when the "NEXT" button 2302 serving as a next processing item is tapped. When the acquired display mode is the partial area display mode, the processing proceeds to step S2801. When the acquired display mode is the page display mode, the processing proceeds to step S2805.

In step S2801, the display order control unit 2402 selects a next display target object based on the document structure tree out of all of the objects of the currently read page, and reads the relevant object. In the present embodiment, objects on the document tree structure are displayed from the first highest hierarchical level downward, specifically, in order of an object belonging to the first highest hierarchical level, an object belonging to the second hierarchical level, and so on. When all of objects belonging to the next lower hierarchical levels have been displayed, objects are displayed from a higher hierarchical level downward, specifically, in order of an object belonging to the next higher hierarchical level, an object belonging to the lower hierarchical level under the next higher hierarchical level, and so on.

For example, in FIG. 17, V0 denotes a page and H1 denotes an object which is read first. When the "NEXT selection processing" is performed in a state where the object H1 is displayed on the touch UI 1904 in the partial area display mode, the object H1 has a lower hierarchical level, and thus, an object T1 is read. Furthermore, when the "NEXT selection processing" is performed in a state where the object T1 is displayed, the object T1 does not have a lower hierarchical level and an object T2 exists in the same hierarchical level as the object T1, and thus, the object T2 is read. When the "NEXT selection processing" is performed in a state where the object T2 is displayed, the object T2 does not have a lower hierarchical level and no more object exists in the relevant hierarchical level, and thus, an object S1 belonging to the next higher hierarchical level is read. Although, in the present embodiment, the object H1 not having a rendering element is selected and read, it goes without saying that only the objects T1 and T2 having a rendering element may be selected. Also, only an object having a specific attribute, for example, an object having the "character" attribute may be selected, or only an object having a specific attribute may be excluded. Furthermore, only an object such as H1 or V1 not having a rendering element itself but having a rendering element in a lower hierarchical level may be selected.

In step S2802, the display order control unit 2402 determines whether or not the next object has been read in step S2801. When the next object is determined to have been read in step S2801 (when a selectable object exists), the processing proceeds to step S2809, and then it is determined whether or not the display mode is the area of interest display mode. When the display mode is determined to be the area of interest display mode in step S2809, the processing proceeds to step S2810, and then it is determined whether or not the read object is a decorative object. When the read object is determined to be a decorative object in step S2810, the processing returns to step S2801, and the same processing is executed again. Note that the processing for determining whether or not the read object is a decorative object will be described below.

On the other hand, when the display mode is determined not to be the area of interest display mode in step S2809 and the relevant object is determined not to be a decorative object in step S2810, the read object is set to a display target, and the processing proceeds to step S2510. Since the partial area display range determination processing in step S2510 has already been described, the explanation thereof will be omitted. In step S2803, the display order control unit 2402 updates the display status of the touch UI 1904 by using the display magnification and the starting point of the page controlled based on the attribute, starting point, width, and height of the read object.

On the other hand, when the next object is determined not to have been read in step S2801 (when no selectable object exists), the last object in the page has already been read. Thus, the display order control unit 2402 determines that the display processing is completed for all objects in step S2802, and the processing proceeds to step S2804. In step S2804, the display order control unit 2402 ends the partial area display mode, sets not to display the semi-transparent mask 2600, and switches the display mode to the page display mode.

In step S2805, since the display mode is the page display mode, the display order control unit 2402 analyzes the syntax of the application image data stored in the RAM 1911, and reads the next page and objects contained therein.

In step S2806, the display order control unit 2402 determines whether or not the next page has been read. When the next page has been read in step S2805, the processing proceeds to step S2807. On the other hand, when the last page of the application image data stored in the RAM 1911 has already been read and there is no next readable page in step S2805, the processing proceeds to step S2808. In step S2808, the display order control unit 2402 analyzes the syntax of the application image data stored in the RAM 1911, and reads the first page and objects contained therein.

Next, in step S2807, the display range control unit 2403 controls the display magnification of the page according to the width of the touch UI 1904 by the display range determination processing (details of which will be described below) performed in step S2502 and controls the starting point of the page to thereby determine the page display range. In step S2803, the display range control unit 2403 updates the display status of the touch UI 1904 based on the determined page display range. As described above, an area which is of interest to the user can only be displayed to the user without displaying an object determined as a decorative object.

Figure 29:
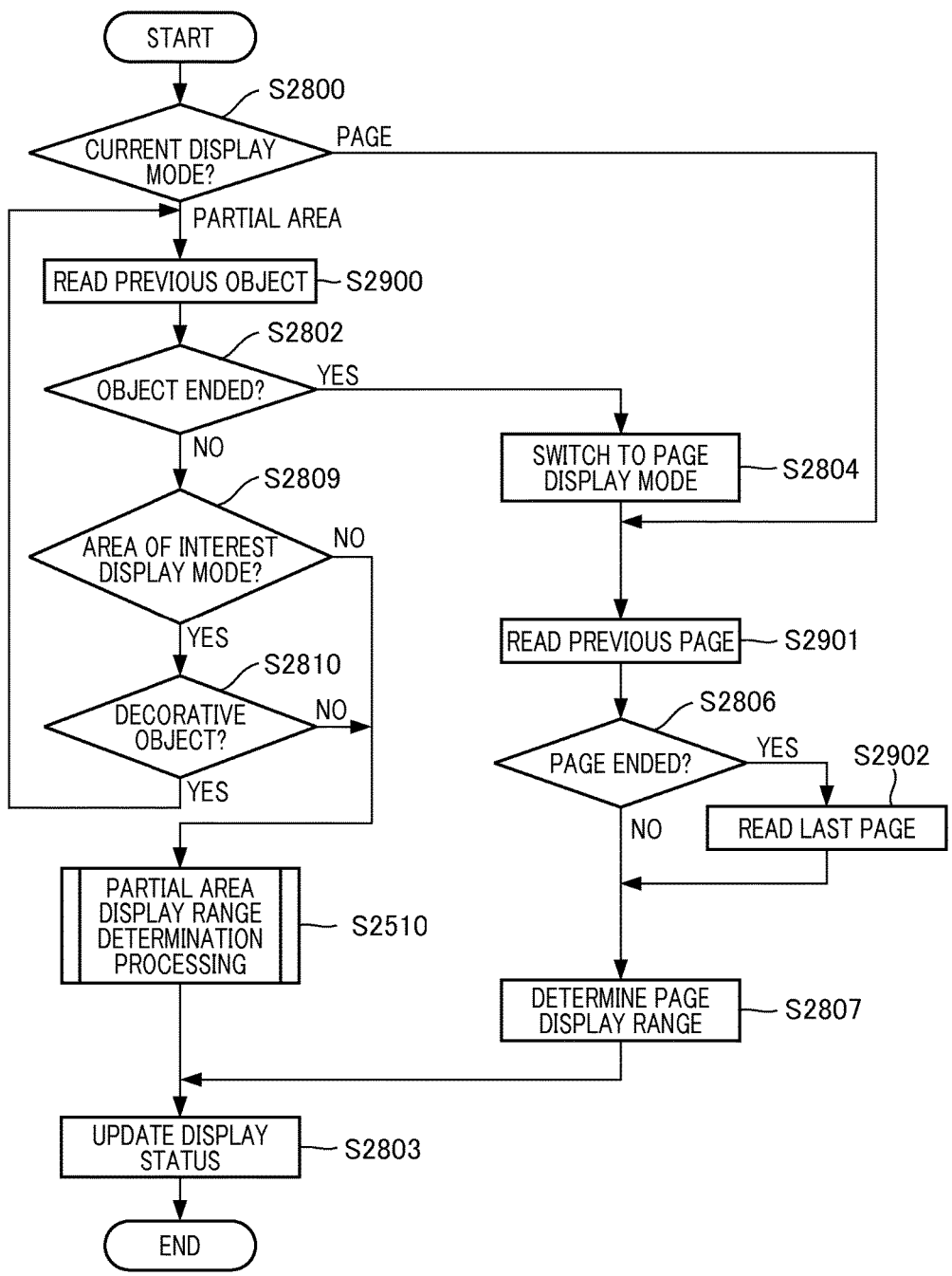
FIG. 29 is a flowchart illustrating PREVIOUS selection processing.

Next, a description will be given of the "PREVIOUS selection processing ("PREVIOUS" button selection processing)" executed when the "PREVIOUS" button 2303 is tapped (instructed) by the user with reference to the flowchart shown in FIG. 29. The PREVIOUS selection processing has almost the same configuration as the NEXT selection processing, and redundant description thereof will be omitted and only different portions (steps S2900, S2901, and S2902) will be described below.

When the current display mode is the partial area mode, the display order control unit 2402 selects a next display target object based on the document structure tree out of all of the objects of the currently read page, and reads the relevant object in step S2900. In the present embodiment, when the "PREVIOUS" button 2303 is tapped, objects on the document tree structure are displayed from the lowest hierarchical level upward, specifically, in order of objects belonging to the lowest hierarchical level, objects belonging to the second lowest hierarchical level, and so on. Specifically, when all of objects belonging to a lower hierarchical level have been displayed, other objects belonging to the higher hierarchical level are displayed.

For example, in FIG. 17, a last object T7 belonging to the lowest hierarchical level is read first. In the partial area display mode, when the "PREVIOUS" button 2302 serving as a PREVIOUS processing item is tapped in a state where the object T7 is displayed on the touch UI 1904, an object T6 existing in the same hierarchical level is read. Furthermore, when the "PREVIOUS selection processing" is performed in a state where the object T6 is displayed, an object V2 belonging to the higher hierarchical level is read since no other objects exist in the same hierarchical level. When the "PREVIOUS selection processing" is performed in a state where the object V2 is displayed, a last object T5 belonging to the lower hierarchical level of the object V1 is read since an object V1 exists in the same hierarchical level and has objects in the lower hierarchical level.

Also in the "PREVIOUS selection processing", as in the "NEXT selection processing", it is also possible to select only objects having a rendering element, select only objects having a specific attribute, or select objects by excluding only objects having a specific attribute. Furthermore, only an object such as H1 or V1 not having a rendering element itself but having a rendering element in a lower hierarchical level may be selected.

In step S2901, since the display mode is the page display mode, the display order control unit 2402 analyzes the syntax of the application image data stored in the RAM 1911, and reads the previous page and objects contained therein. In step S2806, the first page of the application image data stored in the RAM 1911 has already been read. When there is no next readable page in step S2901, the display order control unit 2402 analyzes the syntax of the application image data stored in the RAM 1911, and reads the last page and objects contained therein in step S2902.

Figure 30:
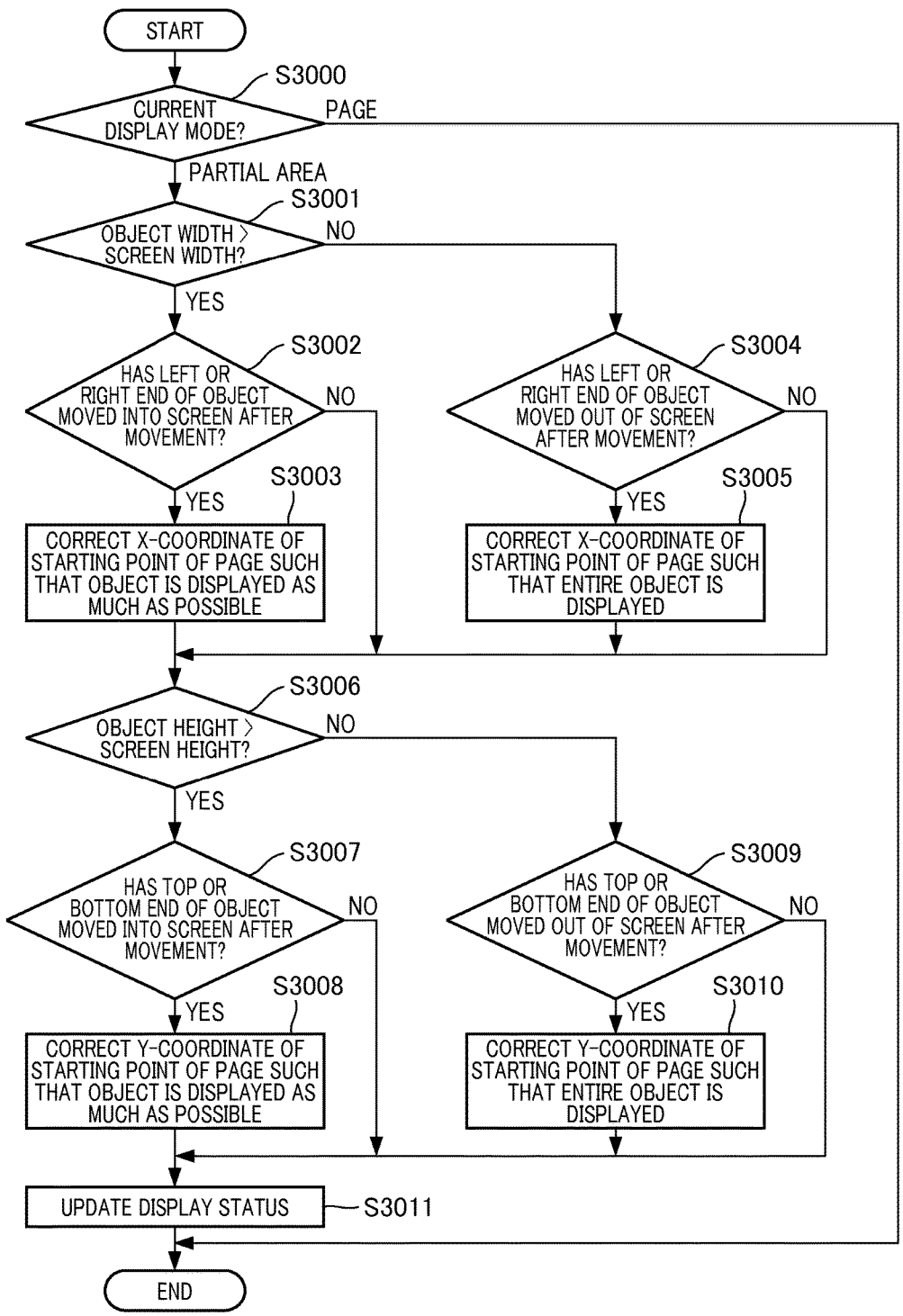
FIG. 30 is a flowchart illustrating moving range restriction processing.

Next, a description will be given of the moving range restriction processing performed by the moving range restriction unit 2404 of the swipe event processing unit 2401 with reference to the flowchart shown in FIG. 30. In step S3000, the moving range restriction unit 2404 acquires the display mode set in the mobile terminal 107 when the swipe operation is performed, and determines the current display mode. When the moving range restriction unit 2404 determines that the display mode is the partial area display mode, the processing proceeds to step S3001. When the moving range restriction unit 2404 determines that the display mode is the page display mode, the processing ends without performing any processing.

When the display mode is determined to be the partial area display mode in step S3000, the processing proceeds to step S3001. In step S3001, the moving range restriction unit 2404 determines whether or not the width of the currently read object when displayed with the display magnification for the current page is larger than the width of the screen of the touch UI 1904. When the width of the relevant object is larger than the width of the screen of the touch UI 1904, the processing proceeds to step S3002. Otherwise, the processing proceeds to step S3004.

In step S3002, the moving range restriction unit 2404 performs the following determination when the swipe event processing unit 2401 moves the display position of the page containing the relevant object according to the moving distance of the swipe event. In other words, the moving range restriction unit 2404 determines whether or not the left or right end of the object has moved into the screen of the touch UI 1904. Consequently, when the left or right end of the object is determined to be within the screen of the touch UI 1904, the processing proceeds to step S3003. Otherwise, the processing proceeds to step S3006.

In step S3003, the moving range restriction unit 2404 corrects the x-coordinate of the starting point of the page to move the left or right end of the relevant object, which has moved into the screen, respectively to the left or right end of the screen of the touch UI 1904 so that the relevant object is displayed as much as possible.

On the other hand, when the swipe event processing unit 2401 moves the display position of the page containing the relevant object according to the moving distance of the swipe event in step S3004, the moving range restriction unit 2404 determines whether or not the left or right end of the object has moved out of the screen of the touch UI 1904. Consequently, when the left or right end of the relevant object is determined to be out of the screen of the touch UI 1904, the processing proceeds to step S3005. Otherwise, the processing proceeds to step S3006.

In step S3005, the moving range restriction unit 2404 corrects the x-coordinate of the starting point of the page to move the left or right end of the relevant object respectively to the left or right end of the screen so that the entire relevant object is displayed. When the size of the object is equal to or less than that of the screen, the user's visibility is improved by the correction. In step S3006, the moving range restriction unit 2404 determines whether or not the height of the currently read object when displayed with the display magnification for the current page is larger than the height of the screen of the touch UI 1904. When the height of the relevant object is determined to be larger than the screen height of the touch UI 1904, the processing proceeds to step S3007. Otherwise, the processing proceeds to step S3009.

In step S3007, the moving range restriction unit 2404 determines whether or not the top or bottom end of the object has moved into the screen of the touch UI 1904 when the swipe event processing unit 2401 moves the display position of the page containing the relevant object according to the moving distance of the swipe event. Consequently, when the top or bottom end of the object is determined to be within the screen of the touch UI 1904, the processing proceeds to step S3008. Otherwise, the processing proceeds to step S3011.

In step S3008, the moving range restriction unit 2404 corrects the Y-coordinate of the starting point of the page to move the top or bottom end of the relevant object, which has moved into the screen, respectively to the top or bottom end of the screen so that the relevant object is displayed as much as possible.

When the height of the relevant object is determined not to be larger than the screen height of the touch UI 1904 in step S3006, the processing proceeds to step S3009. In step S3009, the moving range restriction unit 2404 determines whether or not the top or bottom end of the object has moved out of the screen of the touch UI 1904 when the swipe event processing unit 2401 moves the display position of the page containing the relevant object according to the moving distance of the swipe event. When the top or bottom end of the object is determined to have moved out of the screen of the touch UI 1904, the processing proceeds to step S3010. Otherwise, the processing proceeds to step S3011.

In step S3010, the moving range restriction unit 2404 corrects the y-coordinate of the starting point of the page to move the top or bottom end of the relevant object into the screen so that the entire relevant object is displayed. Finally, in step S3011, the display change event processing unit 2400 updates the display status of the touch UI 1904 according to the display magnification and the starting point of the page.

As described above, the user can recognize the entire object as much as possible even when the moving distance of the swipe event is large by restricting the moving range of the object.

Figure 31:
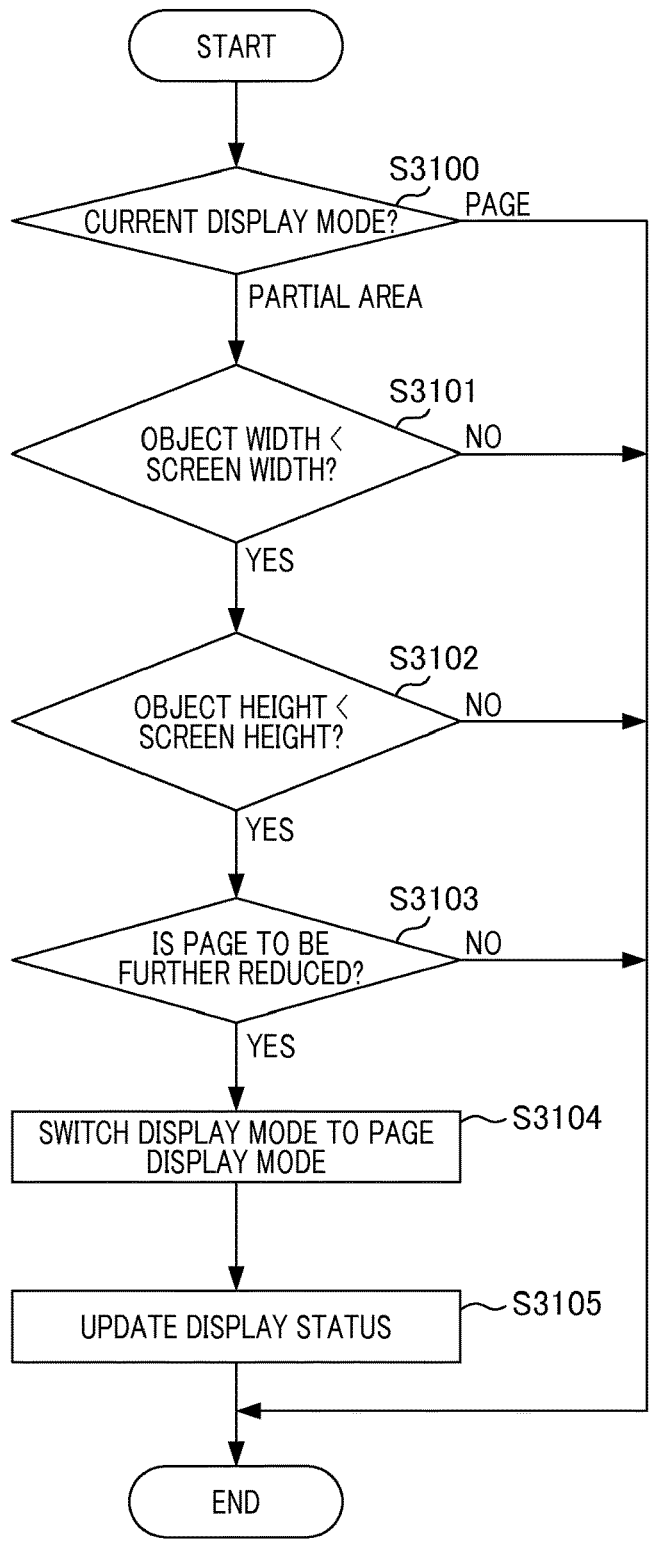
FIG. 31 is a flowchart illustrating reduction-time display mode switch processing.

Next, a description will be given of the reduction-time display mode switch processing performed by the reduction-time display mode switching unit 2406 of the enlargement/reduction event processing unit 2405 when the pinch-in operation is performed with reference to the flowchart shown in FIG. 31. In step S3100, the reduction-time display mode switching unit 2406 acquires the display mode set in the mobile terminal 107 when an operation to instruct the reduction processing is performed by the user. When the acquired display mode is the partial area display mode, the processing proceeds to step S3101. When the acquired display mode is the page display mode, the processing ends without performing any processing.

In step S3101, the reduction-time display mode switching unit 2406 determines whether or not the width of the currently read object when displayed with the display magnification for the current page is smaller than the width of the screen of the touch UI 1904. When the width of the relevant object is determined to be smaller than the width of the screen of the touch UI 1904, the processing proceeds to step S3102. Otherwise, the processing ends without performing the switch processing.

In step S3102, the reduction-time display mode switching unit 2406 determines whether or not the height of the currently read object when displayed with the display magnification for the current page is smaller than the height of the screen of the touch UI 1904. When the height of the relevant object is determined to be smaller than the screen height of the touch UI 1904, the processing proceeds to step S3103. Otherwise, the processing ends without performing the switch processing.

In step S3103, the reduction-time display mode switching unit 2406 determines whether or not the display magnification of the page containing the relevant object is to be further reduced. Specifically, the reduction-time display mode switching unit 2406 determines whether or not the received event is the pinch-in event. When the reduction-time display mode switching unit 2406 determines that the page is to be further reduced, the processing proceeds to step S3104. Otherwise, the processing ends without performing any processing.

In step S3104, the reduction-time display mode switching unit 2406 sets not to display the semi-transparent mask 2600, and switches the display mode of the mobile terminal 107 from the partial area display mode to the page display mode. In other words, when the entire object is displayed within the screen in the partial area display mode and the pinch-in event is performed, the reduction-time display mode switching unit 2406 switches the display mode to the page display mode which is the third display mode. Finally, in step S3105, the display change event processing unit 2400 updates the display status of the touch UI 1904 according to the display magnification and the starting point of the page determined based on the pinch-in event.

Figure 32:
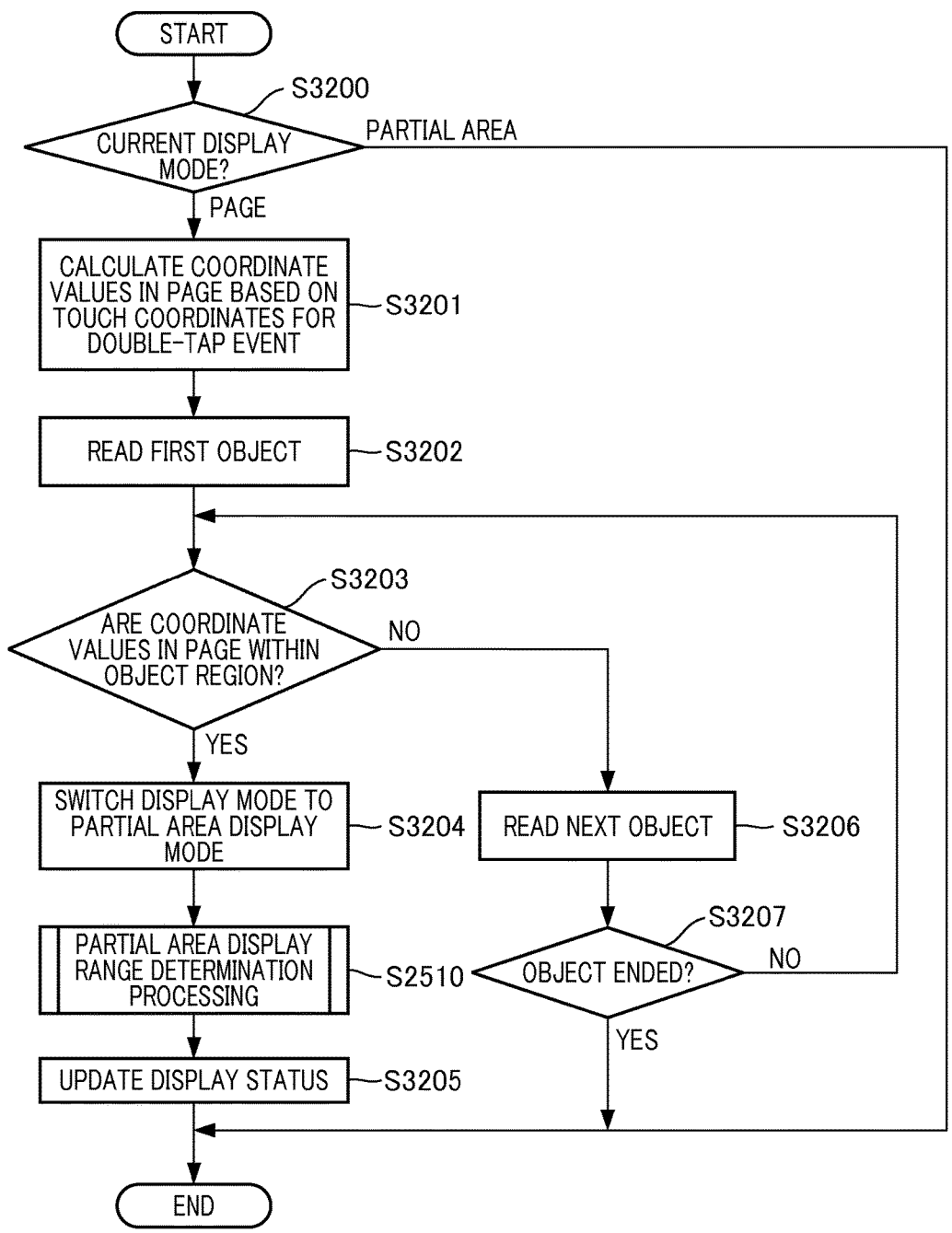
FIG. 32 is a flowchart illustrating object selection processing.

Next, a description will be given of the object selection processing with reference to the flowchart shown in FIG. 32. The object selection processing is processing that is executed by the object selection processing unit 2408 when the double-tap operation is performed by the user. In step S3200, the object selection processing unit 2408 acquires the display mode set in the mobile terminal 107 when the double-tap operation is performed by the user. When the acquired display mode is the page display mode, the processing proceeds to step S3201. When the acquired display mode is the partial area display mode, the processing ends without performing any processing.

In step S3201, the object selection processing unit 2408 acquires coordinate values of the touch coordinates for the received double-tap event. Since the coordinate values of the touch coordinates are coordinate values on the touch UI 1904, the object selection processing unit 2408 converts them into coordinate values in the page based on the display magnification and the starting point of the page displayed on the touch UI 1904.

In step S3202, the object selection processing unit 2408 reads information about the first object out of all of objects in the current page displayed on the touch UI 1904. In step S3203, the object selection processing unit 2408 determines whether or not coordinate values in the page acquired in step S3201 are included in the area information of the read object. When the coordinate values in the page are included in the area information of the read object, the processing proceeds to step S3204. Otherwise, the processing proceeds to step S3206.

In step S3204, the object selection processing unit 2408 switches the display mode of the mobile terminal 107 from the page display mode to the partial area display mode. At the same time, the object selection processing unit 2408 displays the non-display semi-transparent mask 2600 to apply a semi-transparent mask to the areas other than the double-tapped object, and the processing proceeds to step S2510.

In step S2510, the object selection processing unit 2408 performs the partial area display range determination processing for the object (i.e., the double-tapped object) read in step S3202 or S3206. The partial area display range determination processing is as described above, and redundant description thereof is omitted.

In step S3205, the display change event processing unit 2400 updates the display status of the touch UI 1904 according to the display magnification and the starting point of the page determined in the partial area display range determination processing.

On the other hand, in step S3206, the object selection processing unit 2408 reads information about an object next to the currently read object out of all of objects in the current page.

In step S3207, the object selection processing unit 2408 determines whether or not the next object has been read in step S3206. When the next object is determined to have been read, the processing returns to step S3203. When the next object is determined not to have been read, the processing ends without performing any processing.

Although, in the present embodiment, the object selection processing unit 2408 determines whether or not the coordinate values in the page are included in the area information of each object for all of objects in the page currently displayed on the touch UI 1904, the processing is not limited thereto. For example, as in the PREVIOUS selection processing and the NEXT selection processing, it is also possible to ignore objects not having a rendering element and select only objects having a rendering element. Furthermore, it is also possible to select only objects having a specific attribute (such as objects having the character attribute) or select objects by excluding only objects having a specific attribute.

Figure 38:
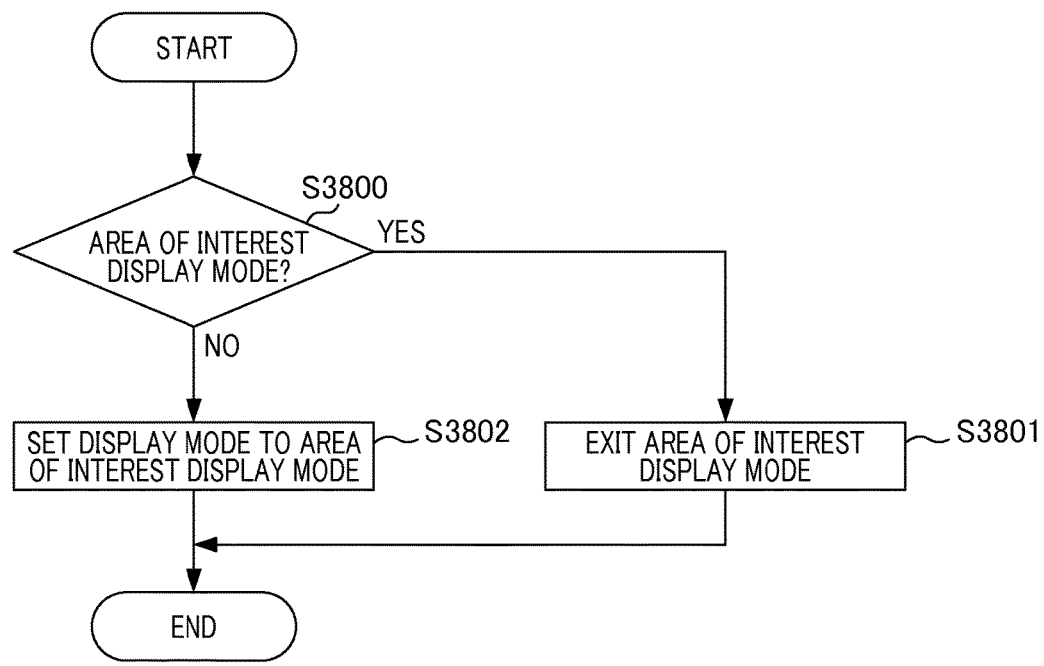
FIG. 38 is a flowchart for switching a display mode to an area of interest display mode.

Next, a description will be given of processing for switching a display mode to an area of interest display mode by the area of interest event processing unit 2408. FIG. 38 is a flowchart for switching a display mode to an area of interest display mode. Firstly, in step S3800, the area of interest event processing unit 2408 determines whether or not the display mode is the area of interest display mode. When the display mode is the area of interest display mode, the processing proceeds to step S3801, and then the area of interest display mode is exit in step S3801. When the display mode is not the area of interest display mode, the processing proceeds to step S3802, and the display mode is set to the area of interest display mode in step S3802. In this manner, the display mode can be switched between the area of interest display mode and other modes.

Next, a description will be given of decorative object information which is registered in the decorative object registration unit 2410 by decorative object registration processing to be described below. FIG. 39A illustrates a registration list for registering decorative objects. FIG. 39B illustrates registration list information about decorative objects. Upon reading of a new document, the decorative object registration list and decorative object registration list information in pair therewith, which have been registered by that time, are all deleted and initialized. The decorative object registration list and the decorative object list information are registered in the recording device 112.

Figure 45:
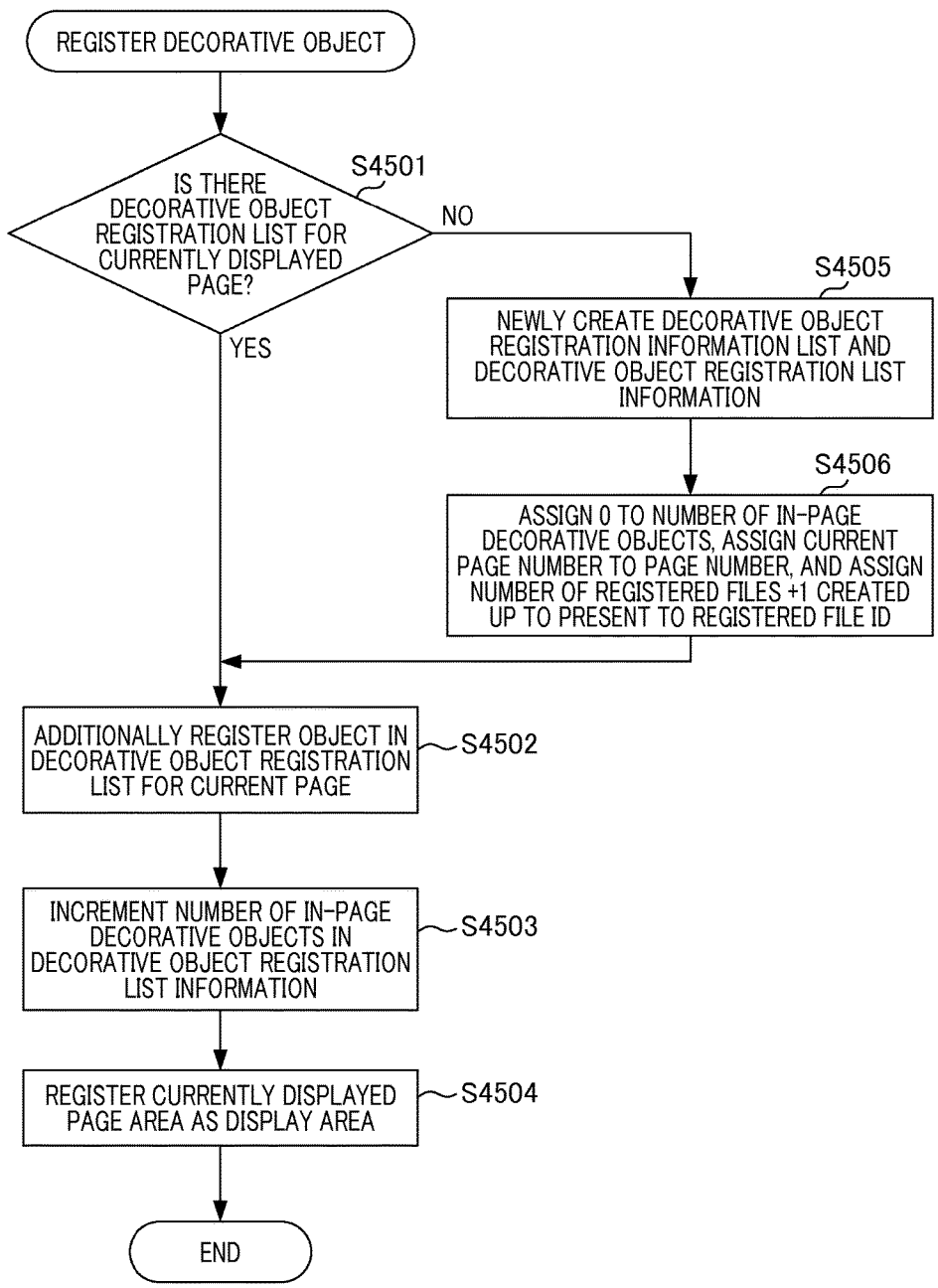
FIG. 45 is a flowchart for registering a decorative object.

Next, a description will be given of a series of operations in the decorative object registration processing with reference to FIG. 45. If more than a predetermined time has elapsed without moving the display area desired to be displayed to the user with the display area being displayed after adjustment of the relevant page by enlarging or reducing the display area, the gesture event generation unit 2001 sends the touch-and-hold event to the gesture event processing unit 2002. The decorative object registration unit 2410 performs the decorative object registration processing.

Firstly, in step S4501, the decorative object registration unit 2410 determines whether or not there is a decorative object registration list for a currently displayed page in the recording device 112. When there is a decorative object registration list for the relevant page, the processing shifts to step S4502, and information about an object which is present in an area excluding the display area displayed by the touch-and-hold is registered as a decorative object in the decorative object registration list for the current page. In step S4503, the decorative object registration unit 2410 increments (increases) the number of in-page decorative objects NB in the relevant page registered in the decorative object registration list information. In step S4504, the currently displayed page area is registered as a display area.

On the other hand, when there is no decorative object registration list for a currently displayed page in step S4501, the processing shifts to step S4505, and a decorative object registration information list and decorative object registration list information are newly created in the recording device 112. In step S4506, the number of in-page decorative objects NB in the relevant page registered in the decorative object registration list information is registered as 0, and the current page number is registered as a page number. A numerical value which is the number of registered files +1 created up to the present is registered as a registered file ID.

As shown in FIG. 39A, information registered in the decorative object registration list includes the attribute, position coordinates X and Y, width W, height H, OCR information, and color information for an object to be registered. The attribute is represented by a numerical value 1, 2, and 3, respectively indicating a character area rectangular block, a photographic area rectangular block, and a graphic area rectangular block. The coordinates X and Y represent the X- and Y-coordinates of the starting point (the coordinates of the top left corner) of each rectangular block in the input image. The width W is the width in the X-coordinate direction of the rectangular block, and the height H is the height in the Y-coordinate direction thereof. The OCR information indicates the presence or absence of pointer information to character-coded data generated by the OCR processing. The color information is represented by a numerical value 1 or 2, respectively indicating color and monochrome. Furthermore, as shown in FIG. 39B, the total number of blocks N indicating the total number of blocks for a decorative object registered on the page and a page number under which the decorative object is registered are stored as registration list information. For the rectangular information X, Y, XX, and YY for a display area, the display area displayed upon registration of a decorative object is stored. Each time a decorative object is registered for a new page, the decorative object registration list and the decorative object registration list information are assigned to individual memory areas in the recording device 112, and are created as new files for storage.

Figure 42:
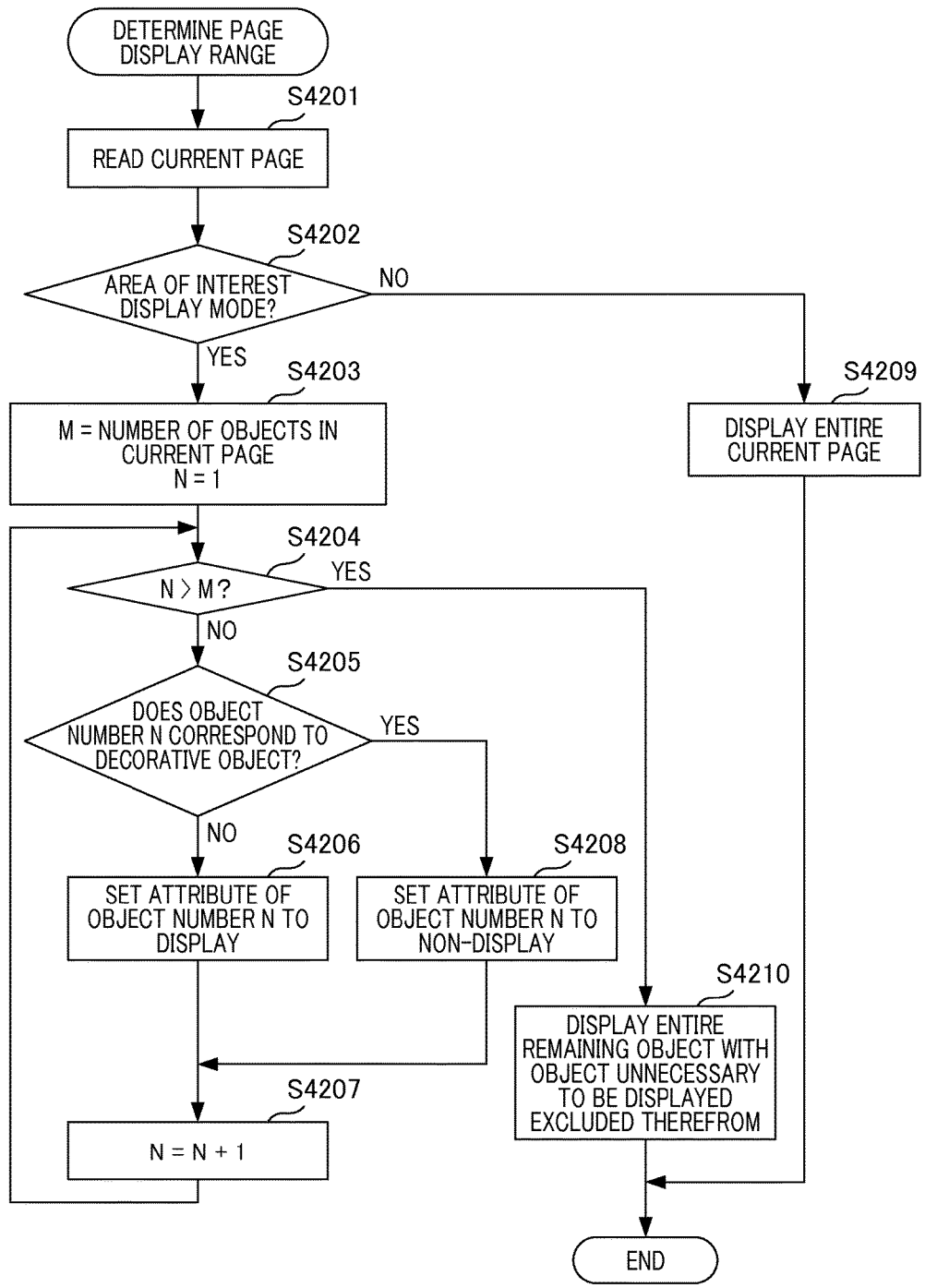
FIG. 42 is a flowchart for determining a displaying range of a page.

Next, a description will be given of the display range determination processing performed in step S2502 with reference to FIG. 42. FIG. 42 illustrates a basic flow of the display range determination processing. Firstly, in step S4201, the display change event processing unit 2400 reads the entire currently displayed page. Next, it is determined in step S4202 whether or not the area of interest display mode is set with reference to the area of interest display mode information set in the mobile information terminal 107. When the area of interest display mode is set, the processing proceeds to step S4203. When the area of interest display mode is not set, the processing proceeds to step S4209. The mobile information terminal 107 controls the display magnification for the current page according to the width of the touch UI 1904, determines a page range under control of the starting point of the current page, and then ends the processing.

On the other hand, when it is determined in step S4202 that the area of interest display mode is set, the total number of objects in the current page is defined as M, and the number of the object is defined as N, where N starts from 1. Next, in step S4204, the area of interest event processing unit 2408 determines the magnitude between M and N. When N is determined not to be greater than M, the processing proceeds to step S4205. In step S4205, the display change event processing unit 2400 determines whether or not the object in the page corresponds to the decorative object. At this time, the display change event processing unit 2400 determines in step S4205 whether or not all of objects in the page, i.e., all of objects having the object number of from 1 to M in the page are decorative objects. When the relevant object is determined to be a decorative object, the processing proceeds to step S4208, and the attribute of the corresponding object number N is set to "non-display" in step S4208. When the relevant object is determined not to be a decorative object, the processing proceeds to step S4206, and the attribute of the corresponding object number N is set to "display". Then, the processing proceeds to step S4207, the object number N is incremented by 1, and then the processing continues by returning to step S4204.

On the other hand, when N is determined to be greater than M in step S4204, the processing proceeds to step S4210. The mobile information terminal 107 controls the display magnification for the entire remaining objects with an object determined unnecessary to be displayed excluded therefrom according to the width of the touch UI 1904, determines a page display range under control of the starting point of the current page, and then ends the processing.

Figure 46:
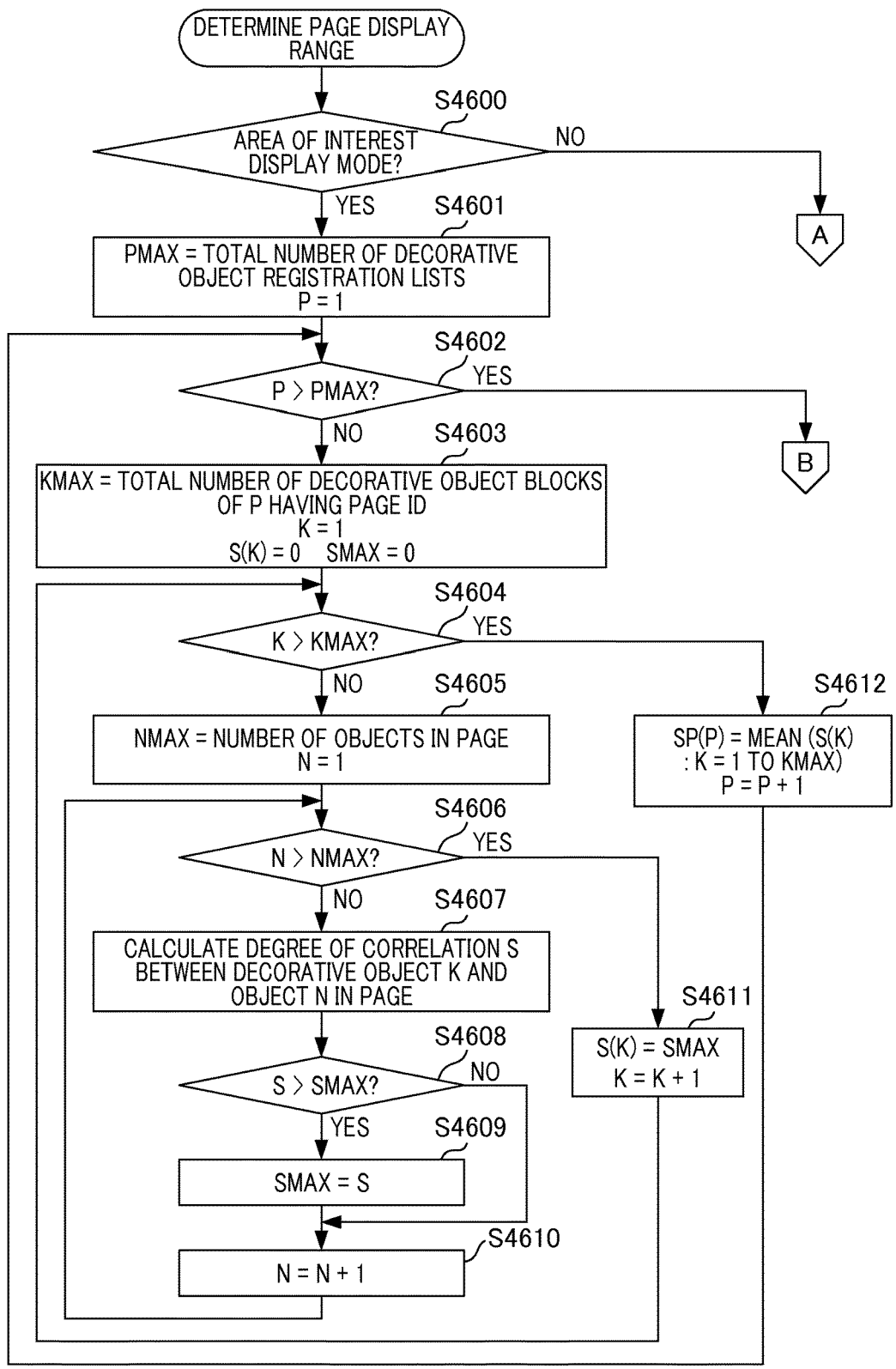
FIG. 46 is a flowchart for determining a rendering range of a page.

Next, a description will be given of another display area determination processing with reference to FIGS. 46 and 47. The processing is performed when the user displays a new page in the page display mode, and the most unique feature of the processing is the method for calculating a display area when a new page is displayed in the area of interest display mode. Specifically, when a new page is displayed in the area of interest display mode, a calculation is performed so as to determine which one of the decorative object registration lists stored (registered) so far has the highest correlation with an object in a page to be currently displayed. The display range registered in the registration list information file on the decorative object registration list having the highest correlation with the object is employed as a display area. In this manner, when a new page is displayed, a page having the same decorative object as that for the page registered in the past can be automatically displayed in the same display range as that adjusted in advance by the user.

Here, given that the list number of the page ID of the current page for objects corresponding to decorative objects is defined as P and an average of matches between the objects of the page and the object of the relevant current page is defined as SMAX. Firstly, it is determined in step S4600 whether or not the currently displayed page is in the area of interest display mode. When it is determined in step S4600 that the currently displayed page is not in the area of interest display mode, the processing proceeds to step S4620. In step S4620, the entire page to be currently displayed is set as a display area, and the processing ends in step S4621.

On the other hand, when it is determined in step S4600 that the currently displayed page is in the area of interest display mode, the processing proceeds to step S4601. In step S4601, the total number of the decorative object registration lists is defined as PMAX and the list number is defined as P, where P starts from 1. Next, it is determined in step S4602 whether or not P is greater than PMAX. When it is determined in step S4602 that P is greater than PMAX, the processing proceeds to step S4613. The processing in step S4613 will be described below. On the other hand, when it is determined in step S4602 that P is less than PMAX, the processing proceeds to step S4603. In step S4603, the object block number of decorative objects corresponding to the list number P of the page ID is defined as KMAX, and the block number is defined as K, where K starts from 1. Then, both S(K) and SMAX are set to 0, and the processing proceeds to step S4604.

Next, it is determined in step S4604 whether or not K is greater than KMAX. When it is determined in step S4604 that K is greater than KMAX, the processing proceeds to step S4612. In step S4612, the average of S(K) when the block number K varies from 1 to KMAX is defined as SP(P), and the list number P is incremented by 1. Then, the processing continues by returning to step S4602.

On the other hand, when it is determined in step S4604 that K is less than KMAX, the processing proceeds to step S4604. In step S4604, the number of objects in a page to be displayed is defined as NMAX and the object number is defined as N, where N starts from 1. Next, it is determined in step S4606 whether or not N is greater than NMAX. When N is greater than NMAX, the processing proceeds to step S4611. In step S4611, SMAX is assigned to S(K) and the block number K is incremented by 1. Then, the processing continues by returning to step S4604.

At this time, a degree of correlation S of an object having the highest correlation with the decorative object K from among the objects in the page is stored in S(K). When the processing returns from step S4611 to step S4606, the correlation value of an in-page object mostly matched with the decorative object K is assigned to S(K).

On the other hand, when it is determined in step S4606 that N is less than NMAX, the processing proceeds to step S4607. In step S4607, a degree of correlation S is calculated. The method for calculating a degree of correlation S will be described below with reference to FIG. 48. Next, after a degree of correlation S is calculated in step S4607, it is determined in step S4608 whether or not S is greater than SMAX. When it is determined in step S4608 that S is greater than SMAX, the processing proceeds to step S4609. In step S4609, SMAX is set to S, and then the processing proceeds to step S4610. On the other hand, when it is determined in step S4608 that S is less than SMAX, the processing proceeds to step S4610. In step S4610, the object number N is incremented by 1. Then, the processing continues by returning to step S4606.

When it is determined in step S4602 that P is greater than PMAX, P is set to 1 and SMAX is set to 0 in step S4613. Next, it is determined in step S4614 whether or not P is greater than PMAX. When it is determined in step S4614 that P is less than PMAX, the processing proceeds to step S4615. It is determined in step S4615 whether or not S(P) is greater than SMAX. When S(P) is greater than SMAX, the processing proceeds to step S4616. In step S4616, SMAX is set to S(P) and P is assigned to SMAX, and then the processing proceeds to step S4617. On the other hand, when it is determined in step S4615 that S(P) is less than SMAX, the processing proceeds to step S4617. In step S4617, the list number P is incremented by 1. Then, the processing continues by returning to step S4614.

On the other hand, when it is determined in step S4614 that P is greater than PMAX, the processing proceeds to step S4618. It is determined in step S4618 whether or not SMAX is greater than 0.5. When it is determined in step S4618 that SMAX is greater than 0.5, the processing proceeds to step S4619. In step S4619, display area information stored in the decorative object list of which the page ID is SMAX is set as a display area. Then, the processing proceeds to step S4621, and the processing ends.

On the other hand, when it is determined in step S4618 that SMAX is less than 0.5, the processing proceeds to step S4620 because no match is found on any one of the decorative object lists. In step S4620, the entire page to be currently displayed is set as a display area. In step S4621, the processing ends.

Figure 43:
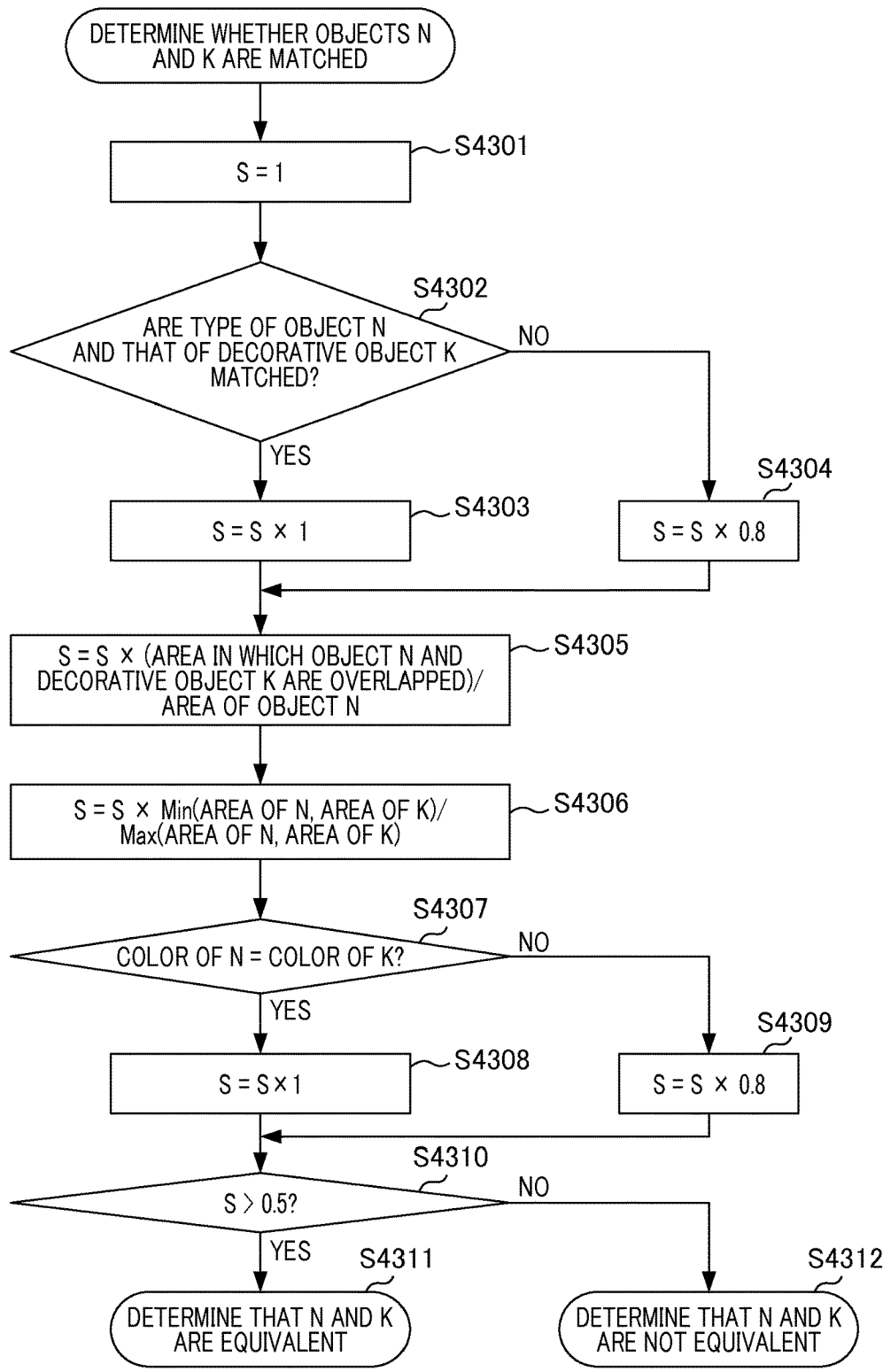
FIG. 43 is a flowchart for determining whether or not two objects are equivalent based on a degree of correlation between the two objects.
Figure 48:
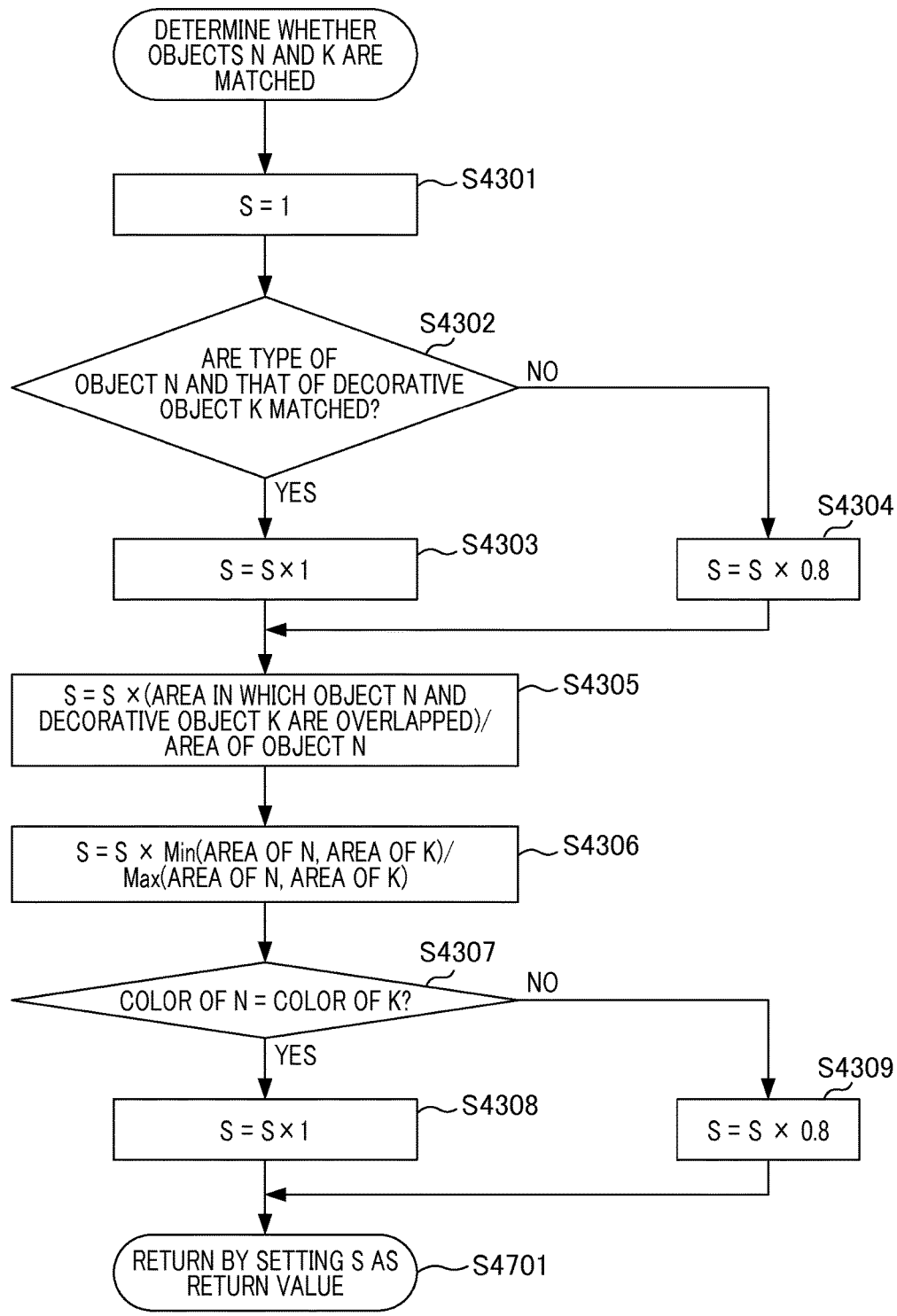
FIG. 48 is a flowchart for calculating a correlation coefficient S between objects N and K.

Next, a description will be given of a flow for calculating a degree of correlation S between the object N in step S4607 and the object having the block number K in the list number P of decorative object registration list information with reference to FIG. 48. Since the flow from step S4301 to step S4309 shown in FIG. 48 is the same as that described in FIG. 43, explanation thereof will be omitted. Steps S4310, S4311, and step S4312 in the flow shown in FIG. 43 are absent in the flow shown in FIG. 48. The value S calculated in step S4308 or step S4309 is held. In step S4701, the processing returns to step S4607.

Next, a description will be given of specific processing for determining whether or not an object corresponds to the decorative object in step S4205 with reference to FIGS. 43 and 44. The decorative object registration unit 2410 performs the aforementioned decorative object registration processing for an object with content desired not to be displayed to the user and registers the object as a decorative object. In the processing for determining whether or not the object corresponds to the decorative object, it is specifically determined whether or not the object corresponds to any one of decorative objects listed on all the decorative object registration lists shown in FIGS. 39A and 39B or corresponds to none of them.

Figure 44:
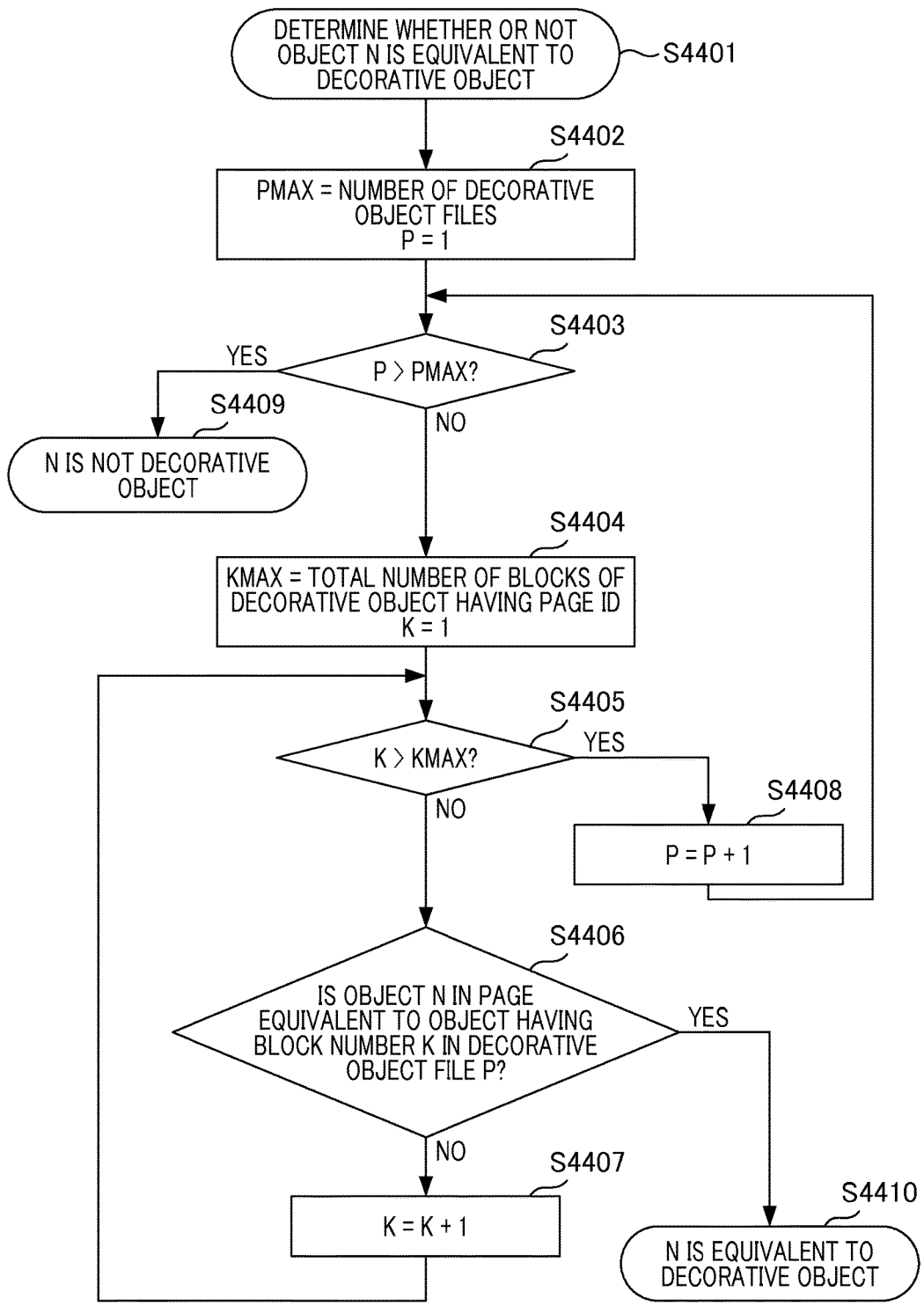
FIG. 44 is a flowchart for determining whether or not an object is equivalent to a decorative object.

When the processing proceeds to step S4205 in the display range determination processing, the processing firstly proceeds to step S4401 shown in FIG. 44 so as to start a determination as to whether or not the object N corresponds to the decorative object. Next, in step S4402, the total number of the decorative object registration lists is set to PMAX and the list number is set to P, where P starts from 1. Next, it is determined in step S4403 whether or not P is greater than PMAX. When it is determined in step S4403 that P is greater than PMAX, the processing proceeds to step S4409, the object N is determined not to correspond to a decorative object, and then the processing proceeds to step S4206.

On the other hand, when it is determined in step S4403 that P is less than PMAX, the processing proceeds to step S4404, and the total number of blocks of the decorative object having the page ID of P is defined as KMAX and the block number is defined as K, where K starts from 1. Next, it is determined in step S4405 whether or not K is greater than KMAX. When it is determined in step S4405 that K is greater than KMAX, the processing proceeds to step S4408, and the list number P is incremented by 1. Then, the processing continues by returning to step S4403.

On the other hand, when it is determined in step S4405 that K is less than KMAX, the processing proceeds to step S4406. It is determined in step S4406 whether or not the object N is equivalent to the object having the block number K in the list number P of decorative object registration list information. When it is determined in step S4406 that both objects are equivalent, the processing proceeds to step S4410. It is determined in step S4410 that the object N corresponds to the decorative object, and the processing proceeds to step S4208.

On the other hand, when it is determined in step S4406 that both objects are not equivalent, the processing proceeds to step S4407, and the block number K is incremented by 1. Then, the processing continues by returning to step S4405. Note that determination processing in step S4406 will be specifically described with reference to FIG. 43.

Firstly, in step S4301, S is set to 1. Here, S is a degree of correlation between the object N and the object having the block number K in the list number P of decorative object registration list information. Next, it is determined in step S4302 whether or not both objects are matched in type by comparing the type of the object N with the type of the decorative object K. When it is determined in step S4302 that both objects are matched in type, S is set to S×1 in step S4303. On the other hand, when it is determined in step S4302 that both objects are not matched in type, S is set to S×0.8 in step S4304.

Next, in step S4305, S is set to a value obtained by multiplying a value, which is obtained by dividing an area in which the positions of the object N and the decorative object K are overlapped by the area of the object N, by S. Next, in step S4306, S is set to a value obtained by multiplying a value, which is obtained by dividing the minimum value of the area of the object N and the area of the decorative object K by the maximum value of the area of the object N and the area of the decorative object K, by S.

Next, it is determined in step S4307 whether or not the object N and the decorative object K are the same color by comparing the color of the object N with the color of the decorative object K. When it is determined in step S4307 that both objects are the same color (i.e., when both objects are monochrome or color), S is set to S×1 in step S4308. On the other hand, when it is determined in step S4307 that both objects are different in color, S is set to S×0.8 in step S4309.

Next, it is determined in step S4301 whether or not S is greater than 0.5. When it is determined in step S4301 that S is greater than 0.5, it is determined in step S4311 that the object N is equivalent to the object having the block number K in the list number P of decorative object registration list information, and the processing proceeds to step S4410. On the other hand, when it is determined in step S4301 that S is less than 0.5, it is determined in step S4312 that the object N is not equivalent to the object having the block number K in the list number P of decorative object registration list information, and the processing proceeds to step S4407.

Next, a description will be given of a flow for calculating a degree of correlation S between the object N in step S4607 and the object having the block number K in the list number P of decorative object registration list information with reference to FIG. 48. Since the flow from step S4301 to step S4309 shown in FIG. 48 is the same as that described in FIG. 43, explanation thereof will be omitted. Steps S4310, S4311, and step S4312 in the flow shown in FIG. 43 are absent in the flow shown in FIG. 48. The value S calculated in step S4308 or step S4309 is held. In step S4701, the processing returns to step S4607.

Next, a specific description will be given of display processing in the partial area display mode according to the present embodiment with reference to FIGS. 26A, 26B, 33A, 33B, 34A, and 34B. FIGS. 33A, 33B, 34A, and 34B illustrate examples of screen display of the touch UI 1904 of the mobile information terminal 107 according to the present embodiment.

In FIGS. 26A and 26B, the object 2601 is an object having the character attribute for horizontal writing. The object 2601 has area information enclosed by the broken line shown in FIG. 26A. Since the object 2601 has the character attribute, immediately after the object 2601 is read, the display magnification of the page is set to a magnification with which the width of the relevant object fits into the screen width of the touch UI 1904 in the partial area display range determination processing. When the object 2601 is displayed, the height of the relevant object is smaller than the height of the screen of the touch UI 1904 with the set display magnification of the page. Thus, the starting point of the page is set such that the center of the relevant object is aligned with the center of the touch UI 1904 and the page is displayed as shown in FIG. 26B.

In FIG. 33A, an object 3300 is an object having the character attribute for vertical writing. The object 3300 has area information enclosed by the broken line shown in FIG. 33A. Since the object 3300 has the character attribute, immediately after the object 3300 is read, the display magnification of the page is set to a magnification with which the height of the relevant object fits into the screen height of the touch UI 1904 in the partial area display range determination processing. When the object 3300 is displayed, the width of the relevant object is larger than the width of the screen of the touch UI 1904 with the set display magnification of the page. Thus, the starting point of the page is set such that the top right corner of the relevant object is aligned with the top right corner of the touch UI 1904 and the page is displayed as shown in FIG. 33B.

Figure 34B:
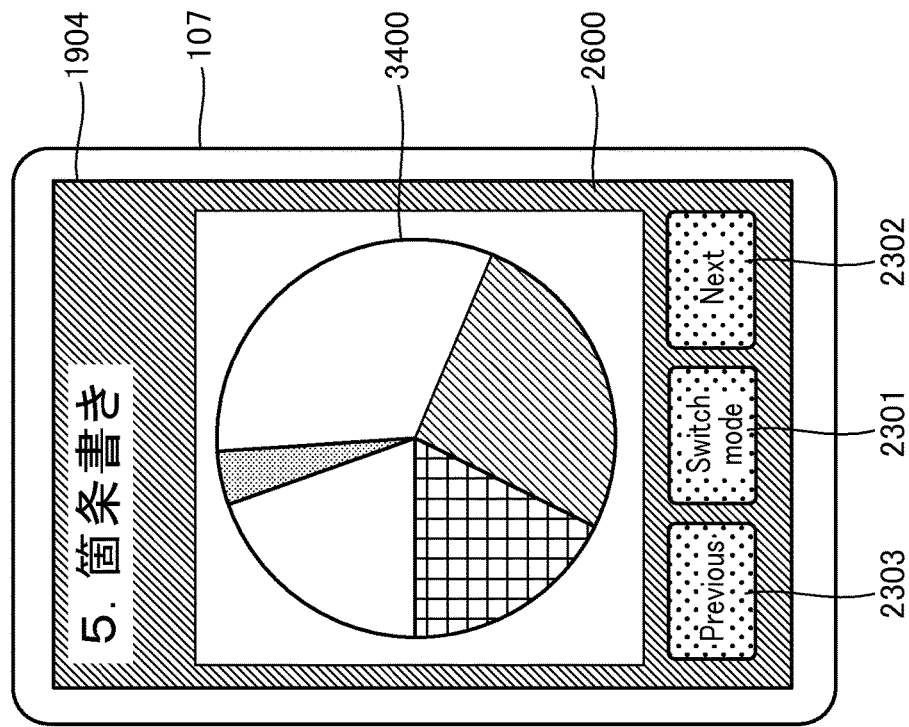
FIGS. 34A and 34B illustrate examples of screen display of the touch UI of the mobile information terminal.
Figure 34A:
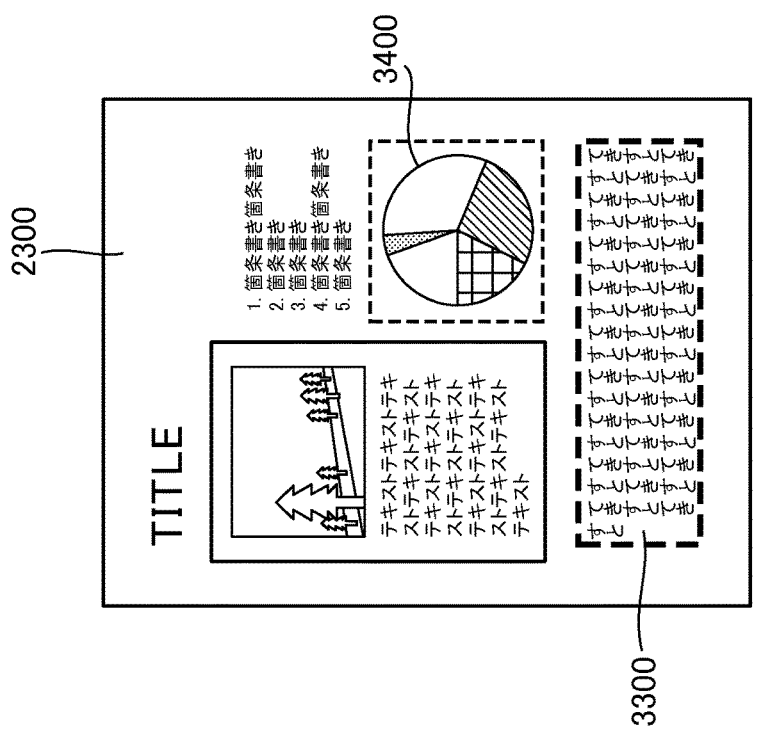

In FIGS. 34A and 34B, an object 3400 is an object having the drawing attribute. The object 3400 has area information enclosed by the broken line shown in FIG. 34A. Since the object 3400 has the drawing attribute, immediately after the object 3400 is read, the display magnification of the page is set to a magnification with which the width and height of the relevant object fits into the width and height of the screen of the touch UI 1904 in the partial area display range determination processing. The starting point of the page is also set such that the center of the relevant object is aligned with the center of the touch UI 1904 and the page is displayed as shown in FIG. 34B.

Next, a specific description will be given by exemplary restriction of moving range restriction processing according to the present embodiment with reference to FIGS. 34A, 34B, 35A to 35C, and 36A to 36C. FIGS. 35A to 35C and 36A 36C illustrate examples of screen display of the touch UI 1904 of the mobile information terminal 107 according to the present embodiment.

FIG. 35A illustrates an example of screen display of the object 3400 on the touch UI 1904. In FIG. 35A, the display magnification of the page is set to a magnification with which the width and height of the relevant object fits into the width and height of the screen of the touch UI 1904 and the starting point of the page is also set such that the center of the relevant object is aligned with the center of the touch UI 1904 as in FIG. 34B. Thus, the width and height of the object 3400 are smaller than the width and height of the screen of the touch UI 1904, so that the entire object 3400 is displayed so as to be fit into the screen of the touch UI 1904. FIG. 35B illustrates an example of screen display when the swipe operation is performed in the direction (i.e. left direction) from the finger 3500 to the finger 3501 of the user. The swipe event processing unit 2401 updates the screen display of the touch UI 1904 by moving the starting point of the page by the moving distance each time the swipe event processing unit 2401 receives the swipe event. FIG. 35B illustrates an example of screen display when the left end of the object 3400 is moved out of the screen of the touch UI 1904 by the user's swipe operation. FIG. 35C illustrates an example of screen display when the starting point of the page is corrected such that the object 3400 of which the left end has been moved out of the screen of the touch UI 1904 by the swipe event processing unit 2401 as shown in FIG. 35B is returned to the screen and displayed thereon by the moving range restriction processing. Specifically, since the width and height of the object 3400 being displayed is less than the width and height of the screen of the touch UI 1904, the starting point of the page is corrected by the moving range restriction processing such that the object 3400 is displayed within the screen when the object 3400 is moved out of the screen.

FIG. 36A illustrates an example of screen display of the touch UI 1904 by enlarging the object 3400 by the pinch-out operation. In FIG. 36A, the width of the object 3400 being displayed is larger than the width of the screen of the touch UI 1904 and the left and right ends of the object 3400 are displayed outside the screen of the touch UI 1904 and the top and bottom ends thereof are displayed within the screen. FIG. 36B illustrates an example of screen display when the swipe operation is performed in the direction (i.e. direction from right toward left) from the finger 3600 to the finger 3601 of the user. The swipe event processing unit 2401 updates the screen display of the touch UI 1904 by moving the starting point of the page by the moving distance each time the swipe event processing unit 2401 receives the swipe event. FIG. 36B illustrates an example of screen display when the right end of the object 3400 is moved into the screen of the touch UI 1904 by the user's swipe operation. FIG. 36C illustrates an example of screen display when the starting point of the page is corrected such that the right end of the object 3400 is substantially aligned with the right end of the screen of the touch UI 1904 by the moving range restriction processing. Specifically, the width of the object 3400 being displayed is larger than the width of the screen of the touch UI 1904. Thus, the starting point of the page is corrected such that the object 3400 is displayed within the screen as much as possible and the end of the object 3400 is aligned with the end of the screen by the moving range restriction processing when the end of the object 3400 is moved into the screen.

In the present embodiment, the MFP 100 transmits the application image data to be displayed to the mobile information terminal 107, and the mobile information terminal 107 displays the received application image data. However, it goes without saying that the MFP 100 may also be configured to generate an application which can be executed by the mobile information terminal 107 storing the application image data therein and distribute the application to the mobile information terminal 107. Note that the application which can be executed by the mobile information terminal 107 includes the gesture event processing unit 2002, which is software module described in the present embodiment, therein to thereby control the application image data.

Furthermore, the MFP 100 may transmit the generated application image data to the document management server 106, and transmit an address indicating the placement of the application image data to the mobile information terminal 107. In this case, the mobile information terminal 107 does not have the entity of the application image data, but acquires, as required, page and object information from the database 105 storing data of the document management server 106 via the LAN 102 and displays the information.

As described above, in the present embodiment, an object which is of no interest to the user and thus is unnecessary to be displayed is registered as a decorative object, so that only an area which is of interest to the user can be displayed. A description will be given of an example of screen display when displayed in the area of interest display mode with reference to FIGS. 40A to 40C.

Firstly, FIG. 40A illustrates an exemplary page indicating a decorative object to be registered by a user. A top segmentation line 4001 is a line for segmenting a text 4007 from a design 4002 and a content 4003 which are contents indicating information such as a title or the like, and a decoration 4004 is a layout decoration for readily determining a chapter. A page number 4005 indicates the page number being displayed, and a bottom segmentation line 4006 is a line for segmenting the text 4007 from the area of the page number 4005. A terminal 4008 is a terminal such as a mobile terminal. Furthermore, a mode switching button 4010 is a button for switching a display mode, a "PREVIOUS" button 4009 is a button for displaying an object previous to an object being displayed, and a "NEXT" button 4011 is a button for displaying an object next to an object being displayed. In the conventional display method, the entire page is always displayed as shown in FIG. 40B when a page having objects shown in FIG. 40A is displayed on a terminal such as a mobile terminal.

In the present embodiment, for example, when the user does not want to view the top segmentation line 4001, the contents 4002 and 4003, the decoration 4004, the page number 4005, and the bottom segmentation line 4006 in a page, these objects can be registered as decorative objects. If more than a predetermined time has elapsed without moving a specific area desired to be displayed to the user with the specific area being displayed after adjustment of the relevant page by enlarging or reducing the specific area desired to be displayed from the entire page, objects which are present in areas excluding an area being displayed can be registered as decorative objects. When the user presses the mode switching button 4010, only an object (in the present embodiment, the text 4007) desired to be displayed to the user can be displayed as shown in FIG. 40C. After registration of objects as decorative objects, objects equivalent to decorative objects can be displayed when a new page is displayed on the area of interest display mode.

Next, a description will be given of an example of screen display when displayed in the partial display mode with reference to FIGS. 41A to 41E. Firstly, FIG. 41A illustrates the layout of a page to be newly displayed. A top segmentation line 4101 is a line for segmenting the text portion of an object 4100 from contents 4102 and 4103 indicating information such as a title or the like, and a decoration 4104 is a layout decoration for readily determining a chapter. A page number 4105 indicates the page number being displayed, and a bottom segmentation line 4106 is a line for segmenting the text portion from the area of the page number 4105. The text portion includes a top text 4107, a text decoration 4108, and a bottom text 4109.

When displayed in the partial display mode using the conventional display method, the content 4103 portion is firstly displayed as shown in FIG. 41B. When the "NEXT" button 4011 is instructed, the design 4102 portion is displayed as shown in FIG. 41C. When the "NEXT" button 4011 is instructed, the top segmentation line 4101 portion is displayed as shown in FIG. 41D. When the "NEXT" button 4011 is further instructed, the top text 4107 portion is displayed as shown in FIG. 41E. Each portion of the object 4100 is displayed in sequence each time the "NEXT" button 4011 is instructed. When the "PREVIOUS" button 4009 is instructed, each portion is displayed in reversed order. As described above, in the conventional display method, each portion of the object 4100 is displayed in sequence each time the "PREVIOUS" button 4009 or the "NEXT" button 4011 is instructed regardless of a portion desired to be displayed to the user or a portion unnecessary to be displayed. Consequently, all portions of the object 4100 are displayed. Thus, the user must keep pressing the "PREVIOUS" button 4009 or the "NEXT" button 4011 more than necessary until a portion desired to be displayed is displayed.

On the other hand, in the present embodiment, the user registers a portion (object) which is unnecessary to be displayed as a decorative object in advance, so that only a portion desired to be displayed to the user can be displayed when the object 4100 is displayed in the partial display mode. In contrast to the conventional display method, a portion which is unnecessary to be displayed is not displayed, so that the user does not need to press the "PREVIOUS" button 4009 or the "NEXT" button 4011 more than necessary.

For example, when the user wants to display only a portion shown in FIG. 41E from among portions shown in FIGS. 41A to 41E, the "NEXT" button 4011 is instructed in sequence from FIG. 41B so as to display FIG. 41E in the conventional display method. On the other hand, according to the present embodiment, a portion which is unnecessary to be displayed is registered as a decorative object in advance, FIG. 41E can be displayed by skipping FIGS. 41B to 41D without pressing the "NEXT" button 4011. Even when a page as shown in FIG. 41A is newly displayed, objects corresponding to decorative objects can be omitted from being displayed, so that only a portion desired to be displayed to the user can be displayed as shown in FIG. 41E from the beginning.

Figure 49B:
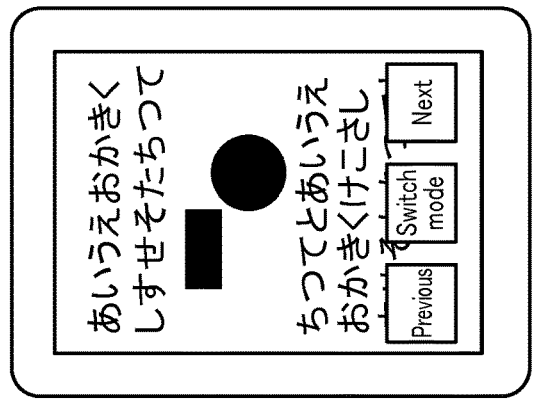
FIGS. 49A to 49C illustrate examples of screen display of the touch UI of the mobile information terminal upon displaying a new page.
Figure 49C:
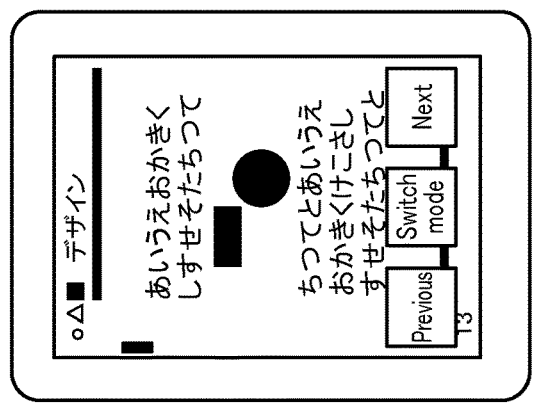
Figure 49A:
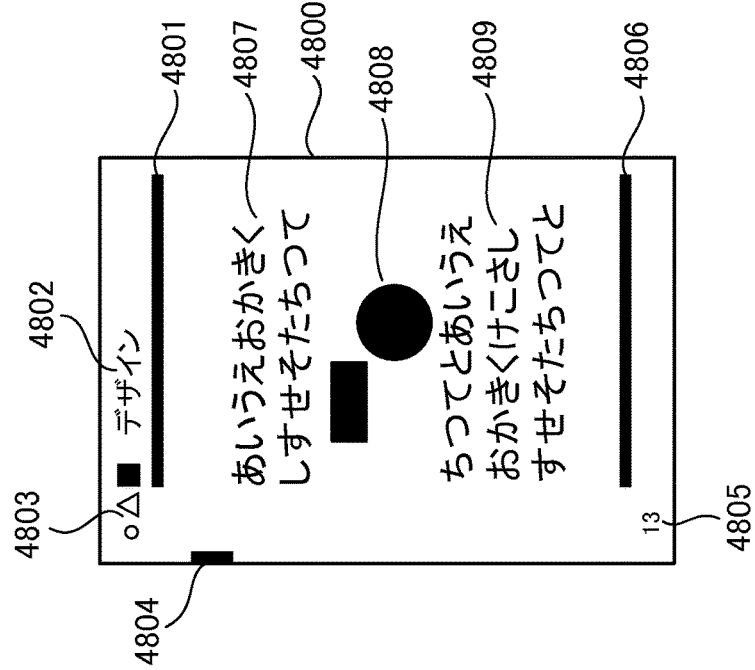

As described above, in the present embodiment, if more than a predetermined time has elapsed (determination criteria) with an area which is desired to be displayed to the user being displayed after adjustment of the page by enlarging or reducing the area, objects which are present in areas excluding the displayed area can be registered as decorative objects. In this manner, when a new page other than the page upon registration of decorative objects included therein is hereinafter displayed in the area of interest display mode, objects which are equivalent to the registered decorative objects are omitted, so that only a content desired to be displayed to the user can be displayed. FIGS. 49A to 49C illustrate how a page to be newly displayed in the area of interest display mode is displayed after registration of decorative objects by the user.

Firstly, FIG. 49A illustrates the layout of the entire page to be newly displayed, FIG. 49B illustrates an example of screen display of the page displayed on a terminal using the conventional display method, and FIG. 49C illustrates an example of screen display when the page is displayed in the area of interest display mode according to the present embodiment. In the present embodiment, when a page is newly displayed, it is firstly determined whether or not objects included in the page are equivalent to decorative objects registered in the past.

Here, a top segmentation line 4801 shown in FIGS. 49A to 49C is a line for segmenting the text portion of an object 4800 from contents 4802 and 4803 indicating information such as a title or the like, and a decoration 4804 is a layout decoration for readily determining a chapter. A page number 4805 indicates the page number being displayed, and a bottom segmentation line 4806 is a line for segmenting the text portion from the area of the page number 4805. The text portion includes a top text 4807, a text decoration 4808, and a bottom text 4809.

For example, when the top segmentation line 4001 to the bottom segmentation line 4006 shown in FIGS. 40A to 40C are registered as decorative objects, it is determined by the processing shown in FIG. 43 that the type, position, area, size, and the like of each of the top segmentation line 4801 to the bottom segmentation line 4806 are equivalent to those of each of the decorative objects 4001 to 4006. Consequently, a page to be newly displayed is determined to be equivalent to the page shown in FIGS. 40A to 40C, and thus, the page is displayed with the objects determined to be equivalent to decorative objects omitted therefrom as shown in FIG. 49C. In general, the content (text or the like) to be read in a page often varies page by page. However, in the layout for design, the position, size, and type of the object are often in common in different pages.

In the present embodiment, objects which are unnecessary to be read by the user in a displayed page are registered as decorative objects, so that only objects desired to be read by (displayed to) the user can be automatically displayed. When a new page is displayed as a result of reading a page, it is automatically determined whether or not the objects are equivalent to decorative objects, so that the user can keep reading the page with the objects determined to be equivalent to decorative objects removed from the display target. Thus, the user can keep reading a document by enlarging only the content desired to be viewed with a readily viewable size without viewing unnecessary content.

In the first embodiment, a description has been given of a method for specifying an object present within an area excluding the display area specified by the user as a method for specifying a decorative object. However, an object can also be directly specified as a decorative object in a method other than the method described above.

As described above, according to the present embodiment, objects which are unnecessary to be read by the user are registered as decorative objects, so that the user can keep reading a document with the objects determined to be equivalent to decorative objects removed from the display target. In the page display mode, no unnecessary object is displayed, so that only the content desired to be viewed can be enlarged with a readily viewable size for the user. In the partial display mode, a page can be partially displayed with objects, which are equivalent to decorative objects unnecessary to the user, omitted therefrom. Through the operation of the "NEXT" button and the "PREVIOUS" button, the ranges desired to be displayed in a page can be sequentially displayed in an appropriate order without displaying unnecessary objects in the page, so that the user can efficiently view the document.

Second Embodiment

In the second embodiment, upon registration of a decorative object which is unnecessary to be displayed, the decorative object is registered by the triple-tap event using the processing shown in FIG. 37 so as to specify the decorative object which is unnecessary to be displayed. The same reference numerals denote the same portions as those in the first embodiment and only a different portion different from the first embodiment will be described below.

In the second embodiment, when the user registers an object which is unnecessary to be displayed as a decorative object, the user adjusts the display area by an enlargement/reduction operation while the entire page is displayed in the page display mode as in the first embodiment. When the user performs the triple-tap event after determination of the display area, the touch panel 1902 sends a signal to the gesture event generation unit 2001, and then the gesture event processing unit 2002 performs the processing shown in FIG. 37.

Firstly, in step S3700, the gesture event processing unit 2002 determines whether the display mode is either the page display mode or the partial area display mode. When the display mode is determined to be the page display mode, the processing proceeds to step S3701. In step S3701, all the objects outside the display area triple-tapped by the user are determined as decorative objects. Then, the decorative object list shown in FIG. 39A is created for registration. Next, in step S3702, a file of decorative object registration list information consisting of the number of decorative objects in a page, coordinate information of a display area being displayed, information about the displayed page number, and information about a registered file ID. The registered file ID is an ID corresponding to the registration number upon registration of a decorative object registration list. A registered file ID is assigned in ascending order from 1 each time a file is created. In step S3703, the processing ends. On the other hand, when the display mode is determined to be the partial area display mode in step S3700, the processing proceeds to step S3703, and the processing ends.

As described above, in the second embodiment, when a document as shown in FIG. 40A is displayed, the user firstly selects a display range as shown in FIG. 40C, and then performs the triple-tap operation. Consequently, objects outside the display range are registered as a decorative object list in the list shown in FIG. 39A. At this time, the number of decorative objects in the page, the display area, the page number of the displayed page, and the registered file ID are registered in the decorative object registration list information shown in FIG. 39B. Specifically, the top segmentation line 4001 to the bottom segmentation line 4006 shown in FIG. 40A are registered in the list as decorative objects.

For example, it is determined whether there is a correlation with the decorative object registration list which has already been registered with reference to FIG. 49A. Thus, it can be recognized that the object type, position coordinates, and size of the top segmentation line 4801 to the bottom segmentation line 4806 are the same as those of the top segmentation line 4001 to the bottom segmentation line 4006, respectively. Thus, when the top segmentation line 4001 to the bottom segmentation line 4006 have already been registered in the decorative object registration list, it is determined that the top segmentation line 4801 to the bottom segmentation line 4806 are highly correlated with the top segmentation line 4001 to the bottom segmentation line 4006, respectively.

In this manner, when a page shown in FIG. 49A is newly displayed, the display area stored in decorative object registration list information about decorative object registration lists is automatically used for display. Consequently, the user does not need to manually adjust the display area each time a new page is displayed, the area necessary for the user can be automatically enlarged for display as shown in FIG. 49C.

In the present embodiment, as a method for specifying a decorative object, objects other than a decorative object are selected and then objects other than the selected objects are specified as decorative objects. However, an object may also be directly specified as a decorative object in a method other than the method described above.

While, in the first embodiment, the user displays any display range in a page for a predetermined time so as to determine a decorative object, the user cannot perform any operation during the predetermined time, and thus, a certain time period is required for registering the decorative object. In contrast, in the second embodiment, a decorative object can be stored by directly tapping a display area displayed by the adjustment made by the user, resulting in a reduction in time required for registration.

When a document is read in the area of interest display mode and the page display mode, it is contemplated that, upon display of a new page, the entire page is not displayed but only a portion of the page is displayed. Another object which is originally of interest to the user and is different from a decorative object may exist in an undisplayed portion of the relevant page. In such a case, it is determined whether or not an object which cannot be read by being moved outside of the screen is equivalent to a decorative object. When there is an object determined not to be equivalent to the decorative object, the user is explicitly informed of the fact that such an object is present outside the display area. As a method for explicitly informing the user about the presence of such an object outside the display area, a method for displaying a mark at a portion of a periphery of the display area in a direction along which an object is present, a method for displaying the entire page and then automatically zooming out of the display area preferred by the user, a method for displaying the entire page, and the like are considered.

Figure 47:
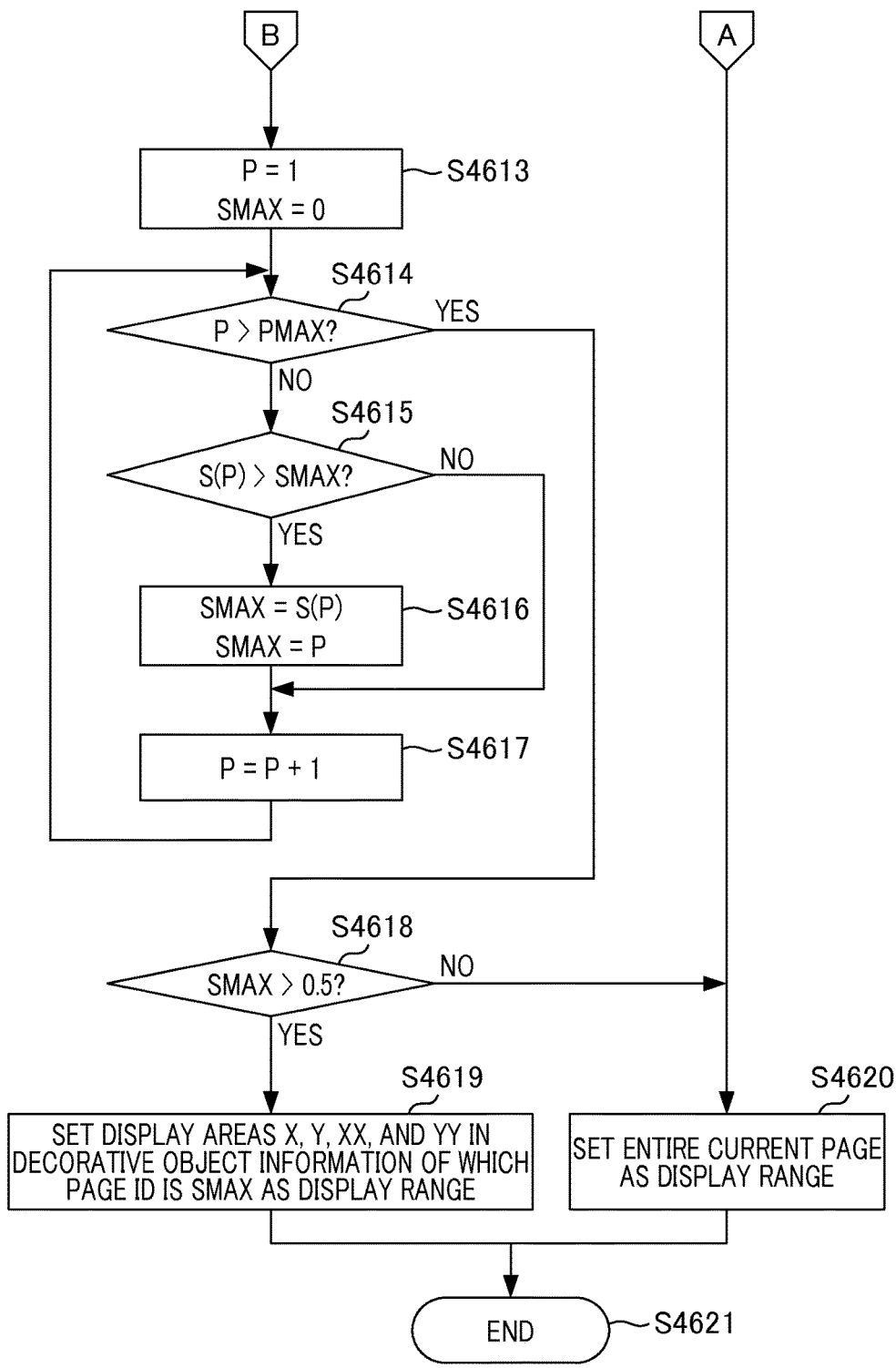
FIG. 47 is a flowchart for determining a displaying range of a page.

In the first and the second embodiments, as a method for determining a correlation value between objects, a description has been given by taking an exemplary method for determining whether or not objects are matched by calculating the correlation value therebetween using the processing shown in FIG. 43 or FIG. 47. However, the present invention is not limited thereto, but it may also be determined whether or not objects are matched by determining whether or not a correlation value which is calculated by computation using at least one or more pieces of information from information such as the area, type, color, and the like of objects coincides with a predetermined condition (determination criteria). For easier determination of a correlation value, it may also be determined whether or not objects are matched by simply comparing only the coordinates of objects and by determining whether or not the overlapping area is equal to or greater than the predetermined percentage of the area of each object. Furthermore, information (second information) about a page including a decorative object having position coordinates symmetrical to the decorative object (first information) in the registered page is registered. In this manner, it may also be determined whether or not pages are equal by determining whether or not the object in a symmetrical page matches the decorative object.

When the user changes the display range by enlarging or reducing a page, a new decorative object is registered based on a predetermined determination criteria (i.e., no operation performed for a predetermined time or triple-tapping) in the changed display area, and then the resulting display area may also be set as a new display area. Furthermore, in the first embodiment, a description has been given by taking an example in which, when the user performs an operation for a predetermined time after display of any display range of a page upon registration of a decorative object by the user, the display range is stored and then objects present outside the display range are registered as decorative objects. In the second embodiment, a description has been given by taking an example of registration of a decorative object by an action such as triple-tapping. However, the present invention is not limited thereto, but a decorative object may be determined and registered through a gesture selected by the user or any combination of gestures. As a method for further registering another decorative object, another decorative object may be determined and registered through a combination of a plurality of actions or by the definition of any action preferred by the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-177185, filed on Aug. 28, 2013, which is hereby incorporated by reference herein in its entirety.

What is claimed is:

1. A display apparatus that displays a first page containing a plurality of objects and a second page containing a plurality of objects, the display apparatus comprising:
   a memory; and
   a processor configured to execute instructions stored in the memory, to act as units comprising:
   (a) a setting unit configured to set one or more non-display objects among the objects contained in the first page;
   (b) a first control display unit configured to carry out control to enlarge and display, on a screen, the objects contained in the first page, except the one or more non-display objects set by the setting unit;
   (c) a receiving unit configured to receive an instruction to switch from display of the first page to display of the second page;
   (d) a comparing unit configured to, in response to the received instruction, perform a comparison between the objects contained in the second page and the one or more non-display objects, wherein an object, of the objects contained in the second page, is determined to be equivalent to a non-display object, of the one or more non-display objects, if the object and the non-display object have in common at least one of: a position and a size; and
   (e) a second control display unit configured to, in response to the comparison, carry out control to enlarge and display, on the screen, the objects contained in the second page, except one or more objects determined from the comparison to be equivalent to any one of the one or more non-display objects set by the setting unit.

2. The display apparatus according to claim 1, wherein a display area of the screen is set based on a magnification at which a page is displayed on the screen.

3. The display apparatus according to claim 1, wherein a display area of the screen is set by scrolling and scaling of a page based on a user's instruction.

4. The display apparatus according to claim 3, wherein the scrolling is performed by a swipe operation made by a user, and the scaling is performed by a pinch-out operation or a pinch-in operation made by the user.

5. The display apparatus according to claim 1, wherein an object of the one or more non-display objects is an image of a partial area in a page.

6. A system that processes a first page containing a plurality of objects and a second page containing a plurality of objects, the system comprising:
   at least one memory; and
   at least one processor configured to execute instructions stored in the at least one memory, to act as units comprising:
   (a) a setting unit configured to set one or more non-display objects among the objects contained in the first page;

(b) a first control display unit configured to carry out control to enlarge and display, on a screen, the objects contained in the first page, except the one or more non-display objects set by the setting unit;

(c) a receiving unit configured to receive an instruction to switch from display of the first page to display of the second page;

(d) a comparing unit configured to, in response to the received instruction, perform a comparison between the objects contained in the second page and the one or more non-display objects, wherein an object, of the objects contained in the second page, is determined to be equivalent to a non-display object, of the one or more non-display objects, if the object and the non-display object have in common at least one of: a position and a size; and (e) a second control display unit configured to, in response to the comparison, carry out control to enlarge and display, on the screen, the objects contained in the second page, except one or more objects determined from the comparison to be equivalent to any one of the one or more non-display objects set by the setting unit.

7. The system according to claim 6, wherein a display area of the screen is displayed by scrolling and scaling of a page based on a user's instruction, scrolling is performed by a swipe operation made by the user, and scaling is performed by a pinch-out operation or a pinch-in operation made by the user.

8. A display method for displaying a first page containing a plurality of objects and a second page containing a plurality of objects, the display method comprising:

setting one or more non-display objects among the objects contained in the first page;

carrying out control to enlarge and display, on a screen, the objects contained in the first page, except the one or more non-display objects;

receiving an instruction to switch from display of the first page to display of the second page;

comparing, in response to the received instruction, between the objects contained in the second page and the one or more non-display objects, wherein an object, of the objects contained in the second page, is determined to be equivalent to a non-display object, of the one or more non-display objects, if the object and the non-display object have in common at least one of: a position and a size; and carrying out, in response to the comparison, control to enlarge and display, on the screen, the objects contained in the second page, except one or more objects determined from the comparison to be equivalent to any one of the one or more non-display objects.

9. A non-transitory storage medium storing a program for causing a computer to execute a method for displaying a first page containing a plurality of objects and a second page containing a plurality of objects, the method comprising:

setting one or more non-display objects among the objects contained in the first page;

carrying out control to enlarge and display, on a screen, the objects contained in the first page, except the one or more non-display objects;

receiving an instruction to switch from display of the first page to display of a second page;

comparing, in response to the received instruction, between the objects contained in the second page and the one or more non-display objects, wherein an object, of the objects contained in the second page, is determined to be equivalent to a non-display object, of the one or more non-display objects, if the object and the non-display object have in common at least one of: a position and a size; and carrying out, in response to the comparison, control to enlarge and display, on the screen, the objects contained in the second page, except one or more objects determined from the comparison to be equivalent to any one of the one or more non-display objects.

10. A display apparatus that displays a first page containing a plurality of objects and a second page containing a plurality of objects, the display apparatus comprising:

a memory; and a processor configured to execute instructions stored in the memory, to act as units comprising:

(a) a setting unit configured to set one or more non-display objects among the objects contained in the first page;

(b) a first control display unit configured to carry out control to enlarge and display, on a screen, the objects contained in the first page, except the one or more non-display objects;

(c) a receiving unit configured to receive an instruction to switch from display of the first page to display of the second page;

(d) a comparing unit configured to, in response to the received instruction, perform a comparison between the objects contained in the second page and the one or more non-display objects, wherein an object, of the objects contained in the second page, is determined to be equivalent to a non-display object, of the one or more non-display objects, if the object and the non-display object have in common at least one of: an object position, an object size, and an object type, wherein the object type is one of the group consisting of photograph, line, table, graphic, decorative object, and page number; and (e) a second control display unit configured to, in response to the comparison, enlarge and display, on the screen, the objects contained in the second page, except one or more objects determined, by the comparing unit, to be equivalent to any one of the one or more non-display objects.

* * * * *